United States Patent
Shumlak et al.

(10) Patent No.: US 11,758,640 B2
(45) Date of Patent: *Sep. 12, 2023

(54) APPARATUS AND METHOD FOR EXTENDED PLASMA CONFINEMENT

(71) Applicant: ZAP ENERGY, INC., Seattle, WA (US)

(72) Inventors: Uri Shumlak, Seattle, WA (US); Brian A. Nelson, Edmonds, WA (US); Eric T. Meier, Seattle, WA (US)

(73) Assignee: ZAP ENERGY, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,591

(22) Filed: Jun. 15, 2022

(65) Prior Publication Data
US 2022/0394839 A1 Dec. 8, 2022

Related U.S. Application Data

(63) Continuation of application No. 17/827,379, filed on May 27, 2022.
(Continued)

(51) Int. Cl.
*H05H 1/06* (2006.01)
*G21B 1/05* (2006.01)
(Continued)

(52) U.S. Cl.
CPC ............ *H05H 1/06* (2013.01); *G21B 1/05* (2013.01); *G21B 1/21* (2013.01); *H05H 1/54* (2013.01)

(58) Field of Classification Search
None
See application file for complete search history.

(56) References Cited

U.S. PATENT DOCUMENTS 6,408,052 B1 * 6/2002 McGeoch .............. H05G 2/005
378/119
6,452,194 B2 * 9/2002 Bijkerk ............... G03F 7/70033
378/119
(Continued)

FOREIGN PATENT DOCUMENTS

JP      2004028969 A      1/2004
KR   20190127987 A     11/2019
(Continued)

OTHER PUBLICATIONS

Angus, J. R. et al, "Drift-Ideal Magnetohydrodynamic Simulations of M=0 Modes in Z-pinch Plasmas", Physics of Plasmas, vol. 26, Issue 7, Feb. 15, 2019, 17 pages.
(Continued)

*Primary Examiner* — Srinivas Sathiraju
(74) *Attorney, Agent, or Firm* — Davis Wright Tremaine LLP

(57) ABSTRACT

Methods and systems are provided for plasma confinement utilizing various electrode and valve configurations. In one example, a device includes a first electrode positioned to define an outer boundary of an acceleration volume, a second electrode arranged coaxially with respect to the first electrode and positioned to define an inner boundary of the acceleration volume, at least one power supply to drive an electric current along a Z-pinch plasma column between the first second electrodes, and a set of valves to provide gas to the acceleration volume to fuel the Z-pinch plasma column, wherein an electron flow of the electric current is in a first direction from the second electrode to the first electrode. In additional or alternative examples, a shaping part is conductively connected to the second electrode to, in a presence of the gas, cause a gas breakdown of the gas to generate a sheared flow velocity profile.

20 Claims, 30 Drawing Sheets

Related U.S. Application Data

(60) Provisional application No. 63/194,866, filed on May 28, 2021, provisional application No. 63/194,877, filed on May 28, 2021.

(51) Int. Cl.
  *G21B 1/21* (2006.01)
  *H05H 1/54* (2006.01)

(56) References Cited

U.S. PATENT DOCUMENTS

| | | | |
|---|---|---|---|
| 7,372,059 B2 * | 5/2008 | Shumlak | H05G 2/003 219/121.48 |
| 8,530,854 B1 * | 9/2013 | Derzon | G21G 4/02 315/111.21 |
| 8,907,567 B2 * | 12/2014 | Kuwabara | H05G 2/003 315/111.21 |
| 10,141,711 B2 * | 11/2018 | Clemen, Jr. | H05H 1/06 |
| 10,415,552 B2 * | 9/2019 | Anderson | F03H 1/0012 |
| 10,582,603 B2 * | 3/2020 | Grossnickle | H01S 3/0382 |
| 10,811,155 B2 * | 10/2020 | Grossnickle | G21G 4/02 |
| 10,813,207 B1 * | 10/2020 | Grossnickle | H05H 1/06 |
| 11,219,117 B2 * | 1/2022 | Shumlak | H05H 1/54 |
| 11,581,100 B2 * | 2/2023 | Shumlak | H05H 1/04 |
| 11,589,451 B2 * | 2/2023 | Fluhler | H05H 1/54 |
| 2001/0004104 A1 * | 6/2001 | Bijkerk | H05G 2/003 250/492.2 |
| 2004/0135103 A1 * | 7/2004 | Wester | B82Y 10/00 250/492.2 |
| 2007/0085042 A1 * | 4/2007 | Shumlak | H05G 2/003 250/504 R |
| 2008/0272317 A1 * | 11/2008 | Shumlak | H05G 2/003 250/504 R |
| 2010/0215136 A1 * | 8/2010 | Rusnak | H05H 1/06 376/108 |
| 2011/0089834 A1 * | 4/2011 | McGeoch | H05H 1/06 315/111.41 |
| 2011/0182392 A1 * | 7/2011 | Wessel | H05H 3/06 376/105 |
| 2012/0123358 A1 * | 5/2012 | Hall | A61M 1/96 604/319 |
| 2015/0294743 A1 * | 10/2015 | Zheng | G21B 1/15 376/107 |
| 2017/0294238 A1 * | 10/2017 | Zheng | G21B 1/15 |
| 2018/0220519 A1 * | 8/2018 | Grossnickle | H05H 1/06 |
| 2018/0223815 A1 * | 8/2018 | Anderson | F03H 1/0012 |
| 2019/0277268 A1 * | 9/2019 | Nikic | F03H 1/0081 |
| 2019/0364655 A1 * | 11/2019 | Grossnickle | H01S 3/097 |
| 2020/0058411 A1 * | 2/2020 | Shumlak | G21B 1/05 |
| 2020/0168350 A1 * | 5/2020 | Shumlak | H05H 1/16 |
| 2022/0124903 A1 * | 4/2022 | Fluhler | G21B 1/05 |
| 2022/0392651 A1 * | 12/2022 | Meier | H05H 1/06 |
| 2022/0394838 A1 * | 12/2022 | Shumlak | G21B 1/21 |
| 2022/0394839 A1 * | 12/2022 | Shumlak | H05H 1/54 |
| 2022/0394840 A1 * | 12/2022 | Meier | G21B 1/05 |

FOREIGN PATENT DOCUMENTS

| | | | |
|---|---|---|---|
| WO | 0178469 A2 | 10/2001 | |
| WO | WO-0178469 A2 * | 10/2001 | H05G 2/003 |
| WO | 2005048662 A1 | 5/2005 | |
| WO | WO-2005048662 A1 * | 5/2005 | H05G 2/003 |
| WO | 2008072966 A2 | 6/2008 | |
| WO | WO-2008072966 A2 * | 6/2008 | B82Y 10/00 |
| WO | 2018156860 A1 | 8/2018 | |
| WO | WO-2018156860 A1 * | 8/2018 | G21B 1/05 |
| WO | 2018226914 A1 | 12/2018 | |
| WO | WO-2018226914 A1 * | 12/2018 | G21B 1/05 |
| WO | 2022125912 A1 | 6/2022 | |
| WO | WO-2022125912 A1 * | 6/2022 | |

OTHER PUBLICATIONS

Bassi, F. et al. "A High-Order Accurate Discontinuous Finite Element Method for the Numerical Solution of the Compressible Navier-Stokes Equations", Journal of Computational Physics, vol. 131, Issue 2, Mar. 1, 1997, pp. 267-279.

Braginskii, S. I., "Transport Processes in Plasma", Reviews of Plasma Physics, Consultants Bureau, New York, vol. 1, 1965, pp. 206-311.

Cowper, G. R., "Gaussian Quadrature Formulas for Triangles", International Journal for Numerical Methods in Engineering, vol. 7, Issue 7, 1973, pp. 405-408.

Dunavant, D. A. "High Degree Efficient Symmetrical Gaussian Quadrature Rules for the Triangle", International Journal for Numerical Methods In Engineering, vol. 21, 1985, pp. 1129-1148.

Forbes, E. G. et al., "Progress Toward a Compact Fusion Reactor Using the Sheared-Flow-Stabilized Z-Pinch", Fusion Science and Technology, Jul. 3, 2019, 10 pages.

Freidberg J. P., "Ideal Magnetohydrodynamic Theory of Magnetic Fusion Systems", Reviews of Modem Physics, vol. 54, No. 3, Jul. 1982, pp. 801-903.

Fundamenski, W., "Parallel Heat Flux Limits in the Tokamak Scrape-off Layer", Institute of Physics Publishing, Plasma Phys. Control Fusion vol. 47, Jul. 28, 2005, pp. 163-208.

Geyko, V. I. et al., "Simulation of FuZE Axisymmetric Stability Using Gyrokinetic and Extended-MHD Models", arXiv preprint, Nov. 6, 2020, 10 pages.

Golingo, R. P. et al., "Formation of a Shear Flow Z Pinch", Physics of Plasmas, vol. 12, 062505, Jun. 2005, 10 pages.

Hakim, A. et al., "A High Resolution Wave Propagation Scheme for Ideal Two-Fluid Plasma Equations" Journal of Computational Physics, vol. 219, Issue 1, Nov. 20, 2006, pp. 418-442.

Hammer, P. C., et al. "Numerical Integration over Simplexes and Cones", Mathematical Tables and Other Aids to Computation, 1956, 8 pages.

Hartman, C. W. et al., "A Conceptual Fusion Reactor Based on the High-Plasma-Density Z-Pinch", Nuclear Fusion, vol. 17, Issue 5, 1977, pp. 909-917.

Hartman, C. W. et al., "Sheared Flow Stabilization of the m=1 Kink Mode in Z Pinches", Physical Review Letters, vol. 75, No. 18, Oct. 30, 1995, pp. 3285-3288.

Hartman, C. W. et al., "The Flow-Through Z-Pinch for Fusion Energy Production", Fusion Technology vol. 26, Nov. 1994, pp. 1203-1206.

Hartman, C. W., et al., "Magnetic Confinement Fusion and the Continuous-Flow Pinch", Comments Plasma Phys. Controlled Fusion, 1996, vol. 17, No. 5, pp. 267-275.

Hesthaven, Jan S. et al., "Nonlinear Problems", Chapter 5, Nodal Discontinuous Galerkin Methods, Algorithms, Analysis, and Applications, Springer, 2008, 60 pages.

Hesthaven, Jan S., et al., "Curvilinear Elements and Nonconforming Discretizations", Chapter 9, Nodal Discontinuous Galerkin Methods, Algorithms, Analysis, and Applications, Springer, 2008, 40 pages.

Hesthaven, Jan S., et al., "Higher-order Equations", Chapter 7, Nodal Discontinuous Galerkin Methods, Algorithms, Analysis, and Applicaitons, Springer, 2008, 94 pages.

Jiang, Bo-Nan et al.,"The Origin of Spurious Solutions in Computational Electromagnetics", Journal of Computational Physics, vol. 125, 1996, pp. 104-123.

Kadomtsev, B. B., "Convective Pinch Instability", Soviet Physics Jetp, vol. 37, No. 4, Apr. 1960, pp. 780-783.

Kadomtsev, B. B., "Hydromagnetic Stability of a Plasma", In M.A. Leontovitch, editor, Rev. Plasma Phys., vol. 2, New York, NY, 1966, pp. 153-199.

Loebner, K. et al., "Radial Magnetic Compression in the Expelled Jet of a Plasma Deflagration Accelerator", Applied Physics Letters, vol. 108, Mar. 3, 2016, 6 pages.

(56) References Cited

OTHER PUBLICATIONS

Loverich, J. et al., "A Discontinuous Galerkin Method for the Full Two-Fluid Plasma Model" Computer Physics Communication, vol. 169, 2005, pp. 251-255.
Loverich, J. et al., "Nonlinear Full Two-Fluid Study of m=0 Sausage Instabilities in an Axisymmetric Z Pinch", Physics of Plasmas vol. 13, 2006, American Institute of Physics, 9 pages.
Miller, Sean, "Modeling Collisional Processes in Plasmas Using Discontinuous Numerical Methods", PhD Dissertation, 2016, 219 pages.
Paraschiv, I. et al., "Linear and Nonlinear Development of m=0 Instability in a Diffuse Bennett Z-pinch Equilibrium and Sheared Axial Flow", Physics of Plasmas vol. 17, 072107, Jul. 27, 2010, 11 pages.
Ryutov, D. D. et al., "The Physics of Fast Z Pinches", Review of Modern Physics, 2000, pp. 167-224.
Shumlak, U. et al., "Advanced Physics Calculations Using a Multi-fluid Plasma Model", Computer Physics Communications vol. 182, 2011, pp. 1767-1770.
Shumlak, U. et al., "Approximate Riemann Solver for the Two-Fluid Plasma Model" Journal of Computational Physics vol. 187, 2003, pp. 620-638.
Shumlak, U. et al., "Equilibrium Evolution in the ZaP Flow Z-Pinch", Journal of Fusion Energy, Jun. 2007, 26 pages.
Shumlak, U. et al., "Equilibrium, Flow Shear and Stability Measurements in the Z-pinch", Nuclear Fusion, vol. 49, IOP Publishing and International Atomic Energy Agency, Jul. 2009, 10 pages.
Shumlak, U. et al., "Evidence of Stabilization in the Z-Pinch", Physical Review Letters, vol. 87, No. 20, The American Physical Society, Nov. 12, 2001, 4 pages.
Shumlak, U. et al., "Increasing Plasma Parameters Using Sheared Flow Stabilization of a Z-pinch", Physics of Plasmas, vol. 24, 055702, 2017, 11 pages.
Shumlak, U. et al., "Sheared Flow Stabilization Experiments in the ZaP Flow Z Pinch", Physics of Plasmas, vol. 10, No. 5, May 2003, 8 pp. 1683-1690.
Shumlak, U., "Z Pinch Fusion" Journal of Applied Physics vol. 127, 200901, May 27, 2020, 11 pages.
Simakov, A. N., et al., "Resistive Stability of Magnetic Dipole and Other Axisymmetric Closed Filed Line Configurations", Physics of Plasmas, Aug. 15, 2002, 31 pages.
Stepanov, A. D. et al., "Flow Z-Pinch Plasma Production on the FuZE Experiment", Physics of Plasmas, vol. 27, Issue 11, Sep. 2020, 32 pages.
Stonikov, V. I. et al., "Linear Analysis of Sheared Flow Stabilization of Global Magnetohydrodynamic Instabilities Based on the Hall Fluid Model" Physics of Plasmas, vol. 9, No. 3, Mar. 2002, pp. 913-922.
Tayler, R. J., "Hydromagnetic Instabilities of an Ideally Conducting Fluid", Proceedings of the Physical Society, Section B, Nov. 8, 1956, pp. 31-48.
Tummel, K. et al., "Kinetic Simulations of Sheared Flow Stabilization in High-Temperature Z-pinch Plasmas", Physics of Plasmas, vol. 26, Issue 6, Feb. 7, 2019, 9 pages.
Vogman, G. V. et al., "Conservative Fourth-order Finite-volume Vlasov-Poisson Solver for Axisymmetric Plasmas in Cylindrical (r,vr,v?) phase Space Coordinates", Journal of Computational Physics, vol. 373, 2018, pp. 877-899.
Vogman, G. V. et al., "Two-Fluid and Kinetic Transport Physics of Kelvin-Helmholtz Instabilites in Nonuniform Low-Beta Plasmas", Physics of Plasmas, vol. 27, May 15, 2020, 30 pages.
Zhang, Y. et al., "Sustained Neutron Production from a Sheared-Flow Stabilized Z Pinch", Physical Review Letters, vol. 122, 135001, 2019, 7 pages.
The International Searching Authority, "Search Report and Written Opinion", in Application No. PCT/US2022/031388, dated Feb. 6, 2023, 12 pages.
The International Searching Authority, "Search Report and Written Opinion", in Application No. PCT/US2022/031376, dated Feb. 6, 2023, 11 pages.
Mitrani, James M. et al., "Thermonuclear Neutron Emission from a Sheared-flow Stabilized Z-pinch", Physics of Plasmas, vol. 28, Issue 11, Published online Nov. 23, 2021, 10 pages.
Tummel, Kurt, et al., "2D Kinetic Particle in Cell Simulations of a Flow-Shear Stabilized Z-Pinch", 59th Annual Meeting of the APS Division of Plasma Physics, vol. 62, No. 12, Submitted Jul. 14, 2017, 1 page.
Levitt, B., et al., "Zap Energy Sheared-Flow-Stabilized Z-Pinch Reactor Results and Concept", 2022 IEEE International Conference on Plasma Science (ICOPS), Seattle, WA, USA, May 2022, 1 page.
Claveau, Elliot, et al., Observation of a Stagnation Wave in the Fusion Z-pinch Experiment (FuZE), 62nd Annual Meeting of the APS Division of Plasma Physics, vol. 65, No. 11, Submitted Jun. 29, 2020, 1 page.
Mitrani, James M., et al., "Evidence for Thermonuclear Neutron Production on a Sheared-flow Stabilized (SFS) Z-pinch", 61st Annual Meeting of the APS Division of Plasma Physics, vol. 64, No. 11, Submitted Jul. 3, 2019, 1 page.
Forbes, Eleanor, et al., "Diagnostic Development for Spatio-Temporal Resolution of a Sheared Flow Stabilized Z-Pinch", 61st Annual Meeting of the APS Division of Plasma Physics, vol. 64, No. 11, Submitted Jul. 2, 2019, 1 page.
Weber, Tobin, et al., "High Resolution Digital Holographic Interferometry on the Fusion Z-pinch Experiment FuZE", 60th Annual Meeting of the APS Division of Plasma Physics, vol. 63, No. 11, Submitted Nov. 2018, 1 page.
Golingo, Raymond, et al., "Increasing Neutron Production in the FuZE Experiment by Optimizing the Neutral Fill Profile and the Current Waveform", 60th Annual Meeting of the APS Division of Plasma Physics, vol. 63, No. 11, Nov. 2018, 1 page.
Mitrani, James, et al., "Temporally and Spatially Resolved Measurements of Neutron Production in a Sheared-flow Stabilized (SFS) Z-pinch", 60th Annual Meeting of the APS Division of Plasma Physics, vol. 63, No. 11, Nov. 2018, 1 page.
Knecht, Sean, et al., "Results of the ZaP FLow Z-Pinch Inner Electrode Upgrade", 49th Annual Meeting of the Division of Plasma Physics, vol. 52, No. 11, Submitted Jul. 23, 2007, 1 page.
Tummel, Kurt et al., "2D Kinetic Particle in Cell Simulations of a Shear-Flow Stabilized Z-Pinch", 58th Annual Meeting of the APS Division of Plasma Physics, vol. 61, No. 18, Submitted Jul. 12, 2016, 1 page.
Meier, E.T., et al., "A General Nonlinear Fluid Model for Reacting Plasma-Neutral Mixtures", Physics of Plasmas, vol. 19, Issue 7, Jul. 18, 2018, 25 pages.
Claveau, Elliot L., et al., "Observation and Analysis of Thermonuclear Neutron Production in a Sheared-flow-stabilized Z-pinch", 60th Annual Meeting of the APS Division of Plasma Physics, vol. 63, No. 11, Nov. 2018, 1 page.

\* cited by examiner

APPARATUS AND METHOD FOR EXTENDED PLASMA CONFINEMENT

CROSS-REFERENCE TO RELATED APPLICATIONS

This application is a continuation of U.S. patent application Ser. No. 17/827,379, entitled "APPARATUS AND METHOD FOR EXTENDED PLASMA CONFINEMENT," and filed on May 27, 2022, which claims priority to each of U.S. Provisional Application No. 63/194,866, entitled "APPARATUS AND METHOD FOR EXTENDED PLASMA CONFINEMENT," and filed on May 28, 2021, and U.S. Provisional Application No. 63/194,877, entitled "ELECTRODE CONFIGURATION FOR EXTENDED PLASMA CONFINEMENT," and filed on May 28, 2021. The entire contents of each of the above-identified applications are hereby incorporated by reference for all purposes.

STATEMENT REGARDING FEDERALLY SPONSORED RESEARCH OR DEVELOPMENT

This invention was made, at least in part, with government support under Grant Nos. DE-AR001010 and DE-AR001260 awarded by the United States Department of Energy. The government has certain rights in the invention.

BACKGROUND

Unless otherwise indicated herein, the recitations disclosed in this section are not considered to be prior art to the claims in this application and are not admitted to be prior art by inclusion in this section.

Nuclear fusion is the process of combining two nuclei. If the two nuclei of elements with atomic numbers less than 26 [that is, with a lower atomic number than iron (Fe)] are fused, energy is released. The release of energy is due to a slight difference in mass between reactants and products of the fusion reaction (e.g., in high-temperature fusion plasma reactors), as governed by the expression $E=mc^2$.

Nuclear fusion holds the promise of effectively limitless energy with more manageable waste products than some existing energy sources.

Controlled nuclear fusion in fusion plasmas, with plasma reactions sustained over extensive time periods, may be stymied by fast growing plasma instabilities. A viable approach to such controlled nuclear fusion (also below noted as "controlled fusion" or just "fusion," as noun or adjective indicating nuclear fusion related features and/or properties) continues to be pursued through the study of different plasma confinement approaches. Such approaches confer distinct advantages across varying levels of scientific maturity.

BRIEF DESCRIPTION OF THE DRAWINGS

The above and other embodiments, features, and aspects of the present invention are considered in more detail in relation to the following description of embodiments shown in the accompanying drawings, in which.

DETAILED DESCRIPTION

Embodiments of the present disclosure may be better understood by referring to the following descriptions, which should be read in conjunction with the accompanying drawings of particular exemplary embodiments. This description of the illustrated embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present disclosure. Those skilled in the art should also understand that such equivalent assemblies do not depart from the spirit and scope of the disclosure in its broadest form.

In some examples, typical power supply devices and methods arranged to form and sustain an axial Z-pinch current may be ill-suited or wholly unable to generate and sustain sufficient sheared velocity axial flow usable for stabilization of Z-pinch plasmas. Accordingly, described herein are embodiments of devices and processes for generation and sustainment of sufficient sheared velocity flow in the transitional medium associated with boundary regions of Z-pinch discharges.

A fusion device based on the Z-pinch [e.g., U. Shumlak, B. A. Nelson, E. L. Claveau, E. G. Forbes, R. P. Golingo, M. C. Hughes, R. J. Oberto, M. P. Ross, and T. R. Weber, "Increasing plasma parameters using sheared flow stabilization of a Z-pinch," *Phys. Plasmas* 24, 055702 (2017); "Shumlak '17"; incorporated herein by reference] may be attractive since it would be geometrically simple, inherently compact, and relatively low-cost. Some more recent publications [e.g., U. Shumlak, "Z-pinch fusion," *J. Appl. Phys.* 127, 200901 (2020); published online: 27 May 2020; "Shumlak '20"; also incorporated by reference] further elaborate on sheared-flow stabilization (SFS) to produce an equilibrium Z pinch, which may sustain a compressed plasma state for durations appreciably longer than other plasma timescales.

Figure 3:
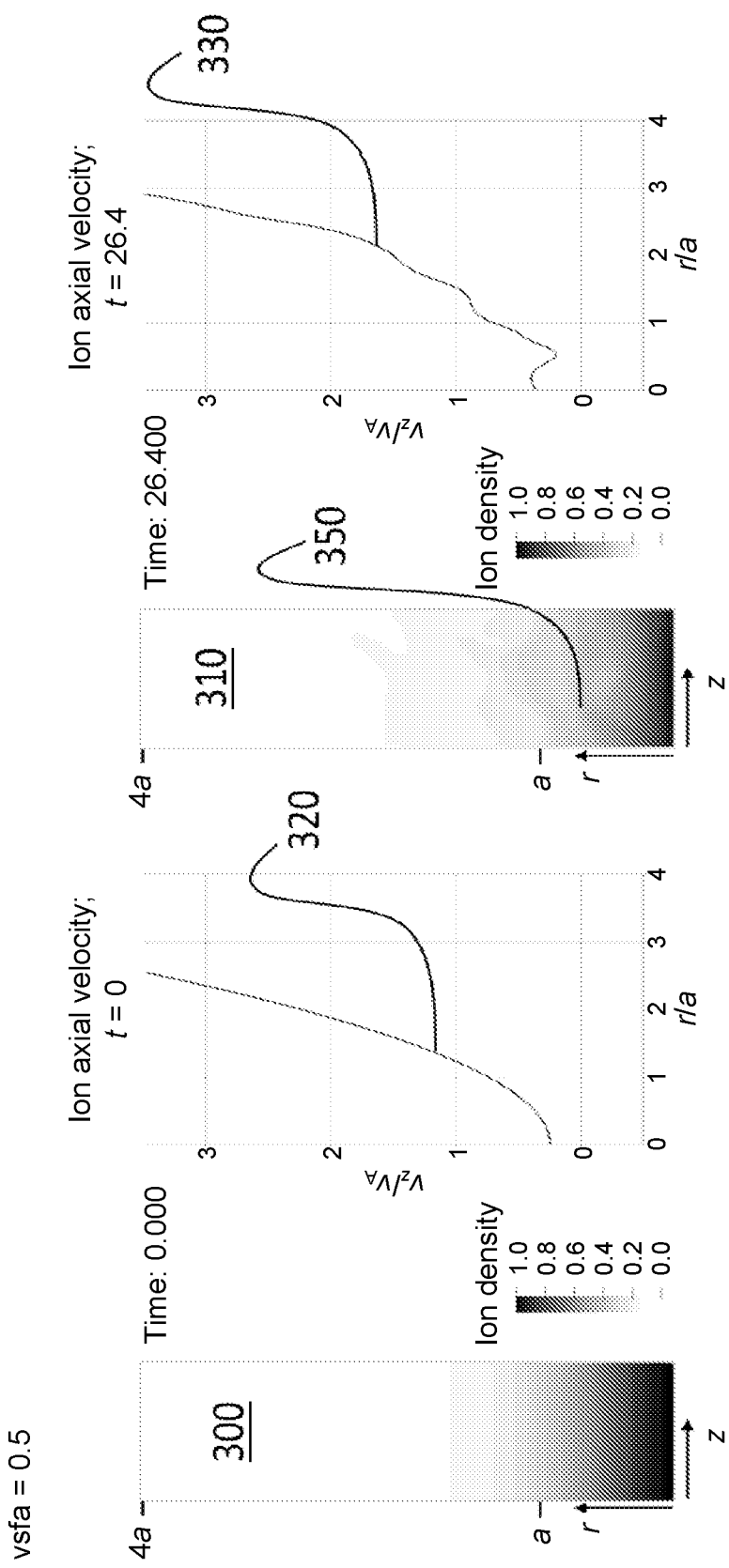
FIG. 3 illustrates modeling results of a sheared velocity flow stabilized Z pinch, in accordance with at least one embodiment.

One area of sheared flow optimization pertains to augmented control of both neutral and ionized gas feeding into an evacuated volume of an acceleration volume of a Z-pinch apparatus. An example of a preexisting device may be found in FIG. 3 of Shumlak '20, illustrating a schematic cross sectional-view of a vacuum vessel of the Fusion Z-pinch Experiment (FuZE) SFS Z-pinch experimental device. In FIG. 3, one internal gas-puff valve is arranged substantially at a middle axial position of the acceleration volume to provide a portion of chosen neutral filling gas through the "Inner Electrode" (when the term "substantially" is used herein, it is meant that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide). Additional (external) gas-puff valves are illustrated substantially at the same axial position radially opposite to the internal gas-puff valve and arranged to provide a separate portion of the filling gas through openings in the "Outer Electrode" of the FuZE SFS Z-pinch experimental device.

The arrangement illustrated in FIG. 3 of Shumlak '20 depends upon neutral gas diffusion from the gas-puff valves' locations into the surrounding evacuated volumes for creation of substantially axisymmetric neutral gas density profiles generally having maxima at the puff-valves' axial position. Such profiles may provide sufficient fuel gas to drive the sheared velocity flow for a duration of time commensurate with a duration of the Z-pinch discharges. After exhaustion of a neutral gas inventory (for example, because of driven outflow around the Z-pinch plasma column and/or diffusion of gas into other regions of the enclosed volume), the Z-pinch current may decay because of instabilities even if at least a portion of energy from high-voltage power supplies is still available. For purposes of augmenting and improving the sheared flow profile created by neutral gas injection, injection of pre-ionized gas using plasma injectors, plasma guns, or ion sources may be employed in conjunction.

Accordingly, in at least one embodiment, one or more valves (e.g., one or more gas-puff valves and one or more plasma injectors) may be fluidly coupled to a fuel gas supply and configured to direct sufficient fuel gas (e.g., the neutral gas and/or the pre-ionized gas) sourced from the fuel gas supply to drive the sheared velocity plasma flow for the duration of each of the Z-pinch discharges. Specifically, in one such embodiment, sufficient neutral gas may be directed to support a localized breakdown path between inner and outer electrodes and to establish the sheared velocity plasma flow. In an additional or alternative embodiment, sufficient pre-ionized gas may be directed to maintain the sheared velocity plasma flow (e.g., to replenish the neutral gas).

Pertinent to the methods and devices described herein, the sheared velocity flow stabilization is supported at least by the following modeling results. The axisymmetric plasma configuration representative of the FuZE SFS Z-pinch experimental device has been simulated using the WARPXM computer code [U. Shumlak, R. Lilly, N. Reddell, E. Sousa, and B. Srinivasan, "Advanced physics calculations using a multi-fluid plasma model." *Comput. Phys. Comm.* 182, 1767 (2011)] based upon a nonlinear five-moment, two-fluid (5M2F) plasma model. This model includes Braginskii-based viscosity and thermal conduction effects.

Figure 1:
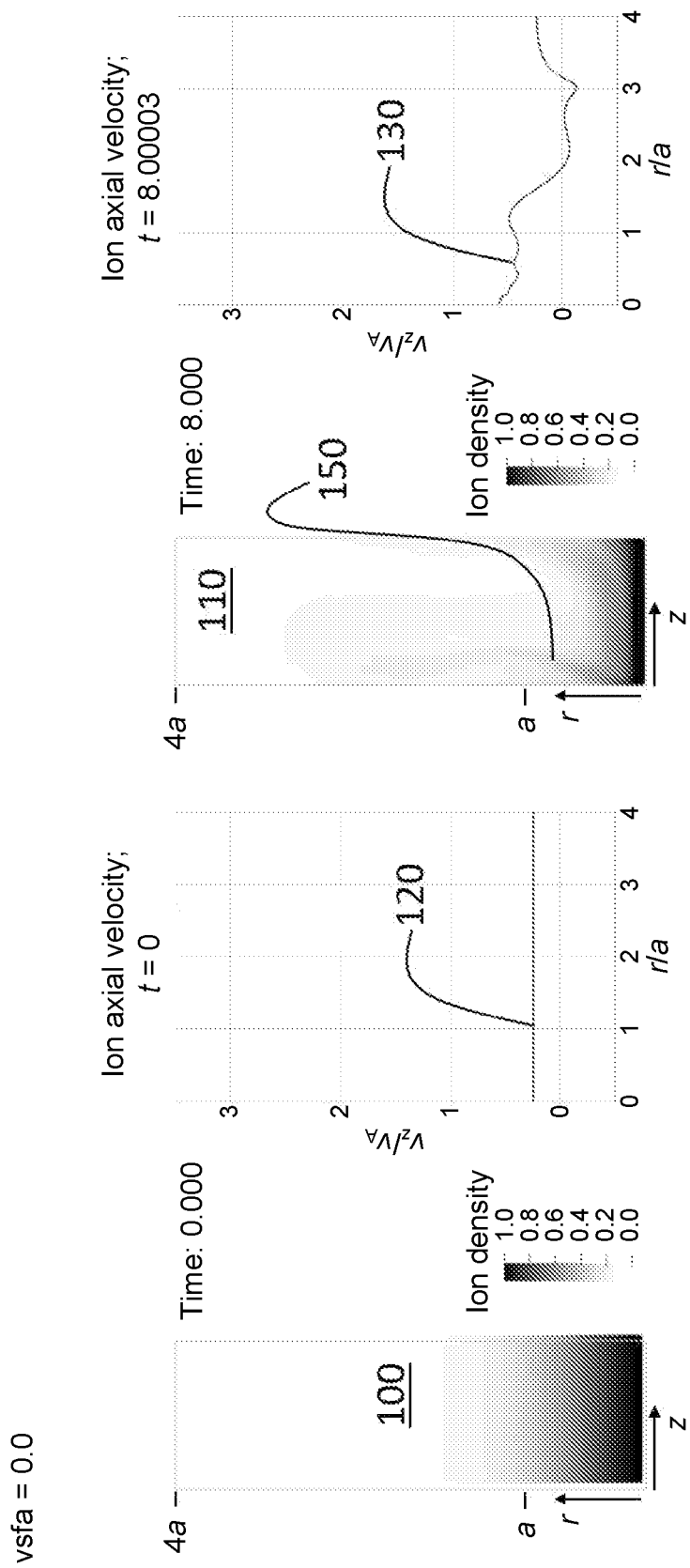
FIG. 1 illustrates modeling results of a Z pinch with no sheared velocity flow, in accordance with at least one embodiment.
Figure 2:
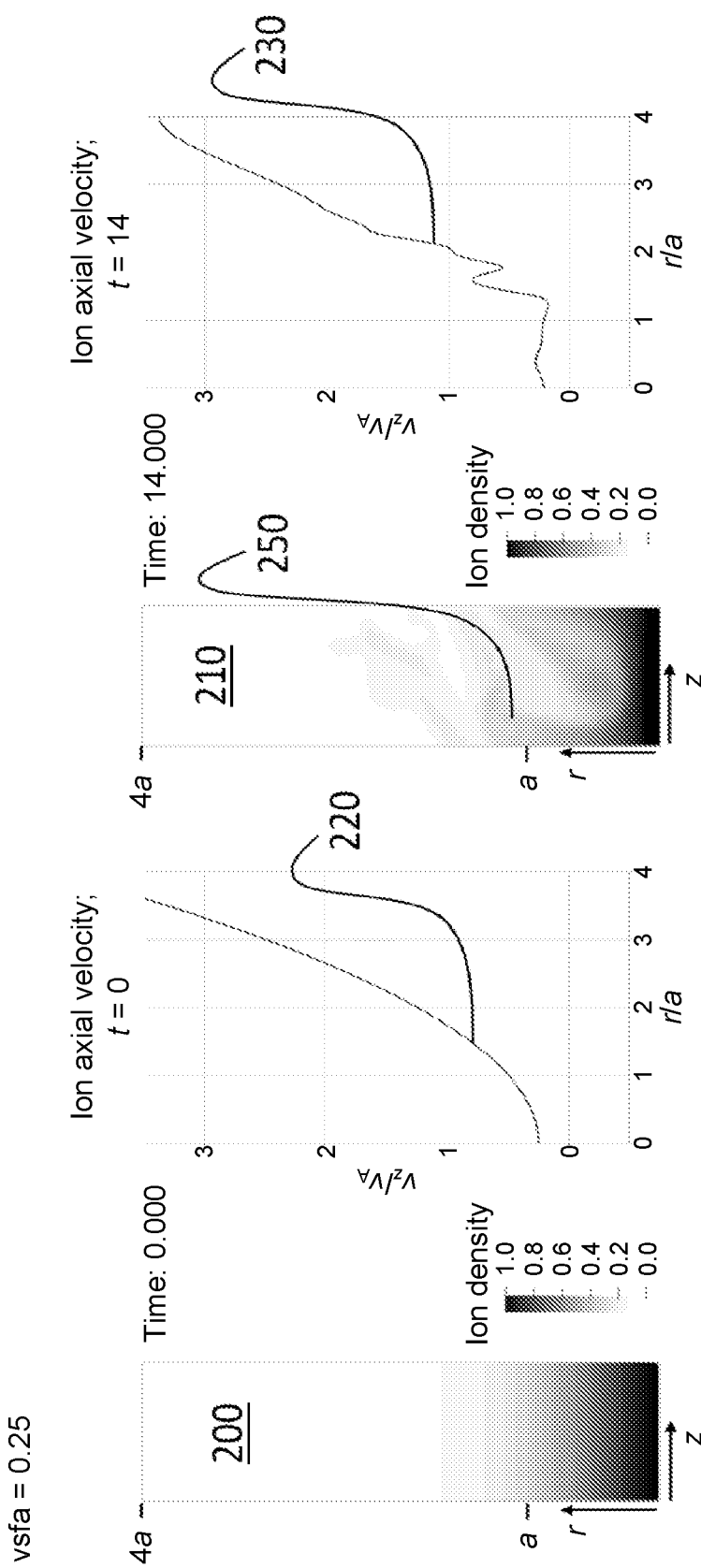
FIG. 2 illustrates modeling results of a sheared velocity flow stabilized Z pinch, in accordance with at least one embodiment.
Figure 4:
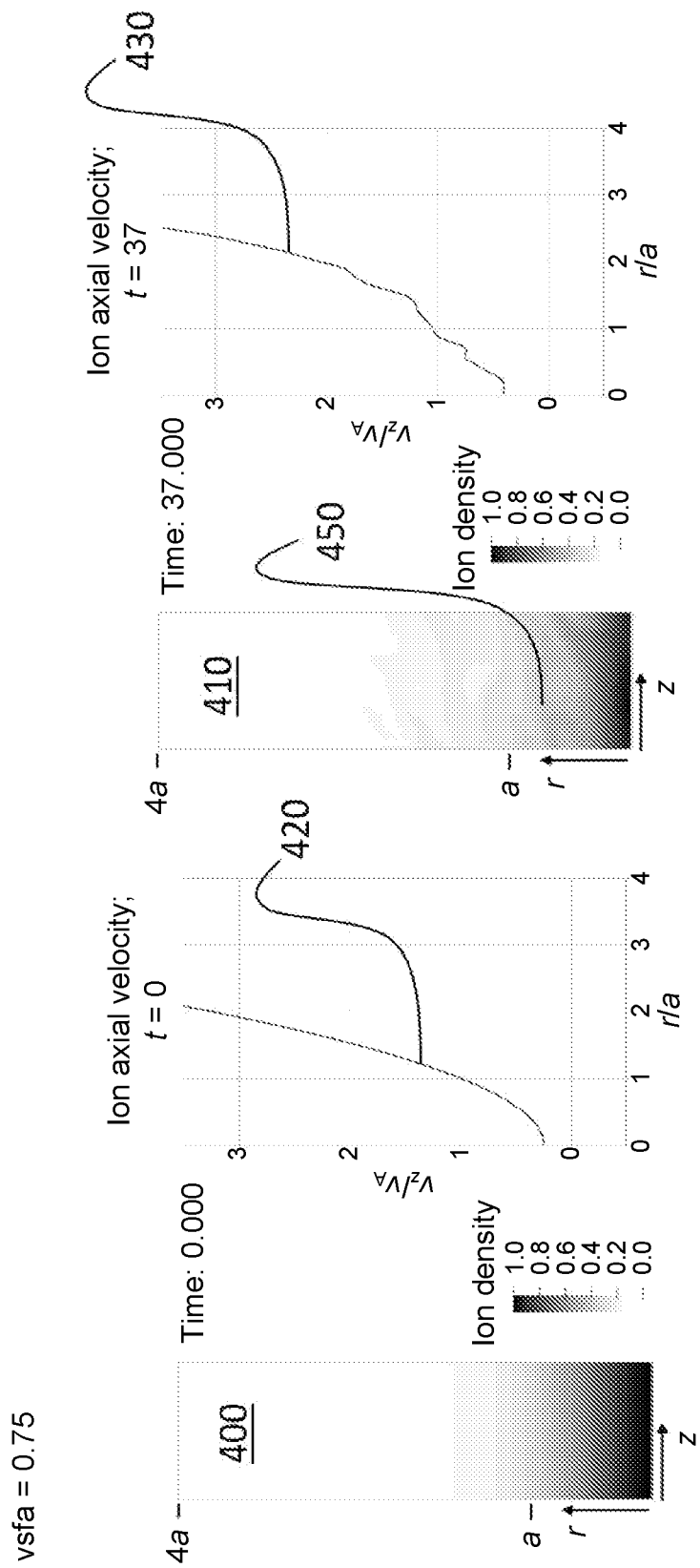
FIG. 4 illustrates modeling results of a sheared velocity flow stabilized Z pinch, in accordance with at least one embodiment.

Some selected simulation results are illustrated in FIGS. 1-5. The results for no sheared velocity flow are illustrated for reference in FIG. 1. The results for three cases with three different parabolic sheared flow velocity profiles are illustrated in FIGS. 2-4. The cases may be distinguished by different sheared flow velocity values "vsfa" at r=a (where a is the nominal radius of the Z-pinch plasma) normalized by the characteristic Alfvén speed $v_A$ at the pinch edge (r=a). Initial conditions (t=0) for the illustrated cases include Bennett equilibria with peak densities of $4 \times 10^{24}$ m$^{-3}$, ion and electron temperatures of 1.27 keV, and peak magnetic fields of 33.0 T. The effective pinch radius (a) is 0.91 mm.

The simulations use a specific normalized diffusivity limit (difflim=32 m$^2 \cdot$s$^{-1}$) and impose a minimum diffusivity (diffmin=3.2 m$^2 \cdot$s$^{-1}$). The electrons are given viscosity with a diffusivity level equal to the minimum diffusivity. A perturbation is used in each case to trigger a mode with wavelength equal to the axial length of the domain.

In FIG. 1, vsfa=0.0 indicates the reference case having no shear velocity flow. Snapshots of two-dimensional (r/z) cross sections 100 and 110 of normalized ion densities at time points t=0.000 (corresponding to establishment of the unperturbed Z-pinch plasma column) and t=8.000 (normalized to the radial Alfvén time $\tau_A$), respectively, are illustrated in grayscale. In addition, axial velocity ($v_z$) profiles 120 and 130 (normalized by the characteristic Alfvén speed $v_A$) have substantially no shear, as illustrated in the $v_z/v_A$ versus r/a graphs of FIG. 1.

The case represented in FIG. 1 supports an understanding that a Z pinch with no stabilization exhibits fast growing instabilities, for example, indicated by density perturbations 150 exhibiting substantial plasma ion losses growing in a relatively small number of Alfvén time scale units measured by the time needed for a magnetized plasma perturbation to propagate from the axis (r=0) to the edge (r=a) of the unperturbed plasma column.

Three additional modeling results of a sheared velocity flow stabilized Z pinch are illustrated in FIGS. 2-4. The case illustrated in FIG. 2 is characterized by vsfa=0.25. Snapshots of two-dimensional (r/z) cross sections 200 and 210 of normalized ion densities at time points t=0.000 (corresponding to establishment of the unperturbed Z-pinch plasma column) and t=14.000 (normalized to $\tau_A$), respectively, are illustrated in grayscale. An initial (t=0) parabolic sheared velocity profile 220 evolves into profile 230 at the (normalized) time t=14, still exhibiting substantial shear outside the initial plasma column boundary r=a. Ion density perturbations 250, although detectable, are predominantly localized at radii commensurate to the initial r=a radius of the unperturbed Z-pinch plasma column.

The case illustrated in FIG. 3, characterized by vsfa=0.5, illustrates stronger stabilization effects relative to the cases illustrated by FIGS. 1 and 2. Snapshots of two-dimensional (r/z) cross sections 300 and 310 of normalized ion densities at time points t=0.000 (corresponding to establishment of the unperturbed Z-pinch plasma column) and t=26.400 (normalized to $\tau_A$), respectively, are illustrated in grayscale. An initial (t=0) parabolic sheared velocity profile 320 evolves into a perturbed ion axial velocity profile 330 at the (normalized) time t=26.4, exhibiting nearly parabolic radial dependency and substantial shear outside the initial plasma column boundary r/a=1. Ion density perturbations 350 are predominantly localized to a volume inside the plasma column (r<a).

The case illustrated in FIG. 4 is characterized by vsfa=0.75. The results in FIG. 4 illustrate stronger sheared-flow stabilization effects relative to the cases illustrated by FIGS. 1-3. Snapshots of two-dimensional (r/z) cross sections 400 and 410 of normalized ion densities at time points t=0.000 (corresponding to establishment of the unperturbed Z-pinch plasma column) and t=37.000 (normalized to $\tau_A$), respectively, are illustrated in grayscale. An initial (t=0) parabolic ion axial sheared velocity profile 420 evolves into a (slightly) perturbed ion axial velocity profile 430 at the (normalized) time t=37, exhibiting substantially parabolic radial dependency. Ion density perturbations 450 are predominantly localized to a volume inside the plasma column (r<a).

Figure 5:
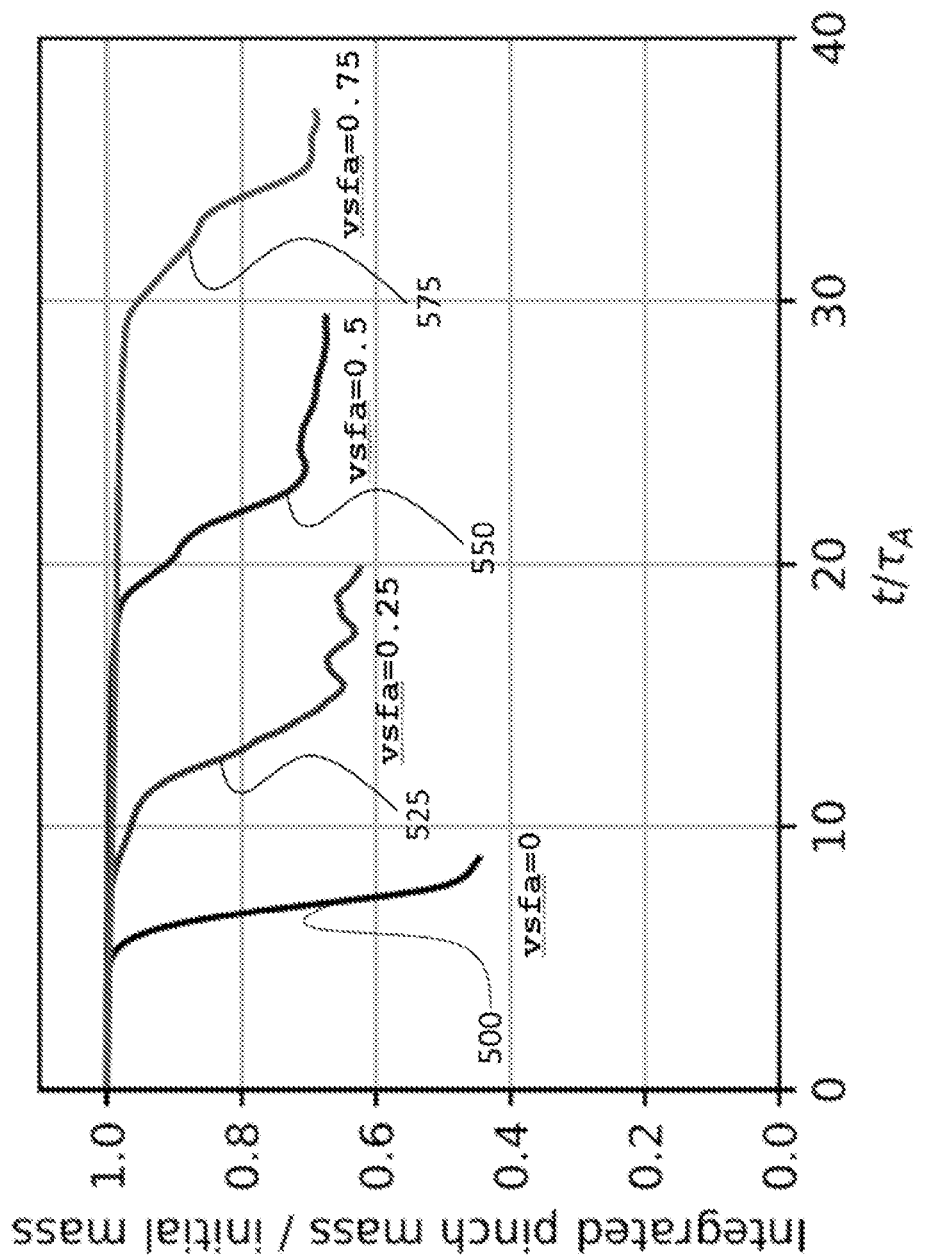
FIG. 5 illustrates results of integrated Z pinch masses, in accordance with at least one embodiment.

Some consequences of the WARPXM computer code are illustrated in FIG. 5. The graphic depicted in FIG. 5 illustrates time dependence of the integrated Z-pinch mass over $t/\tau_A$ (a normalized time corresponding to the normalized time t in FIGS. 1-4). The dependence in FIG. 5 emphasizes effects of the sheared flow velocity values characterized by the "vsfa" values. It may be observed that, for the case having no stabilization (vsfa=0.0), while the confinement of the Z-pinch plasma starts to degrade after t=5 (marked by an initial decay of normalized mass 500) and exhibits significant loss by nominal time t=8.0, the corresponding mass ratios 525, 550, and 575 (vsfa=0.25, 0.5, and 0.75, respectively) exhibit increasingly enhanced plasma confinement, indicating that stabilized Z-pinch plasma may be sustained as long as sufficient axial plasma current is supplied, and sufficient sheared, azimuthally symmetric ion velocity flow surrounding the plasma column is generated and maintained.

At least in context of the above, embodiments of devices and methods for generation and maintaining of azimuthally symmetric sheared ion velocity flow in accordance with the present disclosure are recited below. Some components of a particular embodiment of a plasma (confinement) device for a stabilized Z pinch are illustrated in FIGS. 6A and 6B in an isometric view 600 (FIG. 6A) and a cross-sectional view 610 (FIG. 6B).

Figure 6A:
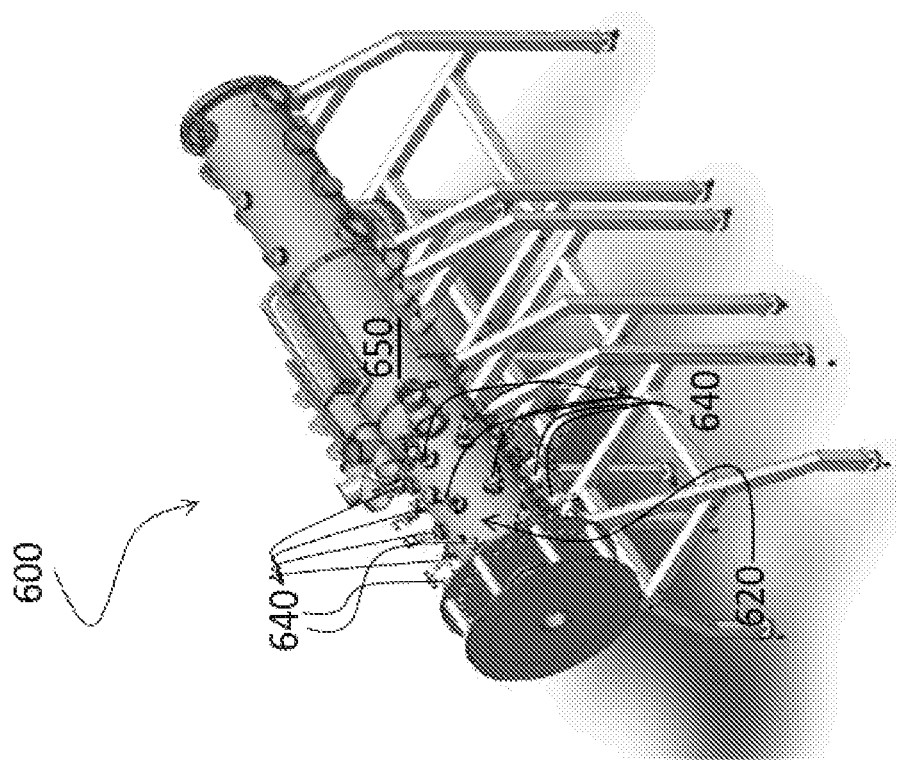
FIG. 6A shows an isometric view of a device to generate and maintain an azimuthally symmetric sheared ion velocity flow, in accordance with at least one embodiment.
Figure 6B:
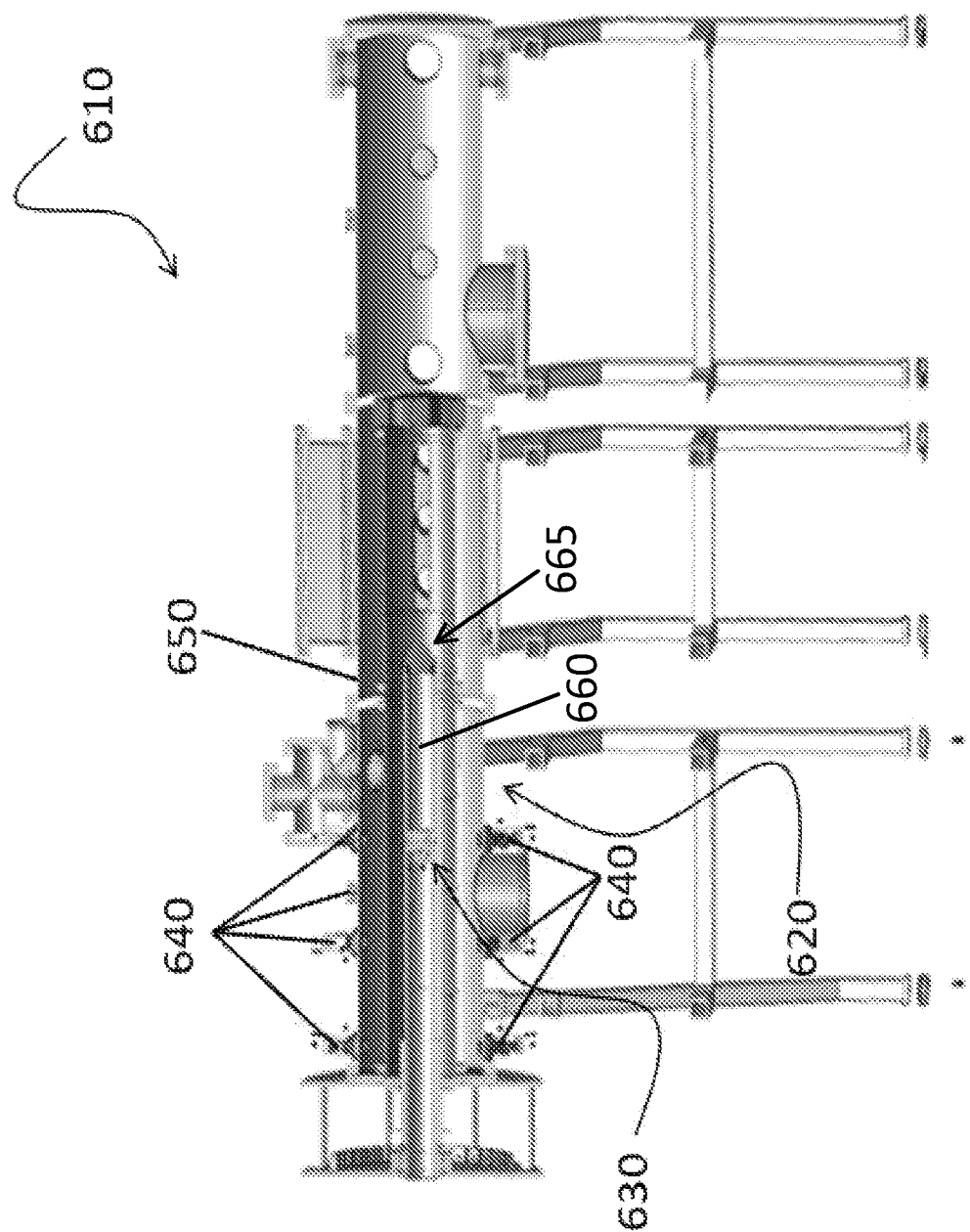
FIG. 6B shows a cross-sectional view of the device shown in FIG. 6A.

In general, the Z-pinch plasma device having a vacuum vessel as illustrated in FIGS. 6A and 6B (with associated systems, such as electrical cables and conduits, vacuum pumps and ducts, diagnostic feedthroughs, optical windows, and the like, omitted for clarity) may be enlarged relative to certain other Z-pinch plasma devices, at least excepting the neutral gas feeding valves (discussed in detail below) pertinent to the processes of improved sheared azimuthal velocity flow generation and maintenance as per certain embodiments provided in the present disclosure.

More particularly, in at least one embodiment, an acceleration volume 620 may be increased relative to that of certain other Z-pinch plasma devices and arranged to be filled by a gas mixture (e.g., a neutral working gas mixture) via at least one internal valve 630, such as at least one gas-puff valve (to provide neutral gas to the acceleration volume 620) and/or plasma injector 630 (to provide pre-ionized gas to the acceleration volume 620), arranged substantially along a central axis of the acceleration volume 620. Additionally or alternatively, a plurality of external valves, such as a plurality of gas-puff valves (to provide neutral gas to the acceleration volume 620) and/or plasma injectors 640 (to provide pre-ionized gas to the acceleration volume 620), may be installed as a regular array on an external vacuum boundary which may be arranged as an external, or outer, electrode 650.

Depending upon the particular embodiments, the gas-puff valves and/or plasma injectors 630, 640 may be electronically triggered to deliver a "puff" of filling neutral and/or pre-ionized gas to start at a starting time programmable down to a fraction of a ms and have a duration up to several hundred µs (e.g., up to 1 ms). An amount of filling gas (also referred to herein as "fuel gas") delivered (e.g., in the "puff") may also be controlled by adjustments of a filling gas pressure supplied to the gas-puff valves and/or plasma injectors 630, 640, either individually or as a chosen subset of valves (where a subset of valves may include only a portion of valves and/or injectors 630, 640 or all valves and/or injectors 630, 640). In addition, different valves and/or injectors 630, 640 (or different combinations of multiple valves and/or injectors 630, 640) may be fed by different fill gas mixtures having, for example different elemental ratios of filling gases and/or different isotopic ratios (e.g., adjustable $D_2/T_2$ molecular ratios). In at least one embodiment, the various gas-puff valves and/or plasma injectors may be uniform (e.g., all of the same type/size with all the same operational settings, if so configurable), although in other embodiments, different valves may be used for different locations. In additional or alternative embodiments, one or more gas-puff or other gas valves and/or plasma injectors may control a flow of gas into the acceleration volume 620 via a manifold including multiple ports providing passage into the acceleration volume 620. In such embodiments, the ports of the manifold may be uniform or may vary in configuration (e.g., to deliver different amounts of gas to different locations of the acceleration volume 620 when a respective valve is open).

Similar to neutral gas injection via gas-puff valves, ionized gas or plasma may be injected using combinations or manifolds of variously located plasma injectors. Plasmas formed from gas mixtures may also be created and injected in a manner similar to neutral gas injection. Plasma injection may provide a finer control of an eventual axial plasma distribution as well as a shear flow profile thereof, which in turn may allow for higher fidelity control of plasma stability and lifetime. Additional control of plasma injection may be provided due to the plasma particles being charged particles that may be accelerated by electric fields created by a variable electrical bias (or voltage) on injection electrodes. Thus, a speed of the injected plasma may be finely controlled to allow for fine adjustment and optimization of breakdown of any neutral gas present (e.g., in the acceleration volume 620). Moreover, the injected plasma may travel at faster velocities than injected neutral gas, which may travel in a nearly static fashion (relative to the injected plasma) during Z-pinch discharge pulses. As such, relative to neutral gas injection, plasma injection may provide pre-ionized fuel "on demand" (e.g., more immediately), for example, to replenish the fuel gas during Z-pinch discharge pulses.

In some embodiments, plasma to be injected into the acceleration volume 620 may be generated by pre-ionizing neutral gas with a spark plug or via inductive ionization. More broadly, the gas-puff valves and/or plasma injectors 630, 640 may include one or more electrode plasma injectors and/or one or more electrodeless plasma injectors. In examples wherein the one or more electrode plasma injectors are included, the plasma to be injected into the acceleration volume 620 may be generated, at least in part, by electrode discharge. In additional or alternative examples wherein the one or more electrodeless plasma injectors are included, the plasma to be injected into the acceleration volume 620 may be generated, at least in part, by inductive discharge produced by an external coil window (e.g., a radio-frequency antenna operating at 400 kHz, 13.56 MHz, 2.45 GHz, and/or other frequencies permitted for use in a given local jurisdiction, e.g., within frequency ranges permitted by the Federal Communications Commission). In some embodiments, neutral gas for pre-ionization may be limited by a configuration of a neutral gas reservoir (not shown in FIGS. 6A and 6B) and/or neutral gas conductance to a selected plasma injector configuration.

In some embodiments, axial distribution of the injected plasma may be ensured via an axisymmetric plasma injector configuration. In at least one embodiment, eight plasma injectors 640 may be respectively positioned at eight equally spaced ports of the manifold. The eight ports may each be configured at an oblique angle (e.g., between 5° and 90° with respect to the central axis of the acceleration volume 620) with respect to a housing of the acceleration volume 620. In one example, the oblique angle may be 45° with respect to the central axis of the acceleration volume 620. In some embodiments, the eight ports may be configured at a single axial position along the central axis of the acceleration volume 620 (that is, the eight ports may be equally spaced about a circumference or other perimeter of the acceleration volume 620 at the axial position). In other embodiments, the ports may include multiple sets of eight ports, with each set of eight ports being equally spaced about a different axial position along the central axis of the acceleration volume 620. In an example embodiment, the sets of eight ports may be configured as interleaved pairs of sets, wherein a first set of eight ports may be positioned at a first axial location and a second set of eight ports may be positioned at a second, different axial location and rotated relative to the first set such that each port of the second set is positioned between a pair of ports of the first set with respect to the circumference of the acceleration volume 620. Specifically, in such an embodiment, each port of the first set of eight ports may be spaced around the circumference of the acceleration volume 620 every 45°, and each port of the second set of eight ports may be spaced around the circumference of the acceleration volume 620 every 45° offset (rotated from the first set of ports by 22.5°, such that one port of the first and second sets is provided around the circumference of the acceleration volume 620 every 22.5°. In additional or alternative embodiments, plasma injection may be performed azimuthally, e.g., along a chord perpendicular to the central axis of the acceleration volume 620, so as to generate an azimuthal flow within the acceleration volume 620. In additional or alternative embodiments, the valves may be configured differently (e.g., asymmetrically distributed azimuthally and/or with different angular distributions) with other variations to achieve a substantially equivalent profile by compensating for effects of the variations.

In some embodiments, injecting the acceleration volume 620 with pre-ionized gas may result in plasmas having a plasma temperature in a range of 1 to 10 eV. Moreover, and as noted above, because an injection velocity of pre-ionized gas may be significantly greater than that of neutral gas, a velocity of the plasma within the acceleration volume 620 may be up to $50 \times 10^3$ m/s. In some embodiments, injection of pre-ionized gas may provide flexibility in an amount of particles injected. Specifically, in an example embodiment, an amount of pre-ionized gas particles may be injected in 1/50 of a time utilized to inject the same amount of neutral gas particles. For example, an amount of time utilized to inject 10 Torr-L of neutral gas particles (where 1 Torr-L is proportional to $2.5 \times 10^{19}$ molecules at 273 K) may be the same amount of time utilized to inject 500 Torr-L of pre-ionized gas particles. Similarly, in some embodiments, an injection rate (or mass flow rate) of pre-ionized gas may be varied according to power supply current and voltage (that is, a waveform of an injection pulse). As an example, increasing the power supply voltage (e.g., to between 100 V and 500 V) may concomitantly increase the injection velocity. As another example, increasing the power supply current (e.g., to between 1 A and 500 A) may concomitantly increase the injection rate.

Injection of neutral gas in particular may be accomplished through puff valves or through release of hydrogen gas from a metal hydride, e.g., titanium deuteride ($TiD_2$) or other metal hydrides based on scandium, vanadium, or other metals. In some embodiments, the puff valves may be solenoid-driven puff valves (though other configurations may be implemented and are within the scope of the present disclosure).

As discussed above, the at least one internal gas-puff valve and/or plasma injector 630 and the plurality of external gas-puff valves and/or plasma injectors 640 may be activated either individually or in groups. An initial gas load inside the acceleration volume 620 having desired axial and azimuthal profiles may be achieved by timing individual valves or groups of valves. Such valves (or groups thereof) may be timed in a fashion to align an arrival of the neutral and/or pre-ionized gas and/or mixtures thereof to a desired initial profile, such as the embodiments discussed in detail below and illustrated in FIGS. 8 and 10A-10F. Power supplies (not shown at FIGS. 6A and 6B) may be timed to achieve ionization at a desired axial location and utilize the initial gas load to produce and sustain the sheared flow.

Various combinations of (neutral gas) gas-puff valves with plasma injectors may be activated to further adjust (e.g., optimize) such parameters, e.g., to achieve a desired level of power output. Moreover, plasma may be injected into the acceleration volume 620 significantly (e.g., 100×) faster than puffed neutral gas. A combination of such different injection speeds allowed by acceleration of plasma injection with neutral gas injection provides an even larger parameter space for optimization. Additionally, plasma injectors may serve to inject mass and carefully control locations of neutral gas ionization.

The embodiment illustrated in FIGS. 6A and 6B incorporates the acceleration volume 620 prefabricated so as to incorporate connectors or other coupling elements for the at least one internal gas-puff valve and/or plasma injector 630 extending from within an internal, or inner, electrode 660. For example, the at least one internal gas-puff valve and/or plasma injector 630 [and respective coupling element(s)] may include eight valves 630 symmetrically distributed azimuthally (having 45° angular separation) at z=−50 cm (relative to a z=0 position at an unsupported end 665 of the inner electrode 660, where the z-axis is coincident with the central axis of the acceleration volume 620 and where a negative direction of the z-axis extends from the unsupported end 665 along a central axis of the inner electrode 660 and a positive direction of the z-axis extends from the unsupported end 665 through the acceleration volume 620 in an opposite direction from the negative direction), eight valves 630 similarly distributed at z=−75 cm, and eight valves 630 similarly distributed at z=−100 cm. The illustrated embodiment may be readily updated with additional valves to allow for injection of more fuel gas (e.g., for longer lasting pinch discharges) and control of an axial pressure distribution of the filling neutral gas in the acceleration volume 620 (e.g., for additional enhancement of the sheared velocity shear flow duration). In additional or alternative embodiments, the valves may be configured differently (e.g., asymmetrically distributed azimuthally and/or with different angular distributions) with other variations to achieve a substantially equivalent profile by compensating for effects of the variations. Such considerations may apply equally to plasma injectors.

The gas-puff valves of the illustrated embodiment incorporate prismatic structural elements which may allow tool effectors (e.g., force-transmitting elements of hand tools or coupling inserts for powered appliances) to be used therewith, so as to transfer torque and other associated stresses directly to more robust principal structural elements while avoiding various inserts, connectors, contacts, vacuum or pressure sills, pottings, and/or solder joints.

Gas-puff valves of the present disclosure, in an embodiment, may be designed to incorporate an orifice diameter of no less than 0.075 in and a plenum volume of at least 1 cm$^3$. In addition, one feature of the gas-puff valves in accordance with embodiments of the present disclosure is the capability to close (and stay closed) at a preprogramed time before and during the Z-pinch discharge.

As recited above (including the documents incorporated by reference), preservation of azimuthal symmetries of plasmas and associated sheared velocity flow is one advantage of embodiments of the present disclosure. Accordingly, reproducible formation and shaping of initial azimuthally symmetric plasma structures at predetermined axial positions in the acceleration volume 620 may be achieved by at least some embodiments of the present disclosure. In various embodiments, a variety of "plasma formation" devices and methods may be used. Such devices and method may include (but are not limited to): dedicated systems for plasma generation [some of which may be configured to account for complexities associated with specific power supplies and conduits and/or complex (pre)ionization subsystems], plasma injectors, and tuned operational algorithms and other methods.

The plasma confinement device of FIGS. 6A and 6B may include a controller or other computing device (not shown), which may include non-transitory memory on which executable instructions may be stored. The executable instructions may be executed by one or more processors of the controller to perform various functionalities of the plasma confinement device. Accordingly, the executable instructions may include various routines for operation, maintenance, and testing of the plasma confinement device. The controller may further include a user interface at which an operator of the plasma confinement device may enter commands or otherwise modify operation of the plasma confinement device. The user interface may include various components for facilitating operator use of the plasma confinement device and for receiving operator inputs (e.g., requests to generate plasmas for thermonuclear fusion, etc.), such as one or more displays, input devices (e.g., keyboards, touchscreens, computer mice, depressible buttons, mechanical switches other mechanical actuators, etc.), lights, etc. The controller may be communicably coupled to various components (e.g., valves, power supplies, etc.) of the plasma confinement device to command actuation and use thereof (wired and/or wireless communication paths between the controller and the various components are omitted from FIGS. 6A and 6B for clarity).

Figure 7:
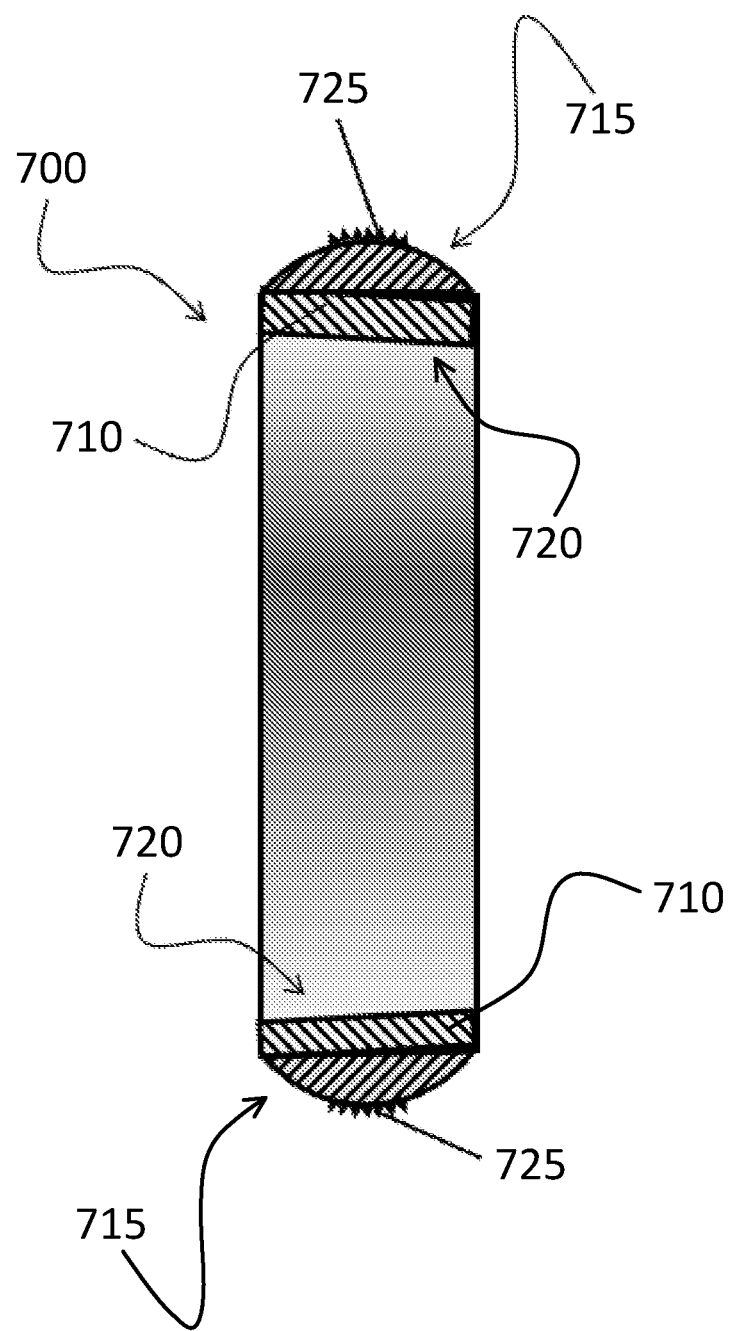
FIG. 7 shows a shaping part, in accordance with at least one embodiment.

Some aspects of plasma initiating and subsequent shaping parts pertinent to embodiments of the present disclosure are schematically illustrated in FIG. 7. These shaping parts may include sharp points (e.g., tips formed at localized concave elements 725; see below) that enhance a local electric field and assist in plasma breakdown. Various configurations of "passive" (that is, without dedicated power or gas supplies that actively drive field emission) shaping parts 700 may be arranged in a form of a ring electrode fit in one or more recesses in the inner electrode 660 at one or more negative z axial positions generally in proximity of one or more internal gas-puff valves 630 (inner electrode 660 and gas-puff valves 630 not shown at FIG. 7; see FIGS. 6B and 8). One significant functionality of such parts, in at least one embodiment, is to initiate and sustain a multichannel breakdown of surrounding neutral gases (starting with various substantially independent azimuthally distributed radial discharge streamers) conducive to creation and sustainment of substantially equal current flow in all radial directions. Note that the shaping part 700 may be placed at a location of the gas valves or downstream therefrom (e.g., to the right in FIGS. 6B and 8-10F) in various embodiments. Though the sharp shaping parts are described with reference to the inner electrode 660, such features may be used at either the inner electrode 660, the outer electrode 650 (not shown at FIG. 7; see FIGS. 6A, 6B, and 8), or both. In some embodiments, enhancing the electric field near such sharp points is beneficial at the cathode (from which electrons are emitted), which might be either the inner electrode 660 or the outer electrode 650. Sharp points on a surface of the anode may also be included such that a breakdown path may be selectively established between the shaping parts on the cathode and the shaping parts on the anode (which may be, for example, the inner electrode 660 and the outer electrode 650, respectively).

The shaping part 700, illustrated in FIG. 7, incorporates a conductive ring 710 arranged to include at least one contact surface 720 forming a low contact resistance surface contact (e.g., to cause a voltage drop between the at least one contact surface 720 and the inner electrode 660 of less than 100 V) with a cylindrical or conical or otherwise tapered outer surface of the inner electrode 660. In some embodiments, the conductive ring 710 may be formed from one or more conductive materials which may be fully or at least partially chemically and/or thermo-mechanically compatible (e.g., the heat and stresses experienced during operation will not appreciably impact lifetime use of the conductive ring 710) with conductors of the inner electrode 660. In addition, a plasma-facing portion 715 of the shaping part 700 may be formed from conductors resistant to chemical and physical damage by supported discharges. In many embodiments, one or more refractory metals (such as one or more of W, Ta, Nb, Mo, or Re; additionally or alternatively including one or more of Ti, V, Cr, Mn, Zr, Tc, Ru, Rh, Hf, Os, or Ir) and/or alloys or combinations thereof may be utilized at least for relatively low chemical reactivities, relatively high melting points, and relatively high resistance to plasma ablation and sputtering.

In additional or alternative embodiments, the plasma-facing materials may be based on conductive forms of carbon including graphite, sintered or pressed carbon powders, carbon fiber matrices, and/or carbon nanotube incorporating structures and compositions. In addition to relative insensitivities to plasma effects, degradation, and damages, carbon-based structures (especially carbon nanotubes) may exhibit electron multiplication properties desirable during plasma generation phases.

In other embodiments, plasma-facing portions 715 may be textured to incorporate a multitude of localized concave elements 725 so as to form structured arrays. Such elements, in certain embodiments, may enhance local electric fields and facilitate electron field emission from solid (and liquid) surfaces. The elements 725 may be formed by mechanical action (including cutting, scratching, sanding, sandblasting, grooving, checkering, stumping, embossing, knurling, etc.). Also different chemical and/or thermal processes (e.g., etching, chemical deposition, spraying, sputtering, ion and neutral implantation, epitaxial growth, etc.) may also be involved. In certain embodiments, multitudes of the elements 725 having relatively small characteristic dimensions (e.g., in comparison with a size of the plasma-facing portions 715) may be produced and maintained to avoid significant changes in geometry when/if any individual elements 725 get damaged or deformed (e.g., by arcing or local overheating). For example, the elements 725 may have an average height of 1-10% of a height of the plasma-facing portions 715 (excluding the elements 725), in some embodiments.

In at least one embodiment, the shaping part 700 (whether including or excluding the elements 725) around the inner electrode 660 may be configured as a generally uniform annular ring, varying, for example, where ports for the internal gas-puff valves 630 traverse a cross section of the plasma-facing portions 715 and the at least one contact surface 720. However, in some embodiments (e.g., such as when the shaping part 700 is configured as the generally uniform annular ring), the shaping part 700 may have a varied cross section around and/or along the inner electrode 660. Other variations, such as where multiple discrete shaping parts 700 that do not form a single ring are placed around the inner electrode 660, are also within the scope of the present disclosure.

Also, as discussed in detail below with reference to FIG. 8, a shaping part similar to the shaping part 700 shown in FIG. 7 may form a ring along an interior surface of the outer electrode 650. Such a shaping part and corresponding contact surface (similar to the at least one contact surface 720) may be configured such as shown in FIG. 7 (or according to variations discussed herein), except with the cross section of the at least one contact surface 720 and the plasma-facing portion 715 being rotated 180° to accommodate for being on the interior surface of the outer electrode 650 instead of an exterior surface thereof. A slope of the at least one contact surface 720 may also be different than illustrated in FIG. 7 to accommodate tapering or other surface variations of the outer electrode 650 or lack thereof (see, e.g., discussion of the "tapered electrodes configuration" below in reference to FIG. 9).

In addition to the shaping part 700 illustrated in FIG. 7, other methods of assisting/controlling/directing plasma formation may be used individually or in combination. One possibility includes using radioactive material(s) embedded in the outer electrode 650 and/or inner electrode 660. Specifically, high-energy particles or photons emitted from radioactive decay processes may result in pre-ionization near the embedded radioactive material(s), resulting in a region having increased plasma breakdown relative to regions not including the embedded radioactive material(s). For example, beta emitters and/or gamma emitters may be selected for the embedded radioactive material(s).

An additional or alternative possibility includes illuminating the outer electrode 650 and/or the inner electrode 660 with incident laser light at a region where plasma pre-ionization is desired. Within such regions, electrode surfaces (e.g., of the outer electrode 650 and/or the inner electrode 660) may include materials chosen specifically to emit X-ray or other forms of ionizing radiation when subjected to the incident laser light. An additional or alternative possibility includes using laser light to directly ionize gas (e.g., via direct interactions of the laser light with neutral gas particles). In such embodiments, the laser light may pass through the neutral gas, and deposit energy throughout the laser path, resulting in pre-ionization and a directed channel for plasma breakdown (e.g., a channel having greater plasma breakdown than a surrounding volume).

Other methods to assist/control/direct plasma formation may utilize various forms of cathodes, such as field emitters or thermionic emitters, located on the electrode surfaces (e.g., of the outer electrode 650 and/or the inner electrode 660) where breakdown is desired. Field emitters may use relatively high electric fields to emit electrons from small sharp features. Examples of such emitters may include nanostructures such as carbon nanotubes, graphene emitters, nanowire emitters, Schottky emitters, etc. Additionally or alternatively, thermionic emitters may be used to cause plasma breakdown. Examples of such emitters may include heated tungsten filaments which emit electrons at relatively high temperature. Schottky emitters may be considered field enhanced thermionic emitters.

Figure 8:
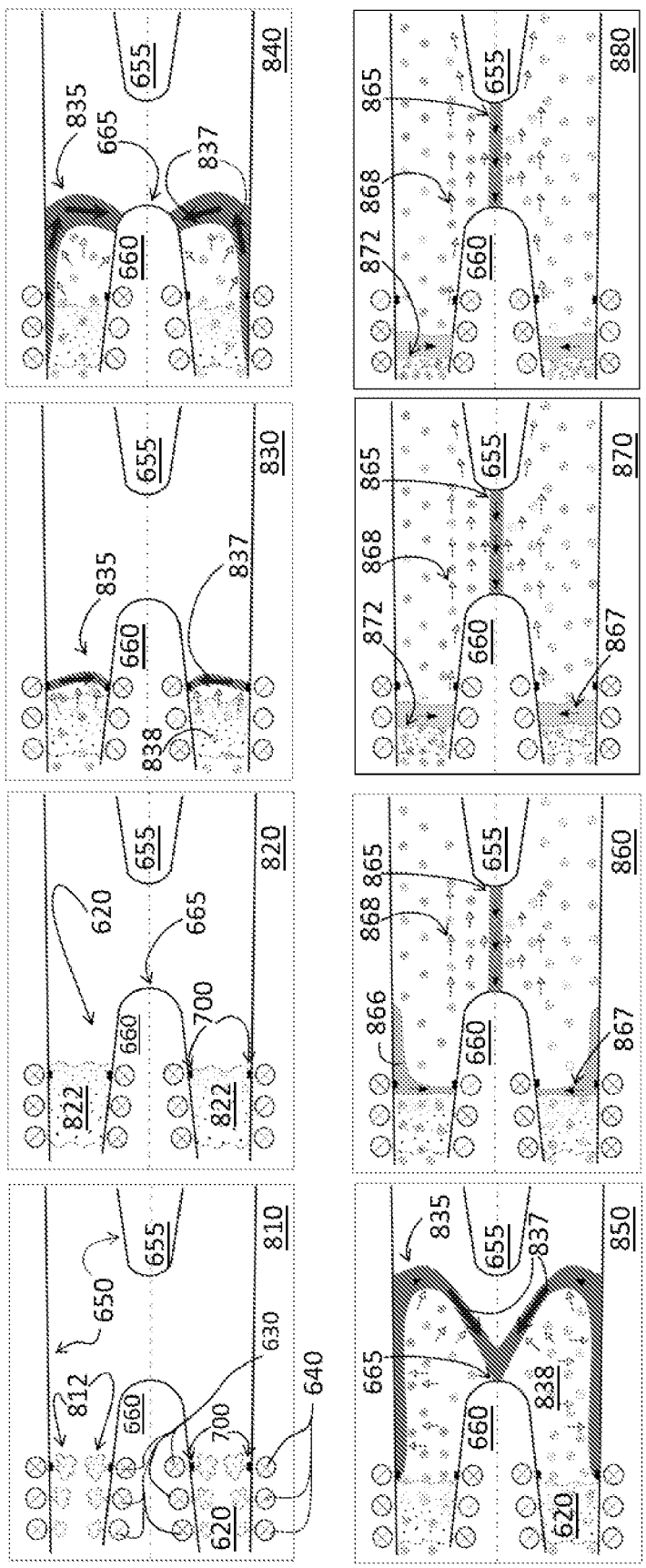
FIG. 8 shows schematically a process of initiating and driving an azimuthally symmetric sheared flow for stabilization of Z-pinch discharges, in accordance with at least one embodiment.

One embodiment of a process of initiating and driving the azimuthally symmetric sheared flow for stabilization of Z-pinch discharges in a plasma confinement device, such as the plasma confinement device described in detail above with reference to FIGS. 6A-7, is schematically illustrated in FIG. 8. The process, in this example, may be characterized by the schematic illustrations of steps or stages 810, 820, 830, 840, 850, 860, 870, and 880 of generally unequal duration. In certain embodiments, the process may include executing steps 810, 820, 830, 840, 850, 860, 870, and 880 in sequence.

In some embodiments, the process, or a portion thereof, may be implemented as executable instructions stored in non-transitory memory of a computing device, such as a controller communicably coupled to the plasma confinement device. Moreover, in certain embodiments, additional or alternative sequences of steps may be implemented as executable instructions on such a computing device, where individual steps discussed with reference to the process may be added, removed, substituted, modified or interchanged.

The process begins with the step 810, which may include application of a high-voltage generating radial electric field (not shown) between the electrodes 650 and 660, and sequential activation of one or more internal and external valves 630 and 640 (in possible combination with plasma injectors 640). The valves 630 and 640 may be arranged to locally introduce initial measured and predetermined concentrations 812 of filling gas. In certain embodiments, it may be desirable to initiate gas puffing and/or plasma injection during an initialization phase and continue to deliver sufficient initial concentrations 812 of filling gas in a proximity of the shaping part 700 for additional protection against premature and/or asymmetric gas breakdowns.

During the step 820, the initial concentrations 812 may spontaneously evolve by neutral gas diffusion processes to form a continuous (e.g., uninterrupted) axisymmetric volume of neutral filling gas formation 822 occupying a substantial portion (e.g., a majority) of the acceleration volume 620. In some embodiments, the volume of neutral filling gas formation 822 exhibits a neutral gas molecule number density gradient in an axial direction along the central axis of the acceleration volume 620 (e.g., toward the unsupported end 665 of the inner electrode 660), while substantially maintaining the azimuthal symmetry favorable for substantially symmetric distribution of discharge streamers during initial breakdown of the filling gas. In certain embodiments, the neutral gas molecule number density gradient can be such that Paschen breakdown occurs at the shaping part 700. In additional or alternative embodiments, pre-ionized gas may be injected at the shaping part 700 to facilitate formation of an ionization wave that moves into the neutral gas that has been injected upstream (e.g., towards a supported end of the inner electrode 660 opposite the unsupported end 665).

During the step 830, a proximal electric field structure shaped by the geometry and material properties of the shaping part 700 may facilitate neutral gas breakdown forming an axisymmetric plasma structure 835 supporting current flow 837 between the inner electrode 660 and the (surrounding) outer electrode 650, e.g., localized axially in a vicinity of the shaping part 700. The current flow 837, supported by energy from the power supplies (e.g., capacitor banks or similar), may form a continuous (e.g., uninterrupted) current loop (from the outer electrode 650, through the plasma structure 835, and into and through the inner electrode 660) which may generate a substantially azimuthal magnetic field 838 (as indicated by azimuthal field lines). In additional or alternative embodiments, to form the plasma structure 835, pre-ionized gas may be injected from plasma injectors 640 towards the unsupported end 665 of the inner electrode 660.

Lorentz force interactions between the current flow 837 and the magnetic field 838 may cause migration of the current flow 837 from the shaping part 700 in the direction of the unsupported end 665, as illustrated in the schematic representation of the step 840. In addition, the Lorentz force interaction may induce the current flow 837 along the surface of the outer electrode 650.

During the step 850, the current flow 837 may continue to develop towards and up to the unsupported end 665. Simultaneously, a magnetic pressure driven by the magnetic field 838 enclosed by the current flow 837 may displace the developing plasma structure 835 in a direction of the opposing portion 655 of the outer electrode 650 arranged to face the unsupported end 665. In embodiments where present, the ionization wave that moves into the neutral gas may be controlled by injecting varying amounts of pre-ionized gas, e.g., at the internal valves 630 and/or the external valves 640. In at least one embodiment, substantially azimuthal symmetry of the plasma structure 835 supporting the current flow 837 may contribute significantly to an efficiency of the process, as any significant disturbances in the current flow 837 may cause instabilities, electrode damage, and/or introduction of metallic impurities into the developing discharge.

In certain embodiments, the discharge developing steps 830, 840, and 850 may last from a fraction of a microsecond to a few microseconds, e.g., significantly shorter than either the step 810 (corresponding to filling the acceleration volume 620 with neutral gas) or the steps 860, 870, and 880 (corresponding to the Z-pinch discharge). As such, the neutral filling gas formation 822 is illustrated as stationary, as the neutral filling gas formation 822 may evolve over (e.g., only over) time intervals significantly longer than a duration of the steps 830, 840, and 850.

In certain embodiments, plasma injection may occur between steps 810 and 820. In additional or alternative embodiments, plasma injection may occur rapidly and on the same scale as steps 830, 840, and 850, and may be used to control formation/initialization and dynamics of such steps.

The step 860 corresponds to initial Z-pinch operation step, including formation of a Z-pinch plasma column 865 created to support a Z-pinch current $I_{pinch}$. In addition, a residual plasma structure 866 may be formed to support a residual (radial) current 867 flowing through the neutral filling gas formation 822 in the acceleration volume 620. Moreover, in various embodiments, propagation of the plasma structure 835 may drive an initial sheared velocity plasma flow 868 surrounding (and stabilizing) the Z-pinch plasma column 865. In some embodiments, the residual plasma structure 866 may be initiated in the proximity of the shaping part 700 as characterized by a (locally) highest number density of neutral gas constituents (molecules and/or atoms).

As discussed above, in at least one embodiment, during discharge sustainment in the step 870, the Z-pinch plasma column 865 may be sustained and stabilized by continued plasma flow from the acceleration volume 620. An ionization front 872 may continually produce plasma accelerated from the acceleration volume 620 by the residual current 867 to drive the sheared velocity plasma flow 868.

Figure 9:
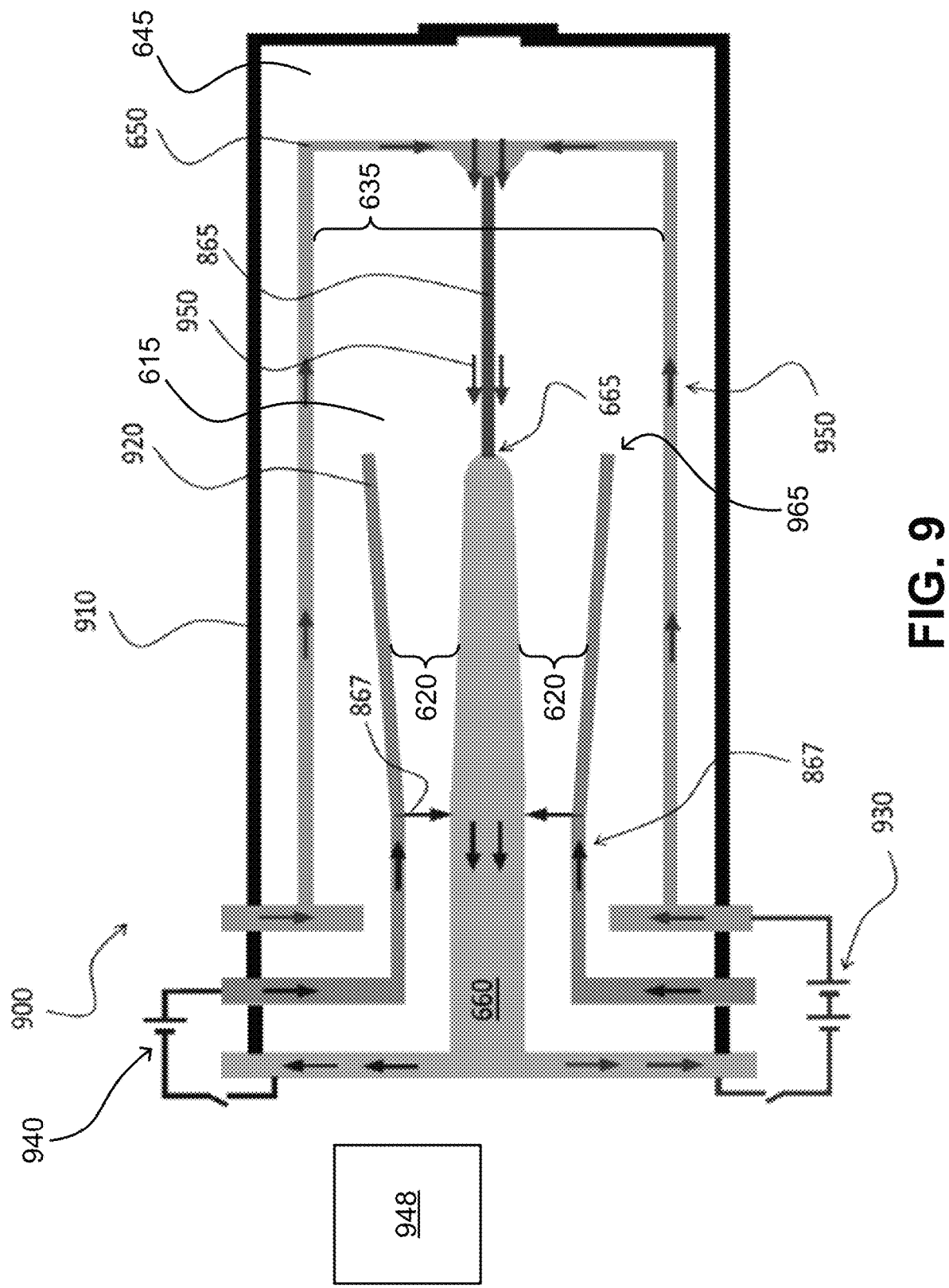
FIG. 9 shows a schematic diagram illustrating a device to generate and maintain an azimuthally symmetric sheared ion velocity flow, in accordance with at least one embodiment.
Figure 10A:
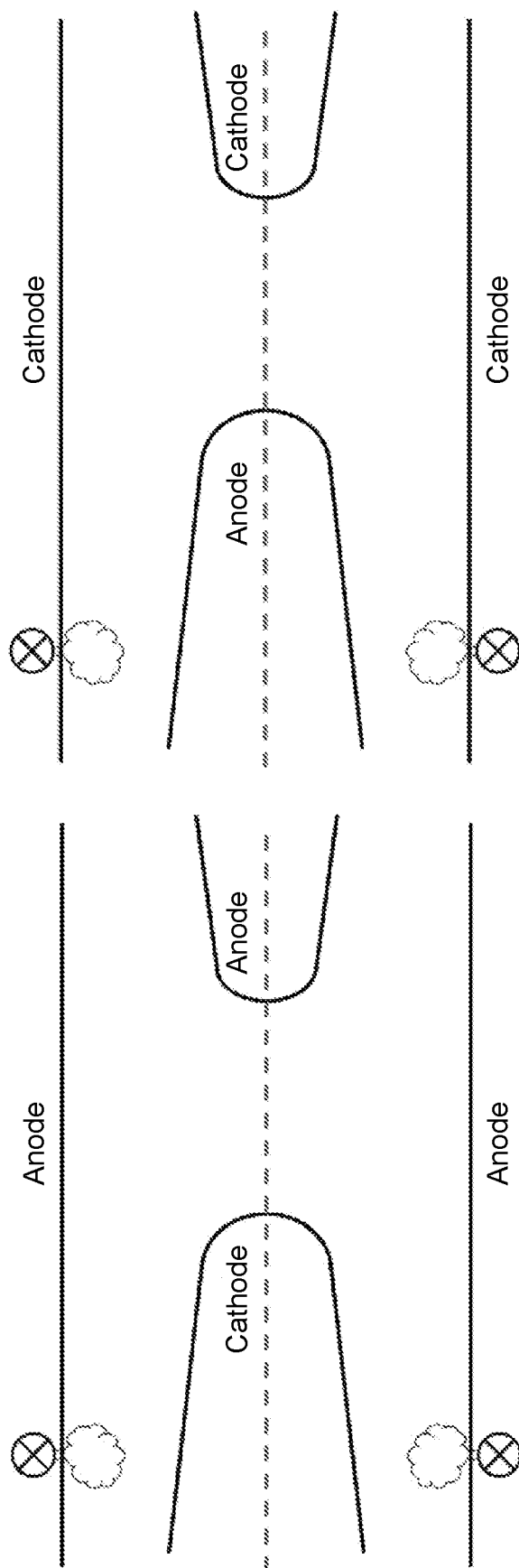
FIGS. 10A-10F show schematically a process of initiating and driving an azimuthally symmetric sheared flow for stabilization of Z-pinch discharges for different anode/cathode configurations, in accordance with at least one embodiment.
Figure 10B:
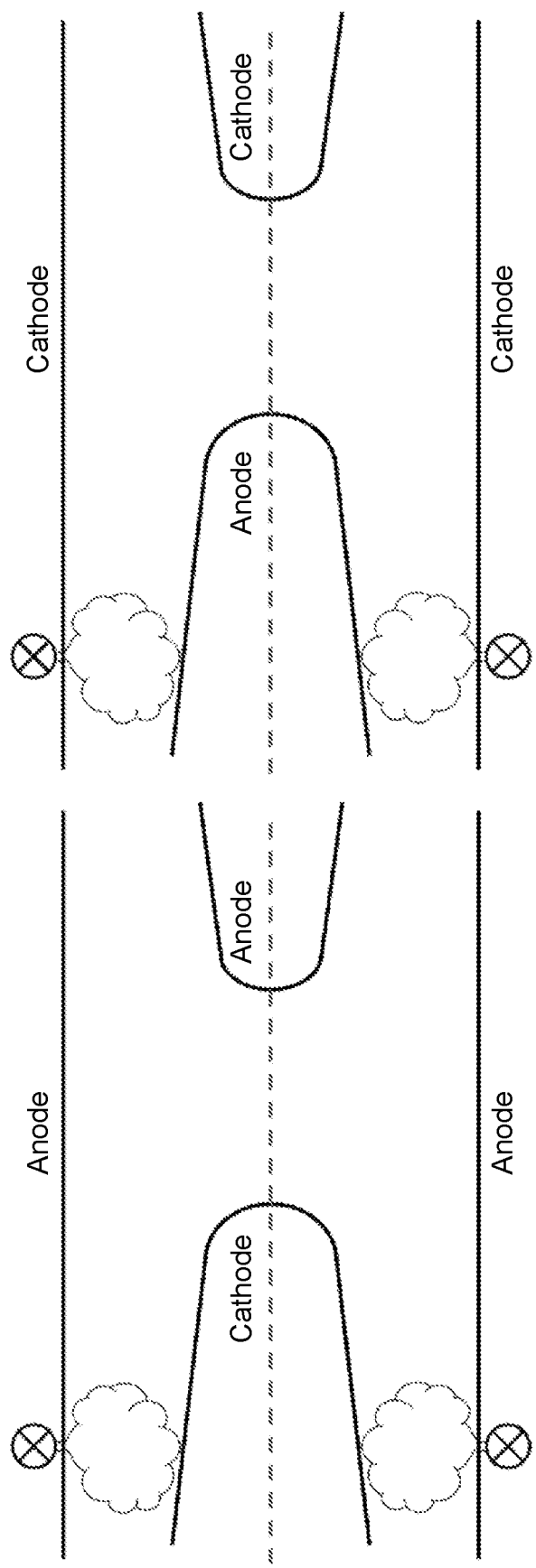
Figure 10C:
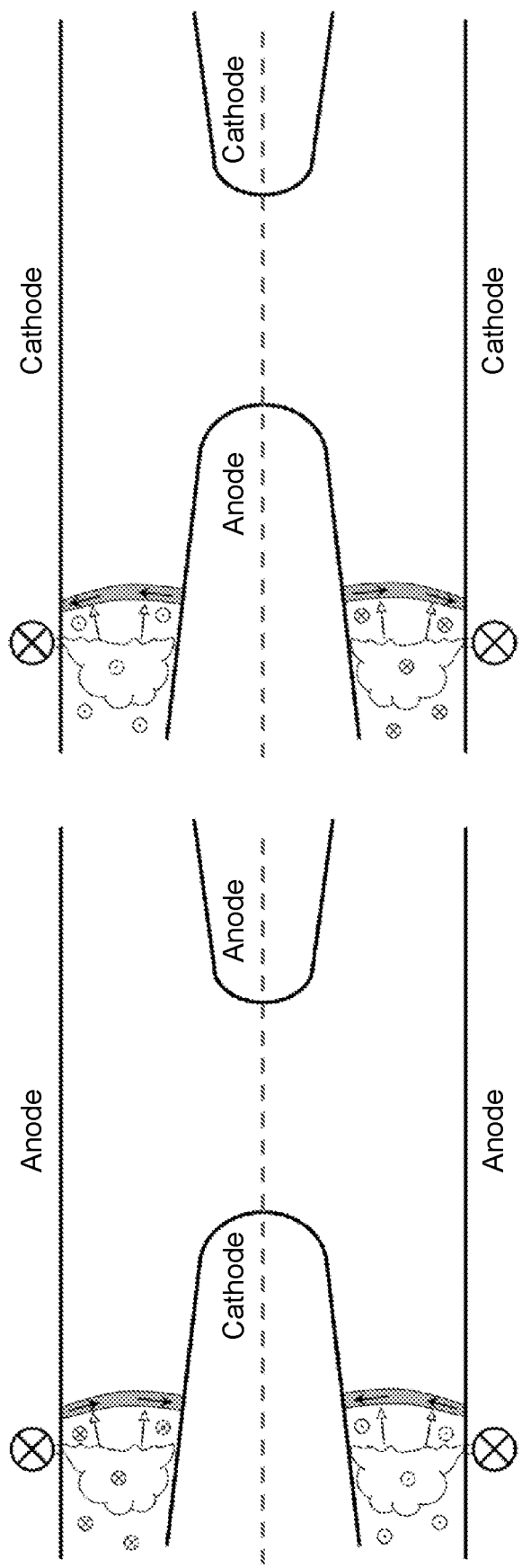
Figure 10D:
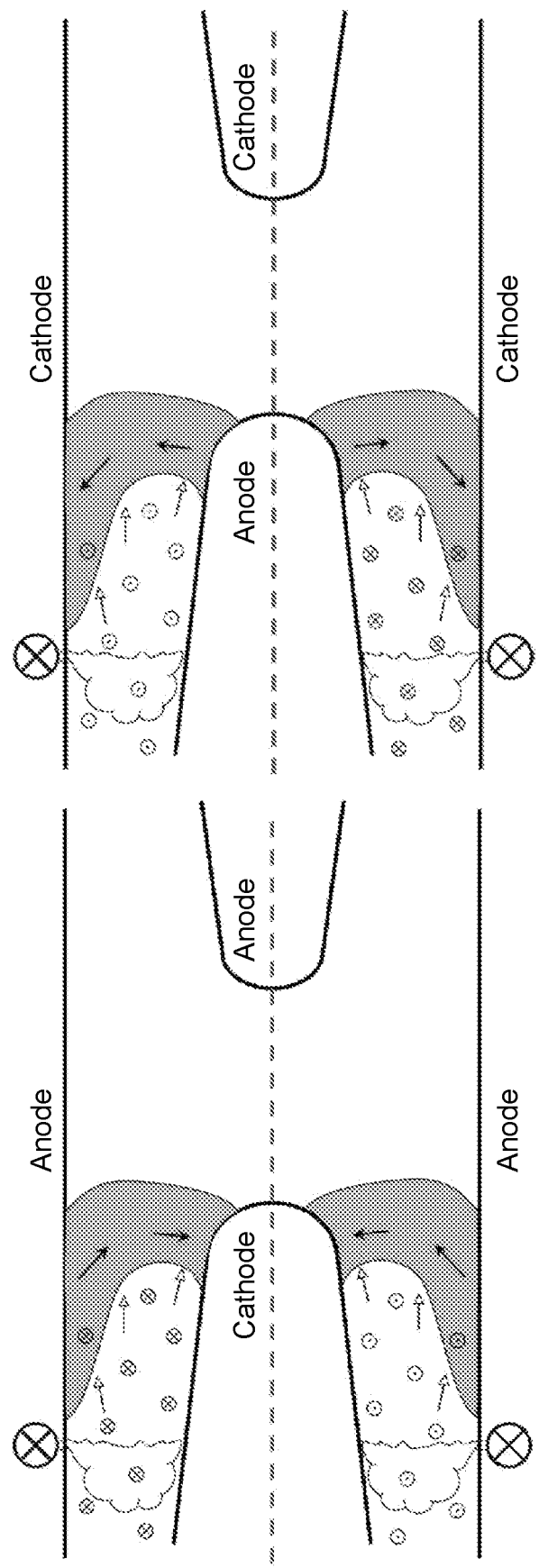
Figure 10E:
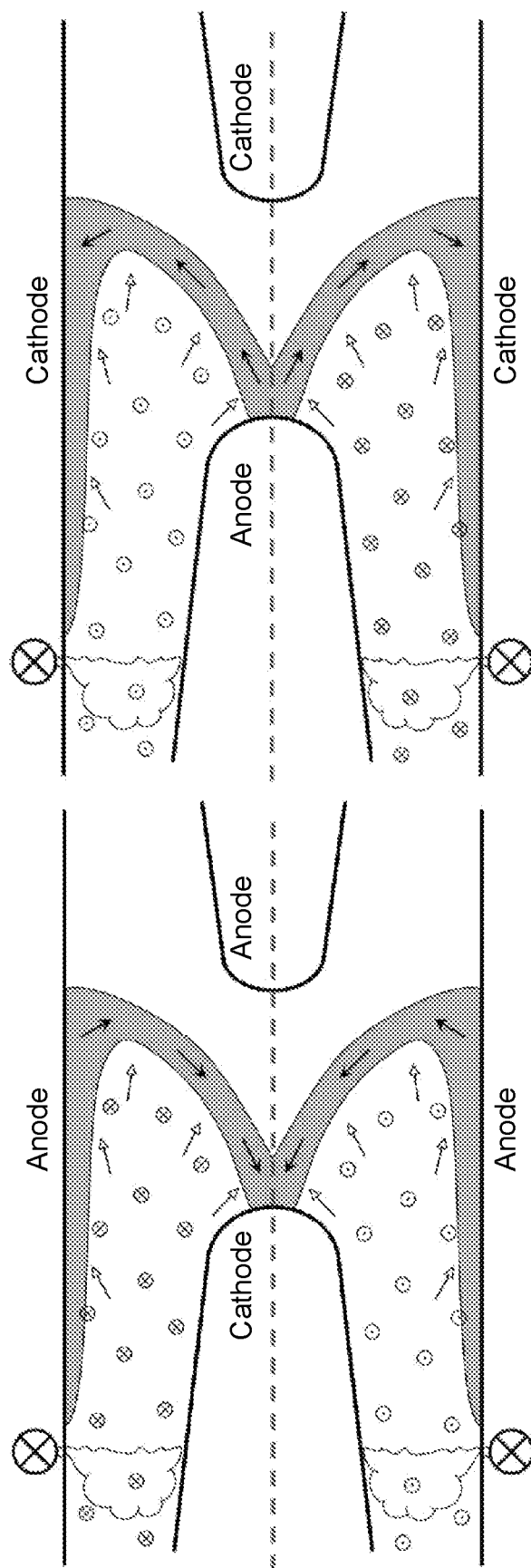
Figure 10F:
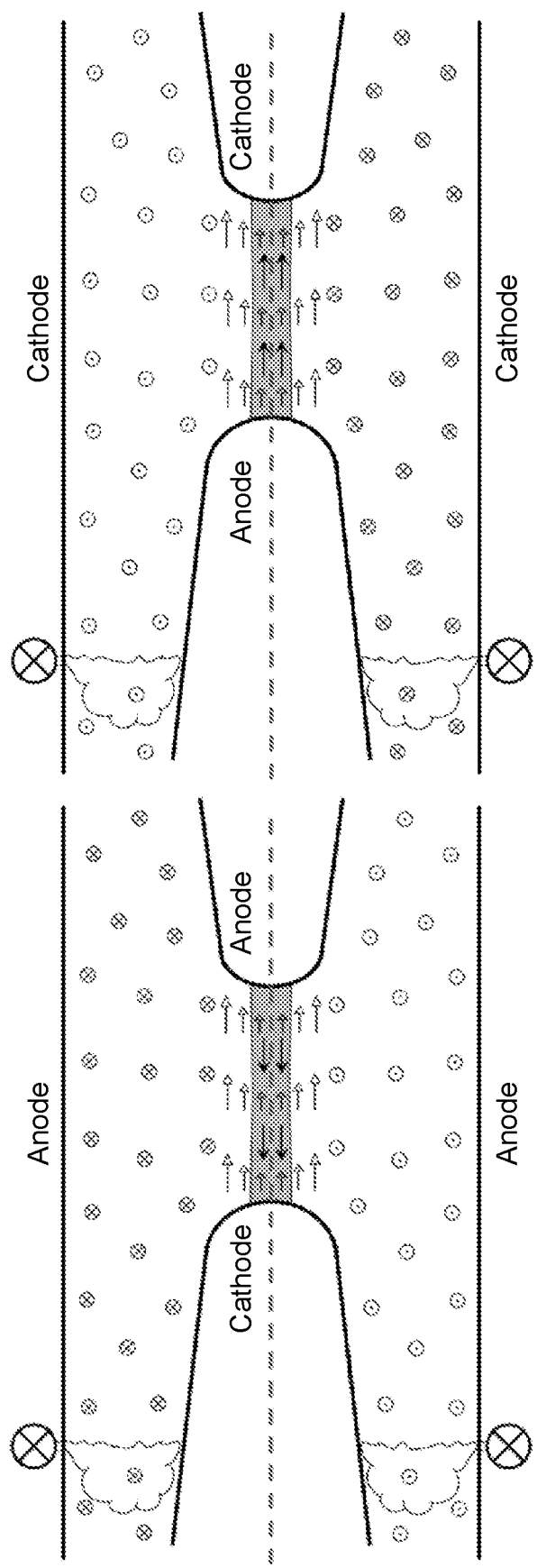

During the step 880, in at least one embodiment, the ionization front 872 may move towards a breech end of the acceleration volume 620, ionizing remaining neutral fuel gas in a continuous (e.g., uninterrupted) manner, until all or substantially all fuel gas available in the acceleration volume 620 is ionized, resulting in extinction of the ionization front 872 and subsequent disintegration of the Z-pinch current $I_{pinch}$ (e.g., a current through the Z-pinch plasma column 865 and the inner electrode 660, such as the current 950 illustrated in FIG. 9, described below). When steps 810, 820, 830, 840, 850, 860, 870, and 880 are completed, the plasma confinement system may be flushed to remove fusion byproducts and the process described above may be repeated for another pulse. In certain embodiments, the process and repetition thereof may be automated and controlled by a software application, e.g., implemented by the controller communicably coupled to the plasma confinement system.

Another embodiment of a plasma confinement device, a Z-pinch plasma device 900, is illustrated schematically in FIG. 9. The Z-pinch plasma device 900 may generate a plasma within an assembly volume 635 of a plasma confinement chamber 615, the plasma confined, compressed, and sustained by an axially symmetric magnetic field. The axially symmetric magnetic field may be stabilized by a sheared ion velocity flow driven by electrical discharge between a pair of electrodes interfacing with the plasma confinement chamber 615.

Devices belonging to the illustrated class of plasma confinement devices are generally related with the previous embodiments discussed above and illustrated in FIGS. 6A-8 and have similar features excepting additional or alternative subsystems and functionalities below. Excepting certain assembly and operational aspects which may arise from such differences, the description provided above with reference to FIGS. 6A-8 may be additionally applied to the embodiment depicted in FIG. 9. In certain embodiments, additional subsystems and/or functionalities may also be included in the Z-pinch plasma device 900 which were not described in detail above with reference to FIGS. 6A-8 and which may be additionally applied to the embodiments depicted in FIGS. 6A-8.

In an example embodiment, the Z-pinch plasma device 900 may include an outer electrode 650 separated physically and functionally from an external vacuum boundary 910, the external vacuum boundary 910, together with portions of the inner electrode 660, forming a vacuum vessel 645 as a low pressure container including the plasma confinement chamber 615. The intermediate electrode 920 may be positioned so as to have a radius in between a radius of the inner electrode 660 and a radius of the outer electrode 650. Specifically, the intermediate electrode 920 may substantially surround the inner electrode 660 and the outer electrode 650 may substantially surround the intermediate electrode 920. For example, the inner electrode 660 may include one end 665 that is at least partially surrounded by the intermediate electrode 920 and the intermediate electrode 920 may include one end 965 that is at least partially surrounded by the outer electrode 650.

The Z-pinch plasma device 900 may incorporate at least two functionally separate power supplies, e.g., at least one primary power supply 930 primarily arranged and controlled to drive a Z-pinch (discharge) current 950 ($I_{pinch}$), and at least one additional power supply 940 primarily arranged and controlled to drive the residual current 867. In some embodiments, the at least one primary power supply 930 may be separate power supply device(s) from the at least one additional power supply 940. In other embodiments, the at least one primary power supply 930 and the at least one additional power supply 940 may be components of the same power supply device.

For example, in at least one embodiment, a single power supply device may have a plurality of outputs which individually provide an amount of power to enable performance of a respective function (e.g., drive the Z-pinch current 950, drive the residual current 867, etc.). Such an arrangement may be based on at least two power supplies (e.g., one primary power supply 930 and one additional power supply 940) and may allow for additional control of the Z-pinch current 950 and sheared flow stabilization thereof. In principle, the at least two power supplies may be scaled, charged, and controlled such that the Z-pinch current 950 and the stabilization thereof may be maintained for commensurate time periods before any of the at least two power supplies prematurely runs short or out of stored energy.

In certain embodiments, the Z-pinch plasma device 900 may incorporate a "tapered electrodes" configuration, characterized by broadening a gap between the inner electrode 660 and the intermediate electrode 920 by tapering, along the central axis of the acceleration volume 620, the end 965 of the intermediate electrode 920 outwards to increase a volume of at least a portion of the acceleration volume 620, e.g., in a direction of the (unsupported) ends 665 and 965. In one example, the taper may be between 0° and 15° from the central axis of the acceleration volume 620. Such an arrangement may facilitate a transfer of momentum from plasma heated by the residual current 867 to neutral gas, e.g., along the central axis, thereby creating and sustaining sheared flow stabilization. The momentum transfer may be described and modeled using methodology applicable to design/optimization of "de Laval nozzles" as known in the field of jet propulsion.

While techniques described herein are discussed in connection with thermonuclear fusion and, for example, harnessing energy production therefrom, the techniques described herein can be used for other purposes, such as heat generation (e.g., for manufacturing utilizing relatively high temperatures) and propulsion. For example, the embodiment of FIGS. 6A-8 or the embodiment of FIG. 9 may be modified at least by removing the vacuum chamber 338 or the external vacuum boundary 910, respectively, and introducing an opening in one end of the outer electrode 650 to allow fusion products to escape (e.g., parallel to the central axis of the acceleration volume 620). In one embodiment, a magnetic nozzle (not shown at FIG. 9) is positioned downstream of the outer electrode 650, e.g., to the right of the outer electrode 650 in a plane of FIG. 9, to collimate the plasma to reduce any exhaust plume divergence.

The Z-pinch plasma device 900 may include a controller or other computing device 948, which may include non-transitory memory on which executable instructions may be stored. The executable instructions may be executed by one or more processors of the controller 948 to perform various functionalities of the Z-pinch plasma device 900. Accordingly, the executable instructions may include various routines for operation, maintenance, and testing of the Z-pinch plasma device 900. The controller 948 may further include a user interface at which an operator of the Z-pinch plasma device 900 may enter commands or otherwise modify operation of the Z-pinch plasma device 900. The user interface may include various components for facilitating operator use of the Z-pinch plasma device 900 and for receiving operator inputs (e.g., requests to generate plasmas for thermonuclear fusion, etc.), such as one or more displays, input devices (e.g., keyboards, touchscreens, computer mice, depressible buttons, mechanical switches or other mechanical actuators, etc.), lights, etc. The controller 948 may be communicably coupled to various components (e.g., valves, power supplies, etc.) of the Z-pinch plasma device 900 to command actuation and use thereof (wired and/or wireless communication paths between the controller 948 and the various components are omitted from FIG. 9 for clarity).

FIGS. 10A-10F illustrate schematically an embodiment of a process of initiating and driving the azimuthally symmetric sheared flow for stabilization of Z-pinch discharges in a plasma confinement device. The series of FIGS. 10A-10F show two configurations, a first configuration where the inner electrode is a cathode and the outer electrode is an anode (on a left side of each of FIGS. 10A-10F when FIGS. 10A-10F are oriented so that alphanumeric characters depicted therein are oriented in standard fashion), and a second configuration where the inner electrode is an anode and the outer electrode is a cathode (on a right side of each of FIGS. 10A-10F when FIGS. 10A-10F are oriented so that alphanumeric characters depicted therein are oriented in standard fashion). Certain Z-pinch plasma confinement devices may correspond to the first configuration, which may be simpler to construct and operate successfully. However, as shown in more detail in the discussion below with respect to FIGS. 11-24, the second configuration may yield advantageous and unexpected results in accordance with various embodiments described herein. Certain non-alphanumeric symbols used in FIGS. 10A-10F (e.g., current flow arrows, gas valves, gas clouds, magnetic field symbols, gas flow arrows, etc.) are the same as used in FIG. 8. Note that portions labeled with "cathode" and "anode" may be electrically connected to portions with the same name ("cathode" or "anode"). Note that while FIGS. 10A-10F show a set of gas valves in physical contact with or directly adjacent to the outer electrode, other configurations are also within the scope of the present disclosure, such as the configurations of valves illustrated and described in detail above with reference to FIG. 8, which may or may not include one or more shaping parts, such as described in detail above with reference to FIG. 7.

In at least one embodiment, greater stability of Z-pinch plasma may be achieved with plasma confinement systems such as disclosed herein where the outer electrode is a cathode and the inner electrode is an anode. Specifically, and as discussed in greater detail below with reference to FIGS. 11-24, the Z-pinch m=0 instability, and its stabilization by radially sheared axial flow, is studied using the nonlinear ideal 5M2F model, and an extension of that model to include Braginskii heat and momentum transport. Using the ideal 5M2F model, linear growth rate results are compared with prior work using magnetohydrodynamics (MHD) and Hall MHD. In scenarios with and without radially sheared axial flow, agreement with Hall MHD is excellent, suggesting that among the two-fluid terms the Hall term is dominant. In the limit of small ion inertial length, results also match MHD. A comparison with particle-in-cell (PIC) modeling of shear-free m=0 stability focuses on a plasma scenario based on recent experimental results. In a scan of mode wavenumber, ideal 5M2F results are qualitatively similar to PIC: growth rate rises to a peak at moderate wavenumber, and decline at large wavenumber, in contrast to MHD results, which show saturation of growth rates with increasing wavenumber rather than a decline. The peak normalized 5M2F growth rate is $\gamma \tau_A = 1.5$, where $\tau_A$ is the Alfvén transit time across the pinch. The peak occurs at normalized wavenumber ka=10, where a is the effective pinch radius. For comparison, PIC results have peak growth of $\gamma \tau_A = 0.77$ at ka=5. Including Braginskii-based closure of the 5M2F model does not qualitatively change the ideal results in this particular case. Nonlinear 5M2F modeling with the dissipative Braginskii-based closure is done in cases with pinch-edge sheared-flow speed equal to half the Alfvén speed. Nonlinear mixing due to sheared flow yields a saturated quasi-steady state with modest losses of pinch ion inventory and pinch thermal energy: approximately 30% and 10%, respectively. 5M2F modeling captures essential physics of m=0 instability and offers a computationally tractable route to high-fidelity modeling of 3D Z-pinch behavior, including m=1 instability.

Experimental evidence from SFS Z-pinch research, together with seminal numerical stability analysis suggests that radially sheared axial flow enables the observed long plasma lifetimes; static Z pinches are typically terminated by m=0 (sausage) and m=1 (kink) instabilities, which have growth rates near the radial Alfvén transit frequency.

Insight from computational modeling is expected to be a vital part of ongoing SFS Z-pinch development. As plasma parameters are increased in future experiments, high-fidelity modeling can be used to explore various processes involved in plasma formation, assembly, and confinement. Processes of particular interest include, for example, the deflagration mode that is linked to sustainment of sheared flow effective resistivity due to electron drift microturbulence, and the dynamics of the flowing Z pinch itself.

The five-moment multi-fluid model is an excellent candidate for accurately capturing the physics of interest. The five-moment two-fluid (5M2F) plasma model (with the two fluids representing ions and electrons) has previously been applied to model Z-pinch instabilities, capturing realistic m=0 growth rates and an interesting electron drift instability when the electron cross-field drift velocity exceeds the ion thermal speed. The 5M2F model may allow an effective compromise between the fidelity (but prohibitive computational expense) of a kinetic model and the computational tractability (but limited fidelity) of an approach based on MHD.

Research presented herein applies the 5M2F model to explore m=0 instabilities, with and without sheared flow. The 5M2F model includes finite-inertial-length corrections for ions and electrons, and also the effects of finite speed of light. In the limit that electron inertia is negligible and light speed is infinite, results should be match Hall-MHD results. In some examples, a linearized Hall-MHD model is applied to study m=0 stability of a Bennett equilibrium with a parabolic sheared-flow profile ($v_{sf} \propto r^2$). Additional work has been done using the same setup, but with a nonlinear MHD model, considering both linear ($v_{sf} \propto r$) and parabolic sheared-flow profiles. Hereinbelow, the 5M2F model is benchmarked against these MHD and Hall-MHD results.

To assess the physical fidelity of the 5M2F model with full Braginskii closure, comparison is made with fully kinetic (i.e., not gyrokinetic or otherwise reduced) PIC modeling of m=0 Z-pinch stability, including Coulomb collisions. In that work, the PIC model is applied to study a FuZE-like Bennett profile with a linear sheared-flow profile. A scan of ka without sheared flow shows growth rates similar to MHD results up to ka=5, at which point the PIC growth rate reaches a maximum. For larger k, the PIC results show decreasing growth rates, unlike MHD results which typically show constant or increasing growth rates at large k. Simulations at ka=5 with sheared flow show m=0 stability for $v_{sf}^a \gtrsim 0.75$. Stability analysis performed at reactor-like conditions, in which the collisionality is reduced, yields similar results.

Five-moment fluid equations for a given species are derived by taking moments of the associated Boltzmann equation. As described by Braginskii, the first three moments of the Boltzmann equation for species a yield evolution equations for five independent variables: number density ($n_\alpha$), three momentum components ($m_\alpha n_\alpha v_\alpha$, where $m_\alpha$ and $v_\alpha$ are the species mass and velocity), and a scalar pressure ($p_\alpha$). The five-moment multi-fluid model, and its reduction to 5M2F, is summarized below, and Braginskii closure details are presented below. Implementation of the model in the WARPXM framework is also discussed below.

Moments of the Boltzmann equation for species a yield the following fluid equations:

$$\frac{\partial n_\alpha}{\partial t} + \nabla \cdot (n_\alpha v_\alpha) = S_\alpha^n, \quad (1)$$

$$\frac{\partial}{\partial t}(m_\alpha n_\alpha v_\alpha) + \nabla \cdot (m_\alpha n_\alpha v_\alpha v_\alpha + p_\alpha \mathbb{I} + \Pi_\alpha) = q_\alpha n_\alpha (E + v_\alpha \times B) + S_\alpha^m, \quad (2)$$

$$\frac{\partial e_\alpha}{\partial t} + \nabla \cdot [e_\alpha v_\alpha + v_\alpha \cdot (p_\alpha \mathbb{I} + \Pi_\alpha) + h_\alpha] = q_\alpha n_\alpha v_\alpha \cdot E + S_\alpha^e, \quad (3)$$

where $e_\alpha = m_\alpha n_\alpha v_\alpha^2/2 + p_\alpha/(\Gamma-1)$ is the total fluid energy density, and $q_\alpha$ is the species charge. The identity matrix is represented by $\Pi$. In one example, adiabatic coefficient $\Gamma=5/3$ is used. Species temperature is determined by the relation $p_\alpha = n_\alpha k_B T_\alpha$, where $k_B$ is the Boltzmann constant. The non-ideal terms, to be discussed in below, are the stress tensors ($\Pi_\alpha$), heat fluxes ($h_\alpha$), and source terms $S_\alpha^n$, $S_\alpha^m$, and $S_\alpha^e$, which represent the collisional sources of particles, momentum, and energy from reactions and interactions between the species. In this example, there are five equations in total—two scalar equations and one vector equation—giving rise to the "five-moment" designation. All expressions are in SI units unless otherwise noted.

The fluid equations are coupled to Maxwell's equations for magnetic (B) and electric (E) fields, $$\nabla \times E = -\frac{\partial B}{\partial t}, \quad (4)$$

$$\nabla \times B = \mu_0 \left( j + \epsilon_0 \frac{\partial E}{\partial t} \right), \quad (5)$$

$$\nabla \cdot B = 0, \quad (6)$$

$$\nabla \cdot E = \frac{\rho_c}{\epsilon_0}. \quad (7)$$

Here, $\mu_0$ and $\epsilon_0$ are the permeability and permittivity of free space, respectively. The current density $j = q_\alpha n_\alpha v_\alpha$ and charge density $\rho_c = \Sigma q_\alpha n_\alpha$ (with the sums over $\alpha$) provide coupling to the fluid equations. If the divergence constraints, Eqs. (6) and (7), are satisfied in an initial value problem, they will remain satisfied, mathematically; equations (4) and (5) then completely describe the evolution of E and B. This strict mathematical guarantee is broken by the presence of either numerical errors or domain boundaries, motivating formulations that explicitly preserve the constraints. In the results presented herein, the divergence constraints are well-satisfied and no such special formulation is used.

To arrive at the 5M2F model, species are limited to ions and electrons, $\alpha=i,e$. Collisional source terms arise only due to the Coulomb scattering between ions and electrons. Specifically, the resulting sources are $S_\alpha^n=0$, $S_\alpha^m=R_\alpha^{ie}$ and $S_\alpha^e=v_\alpha \cdot R_\alpha^{ie}+Q_\alpha^{ie}$, where $R_\alpha^{ie}$ and $Q_\alpha^{ie}$ are frictional exchange of momentum and energy, respectively. Physical and numerical aspects of the 5M2F model are described at length in earlier work.

The model is closed using Chapman-Enskog-type closure, following Braginskii. Stress tensors ($\Pi_\alpha$) and heat fluxes ($h_\alpha$) are specified according to the Braginskii formulation, allowing for arbitrary magnetization, $x_\alpha = \omega_{c\alpha} \tau_\alpha$, where $\omega_{c\alpha}$ is the cyclotron frequency and $\tau_\alpha$ is the collision time for species $\alpha$.

The momentum and thermal exchange terms ($R_\alpha^{ie}$ and $Q_\alpha^{ie}$) are dropped with justification as follows. The frictional momentum exchange modifies the bulk plasma momentum on a time scale $\tau_{exch} \approx (m_i/m_e)\tau_e$, where $\tau_e$ is the electron collisional relaxation time. Exchange of thermal energy occurs on the same time scale. If $\tau_{exch}/\tau_{dyn} \gg 1$, where $\tau_{dyn}$ is the dynamical time scale of interest, the frictional and thermal exchange terms may be omitted without loss of accuracy. The condition $\tau_{exch}/\tau_{dyn} \gg 1$ is satisfied in the FuZE-like plasma considered below, for example. Although the terms present no particular computational challenge, they are omitted to allow the presentation and analysis to focus on the viscosity and heat flux terms that are more important for m=0 instability behavior.

The heat fluxes are $$h_\alpha = -k_\perp^\alpha \Delta_\perp T_\alpha \pm \kappa_\wedge^\alpha b \times \Delta_\perp T_\alpha, \quad (8)$$

where the plus and minus signs are taken on the diamagnetic heat flux terms (involving $\kappa_\wedge^\alpha$) for ions and electrons, respectively. The magnetic field direction is b=B/B where B=|B|. Terms involving $\Delta_\parallel$ have been dropped because b is in the direction of symmetry. The perpendicular thermal conductivities are $$\kappa_\perp^\alpha = \frac{n_\alpha k_B^2 T_\alpha \tau_\alpha}{m_\alpha} \frac{\gamma_{1\alpha}' x_\alpha^2 + \gamma_{0\alpha}'}{\Delta_\alpha}, \quad (9)$$

and the diamagnetic heat flux coefficients are $$\kappa_\wedge^\alpha = \frac{n_\alpha k_B^2 T_\alpha \tau_\alpha}{m_\alpha} \frac{x_\alpha(\gamma_{1\alpha}'' x_\alpha^2 + \gamma_{0\alpha}'')}{\Delta_\alpha}, \quad (10)$$

where $\Delta_\alpha = x_\alpha^4 + \delta_{1\alpha} x_\alpha^2 + \delta_{0\alpha}$. For electrons, the constants are $(\gamma_{0e}', \gamma_{1e}', \gamma_{0e}'', \gamma_{1e}'', \delta_{0e}, \delta_{1e}) = (11.92, 4.664, 21.67, 2.5, 3.7703, 14.79),$ and for ions, $(\gamma_{0i}', \gamma_{1i}', \gamma_{0i}'', \gamma_{1i}'', \delta_{0i}, \delta_{1i}) = (2.645, 2.0, 4.65, 2.5, 0.677, 2.7).$ The magnetization is calculated as $x_\alpha = \omega_{c\alpha} \tau_\alpha$, where the cyclotron frequency is $\omega_{c\alpha} = eB/m_\alpha$. Assuming hydrogen ions, the species collision frequencies are $$\tau_e = \frac{3.5 \times 10^{11}}{\ln \Lambda} \frac{T_{e,eV}^{3/2}}{n_i} \quad (11)$$

and $$\tau_i = \frac{2.12 \times 10^{13}}{\ln \Lambda} \frac{T_{i,eV}^{3/2}}{n_i}. \quad (12)$$

In these expressions, $\ln \Lambda$ is the Coulomb logarithm, which is assumed to equal 10 herein, and the temperatures are in eV. Note that a part of heat flux related to ion-electron friction is omitted here; in this axisymmetric formulation, that part would be $h_e^u = 3n_e kT_e u_\perp/(2\omega_{ce} \tau_e)$, where $u=v_e-v_i$. This term is dropped under the assumption of large $\omega_{ce} \tau_e$ over the bulk of the Z pinch.

The stress tensor is constructed from the rate-of-strain tensor, $$\mathbb{W} = \Delta v + (\Delta v)^T - \tfrac{2}{3} \mathbb{I} \, \Delta \cdot v, \quad (13)$$

and five viscosity coefficients, $\eta_0$, $\eta_1$, $\eta_2$, $\eta_3$, and $\eta_4$. The even viscosity coefficients are $$\eta_0 = 0.96 n_i k_B T_i \tau_i, \quad (14)$$

$$\eta_2 = n_i k_B T_i \tau_i (6/5 x_i^2 + 2.23)/\Delta_\eta, \quad (15)$$

$$\eta_4 = n_i k_B T_i \tau_i x_i (x_i^2 + 2.38)/\Delta_\eta, \quad (16)$$

where $\Delta_\eta = x_i^4 + 2.33$. The odd coefficients $\eta_1$ and $\eta_3$ are found from $\eta_2$ and $\eta_4$ by replacing $\omega_{ci}$ with $2\omega_{ci}$; that is, $\eta_1 = \eta_2(2x_i)$ and $\eta_3 = \eta_4(2x_i)$. Herein, a cylindrical coordinate system is used with radial, azimuthal, and axial coordinates r, θ, and z, respectively. The magnetic field is taken to be strictly in the azimuthal direction. Under the assumptions of zero azimuthal velocity, and no variation in the azimuthal direction, the components of the stress tensor are $$\Pi_{\theta\theta} = -\Theta_0 W_{\theta\theta},$$

$$\Pi_{zz} = -\eta_0 \tfrac{1}{2}(W_{zz} + W_{rr}) \quad (17a)$$

$$-\eta_1 \tfrac{1}{2}(W_{zz} - W_{rr}) - \eta_3 W_{zr},$$

$$\Pi_{rr} = -\eta_0 \tfrac{1}{2}(W_{zz} + W_{rr}) \quad (18b)$$

$$-\eta_1 \tfrac{1}{2}(W_{rr} - W_{zz}) + \eta_3 W_{zr}, \quad (19c)$$

$$\Pi_{zr} = \Pi_{rz} = -\eta_1 W_{zr} + \eta_3 \tfrac{1}{2}(W_{zz} - W_{rr}), \quad (20d)$$

$$\Pi_{z\theta} = \Pi_{\theta z} = 0, \quad (21e)$$

$$\Pi_{r\theta} \Pi_{\theta r} = 0, \quad (22f)$$

As discussed by Braginskii, terms proportional to $\eta_0$ correspond to stress associated with compression or expansion of the plasma. Terms proportional to $\eta_1$ are associated with diffusion across the magnetic field with step size equal to the Larmor radius, and step frequency set by collisions. The coefficient $\eta_3$ is associated with gyroviscosity, which is the diamagnetic flux of momentum. Terms proportional to $\eta_2$ and $\eta_4$ have dropped out. Electron viscosity is omitted in this implementation (except for an isotropic viscosity applied for numerical purposes) on the basis that for similar ion and electron temperatures, the electron viscosity coefficients $\eta_0^e$, $\eta_3^e$, and $\eta_1^e$ are smaller than their ion counterparts by approximately $(M_e m_i)^{1/2}$, $m_e/m_i$, and $(m_e/m_i)^{3/2}$, respectively, and under the further assumption that electron and ion velocity gradients are comparable.

Three types of corrections to the Braginskii transport coefficients are considered herein. The first is related to the assumption made in deriving the coefficients that time scales are long compared to particle collision times. Stress in the r-z plane due to plasma compression or expansion is regulated by the unmagnetized viscosity, $\eta_0 = 0.96 p_i \tau_i$. As described by Braginskii, $\nabla \cdot v < 0$ (compression) increases stress, while $\nabla \cdot v > 0$ (expansion) reduces stress. The magnitude of this stress is $\approx p_i \tau_i |\nabla \cdot v|$. The physical mechanism is as follows. The continuity equation shows that $\nabla \cdot v = \dot{n}/n$ (ignoring gradients of n); in terms of the dynamical time scale, $\dot{n}/n = (\delta n/n)/\tau_{dyn}$. Then, assuming flux frozen into the fluid, $\dot{n}/n = \dot{B}/B = (\delta B/B)/\tau_{dyn}$. Assuming that the ion Larmor orbit size is small compared to the size of the region of compression or expansion, increased magnetic field gives increased transverse velocity and associated transverse energy and stress. This effect manifests as temperature anisotropy, as observed in continuum kinetic simulations. The increased energy is partitioned between transverse and parallel directions over a time set by $\tau_i$; this process is known as gyrorelaxation. With $\tau_i \approx \tau_{dyn}$, the transverse stress is approximately $p \delta B/B$. For $\delta B/B = 1$, for example, the magnitude of the stress is similar to the isotropic pressure.

When $\tau_i < \tau_{dyn}$, the stress is reduced due to fast equipartition. When $\tau_i > \tau_{dyn}$, however, the as-derived effect is unphysically strong, giving a stress larger than the isotropic pressure for $\delta B/B = 1$. In the model implemented here, a correction factor, $$f_{corr}^\tau = \left(1 + \frac{\hat{\tau}_i}{\tau_{dyn}}\right)^{-1}, \quad (23)$$

is applied to the $\eta_0$ coefficient. Here, $\hat{\tau}_i$ is a representative ion collision time. The form used for this correction is similar to the parallel heat flux correction commonly employed in Braginskii-based modeling in tokamaks. By using a representative collision time, this correction is a global constant rather than one that varies depending on local plasma parameters. This approach requires a priori specification of $\tau_{dyn}$. For modeling m=0 Z-pinch instability, $\tau_{dyn}$ is set to the characteristic Alfvén time, $\tau_A$, defined as characteristic pinch radius divided by Alfvén speed (see complete definition in herein).

The second and third corrections are related to the breakdown of the Braginskii model when Larmor radii are large compared to the length scale of interest. (There are not analogs of these corrections in the tokamak modeling community, in which small Larmor radius is typically assumed.) One is a global correction, $$f_{corr}^L = \frac{1}{2}\left[1 - \cos\left(\frac{\pi \ell}{2 \hat{r}_{L\alpha}}\right)\right] \text{ where } \hat{r}_{L\alpha} > \frac{\ell}{2}, \text{ and} \quad (24)$$

$$f_{corr}^L = 1 \text{ elsewhere,}$$

based on a representative Larmor radius, $\hat{r}_{L\alpha}$, and length scale of interest, $\ell$. A correction with linear dependence on $r_L$ would allow strong transport even where the Larmor radius is larger than the feature size. The nonlinear dependence of Eq. (24) on Larmor radius is more physically plausible. For $\hat{r}_{L\alpha} = \ell$, the correction is ½, and for $\hat{r}_{L\alpha} > \ell$, the correction becomes stronger (e.g., $f_{corr}^L \approx 0.15$ for $\hat{r}_{L\alpha} = 2\ell$). This correction is applicable to the gyroviscosity ($\eta_3$) and diamagnetic heat fluxes ($\kappa_\Lambda^\alpha$), and also to the transverse (in the r-z plane) stress associated with $\eta_0$, which is linked to changes in Larmor orbit size due to gradients with scale length $\ell$. As for $\tau_{dyn}$, $\ell$ is specified a priori. For modeling linear growth of a mode with known wavenumber k, a sensible choice is $\ell = k^{-1}$. For nonlinear modeling, a sensible choice is $\ell = k_{max}^{-1}/2$, where $k_{max}$ is the wavenumber at which linear growth is maximum. Because linear growth rates tend to fall for $k > k_{max}$, this choice ensures that the transport corrections are applied to the fast-growing modes.

The other correction for large Larmor radius pertains to the special situation near r=0, where magnetic field approaches zero, and Larmor orbits are no longer simple helices. Moving radially from r=0, the Larmor orbit becomes finite, and may eventually reach a value that matches the radius. Using a critical radius, r crit, to approximate this location, an r-dependent correction, $$f_{corr}^r = \frac{1}{2}\left[1 - \cos\left(\frac{\pi r}{r_{crit}}\right)\right] \text{ where } r < r_{crit}, \text{ and} \quad (25)$$

$$f_{corr}^r = 1 \text{ elsewhere,}$$

is applied to reduce transport near r=0 where ion orbits are no longer simple helices. This correction is applied only to $\eta_3$ and $\kappa_\Lambda^{i,e}$. As mentioned in the discussion above of Eq. (24), the nonlinear dependence of $f_{corr}^r$ gives a strong cutoff where local Larmor radius exceeds the distance from the cylindrical axis. It is worth mentioning that the region of small magnetic field near r=0 is also expected to affect transverse stress associated with $\eta_0$. Instead of approaching zero at r=0, however, $72_0$ should match the perpendicular transport, at some level that represents the random walk process within the region of non-helical orbits. An associated correction is not attempted here.

The combination of these three correction factors is sufficient to explore the basic effects of Braginskii transport on Z-pinch stability. As described further herein, examples of corrected coefficients are presented in the context of a FuZE-like equilibrium.

The WARPXM modeling framework is used to solve the 5M2F model on an unstructured grid of triangles using a Runge-Kutta discontinuous Galerkin (RKDG) technique. WARPXM uses MPI parallelization, and the scalability of RKDG is suitable for problems with large dimensionality.

Because of the explicit time stepping employed, the fastest time scale must be resolved. For hyperbolic phenomena, the time step size ($\Delta t_{hyp}$) is limited according to $u\Delta t_{hyp}/h_{eff} \leq C$, where u is the wave speed, $h_{eff}$ is the effective grid resolution, and C is the Courant number, which depends on the particular Runge-Kutta scheme chosen, but is typically ≤1. In 5M2F applications, the speed of light, c=1/$(\mu_0\epsilon_0)^{1/2}$, is often the fastest speed. To allow larger $\Delta t_{hyp}$, c may be reduced by artificially increasing $\epsilon_0$. To ensure system stability, c must exceed the electron thermal speed, $V_{Te}=(2k_BT_e/m_e)^{1/2}$. Further increase of $\Delta t_{hyp}$ is possible by artificially enhancing electron mass to reduce $v_{Te}$. Changes to c and $m_e$ should be moderated to preserve physical accuracy. The allowable overall $\Delta t$ is limited not only by hyperbolic physics, but also by oscillatory and diffusive behavior. Oscillations with angular frequency co require $\Delta t_{osc} \leq 0.5\omega^{-1}$. For diffusive behavior, the time step must satisfy $D\Delta t_{diff}/h_{eff}^2 < C_D$, where D is the relevant diffusivity and $C_D$ is a diffusive Courant number of order unity. This limit on $\Delta t_{diff}$ can be severe, and it is sometimes useful to artificially reduce diffusivities when physically justified. Accounting for all of these restrictions, at each time step, $\Delta t = \min(\Delta t_{hyp}, \Delta t_{osc}, \Delta t_{diff})$ is used.

Three additional details of WARPXM warrant explanation. First, special attention is needed to accurately calculate the gradients needed in the fluxes associated with Braginskii closure, since the discretization of primary variables is discontinuous. To address this issue, the Bassi-Rebay approach is used. Second, to accomodate the cylindrical coordinate system, vector calculus operations are written in terms of rectilinear derivatives and source terms. For example, the divergence of the vector A is often written as $$\nabla \cdot A = \frac{1}{r}\frac{\partial}{\partial r}(rA_r) + \frac{1}{r}\frac{\partial A_\theta}{\partial \theta} + \frac{\partial A_z}{\partial z}.$$

The azimuthal derivative is zero in certain embodiments of the axisymmetric system described herein. The term involving the radial derivative can be rewritten to give $$\nabla \cdot A = \frac{\partial A_r}{\partial r} + \frac{\partial A_z}{\partial z} + \frac{A_r}{r}.$$

The infrastructure of WARPXM can then naturally handle the first two terms, and the last term is included as a source term. Curl, divergence-of-tensor, and gradient-of-vector operations are also written in terms of rectilinear derivatives plus cylindrical source terms. The third detail is related to the spatial integration of these cylindrical source terms. The basic DG method implemented in WARPXM integrates source terms using quadrature based on values at the Legendre-Gauss-Lobatto (LGL) nodes. Triangles have LGL nodes on the edges, and so some nodes are at r=0. Performing the quadrature then requries computing the source terms at r=0. Some of the cylindrical source terms involve first derivatives of the primary variables divided by r. Applying L'Hopital's rule would require knowledge of the second derivative. To avoid the need for second derivatives, the LGL quadrature is replaced with symmetric Gaussian quadrature which does not have quadrature points on the triangle edges, and thus avoids division by 0 at r=0.

The diffuse Bennett Z-pinch equilibrium is the focus of the modeling presented below. This equilibrium may be paramaterized by a pinch radius (a) and plasma current ($I_p$). The azimuthal magnetic field ($B_\theta$), axial current density ($j_z$), and total plasma pressure (p) are then given by $$B_\theta = \frac{\mu_0 I_p}{2\pi} \frac{r}{r^2 + a^2}, \tag{26}$$

$$j_z = \frac{I_p}{\pi} \frac{a^2}{(r^2 + a^2)^2}, \tag{27}$$

$$p = \frac{\mu_0 I_p^2}{8\pi^2} \frac{a^2}{(r^2 + a^2)^2}. \tag{28}$$

Figure 11:
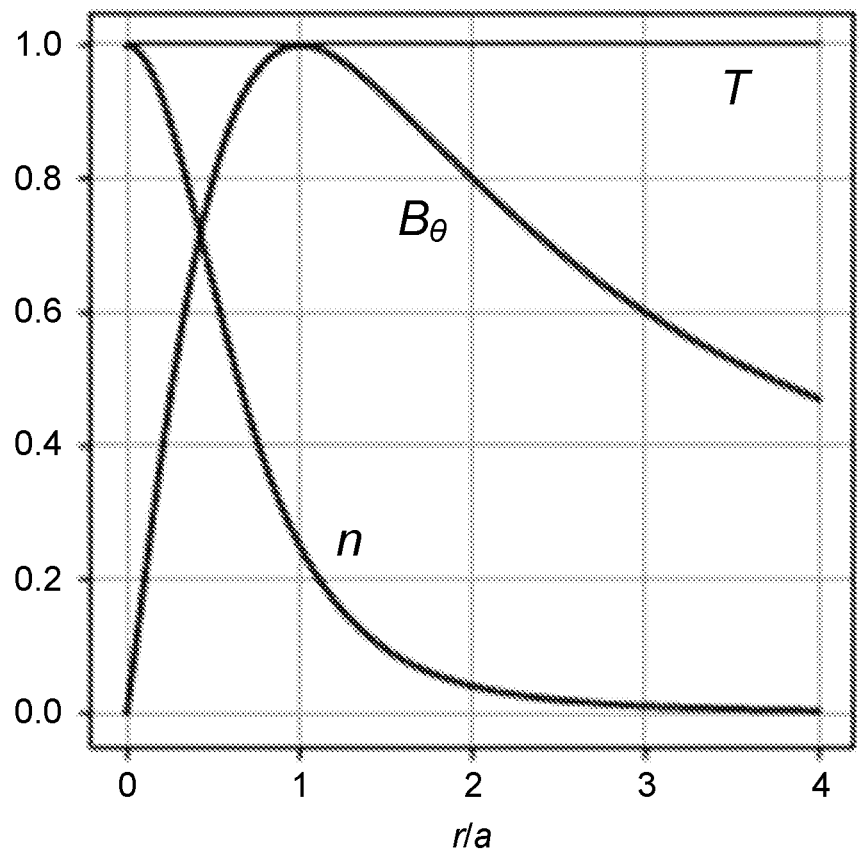
FIG. 11 illustrates normalized radial profiles of magnetic field density and temperature in a Bennett equilibrium, in accordance with at least one embodiment.

FIG. 11 illustrates normalized radial profiles of magnetic field ($B_n$), density (n), and temperature (T) in a Bennett equilibrium.

The total pressure consists of equal contributions from ion and electron pressures. A uniform temperature (T) is assumed such that density ($n_i=n_e=n$ for shear-free equilibria) is proportional to pressure ($p/2=nk_BT$). Exactly half of the plasma mass and current are contained within r=a. Total pressure at r=a is equal to the magnetic pressure, $B_\theta^2(2\mu_0)$, at r=a. The magnetic field, density, and temperature profiles for this equilibrium, normalized by their respective peak values, are shown in FIG. 11.

Momentum equilibrium in the 5M2F model requires $$\frac{\partial p_i}{\partial r} = q_i n_i (E_r + v_{iz} B_\theta), \tag{29}$$

and $$\frac{\partial p_e}{\partial r} = q_e n_e (E_r + v_{ez} B_\theta). \tag{30}$$

Except in cases with sheared flow (see below), equal and opposite ion and electron axial velocities are assumed such that the equilibrium $E_r$ is zero. Thus, $v_{iz}=-v_{ez}=j_z/(2en)$, where embodiments herein assume singly charged ions with charge $q_i=-q_e=e$, where e is the elementary charge. Because $j_z$ and n have the same radial dependence, these velocities are radially uniform. The total current satisfies $j \times B = \nabla p$, and the Lorentz force balances the radial pressure gradient for each species. To establish equilibrium with $v_{iz}=0$, as typically assumed in static MEM equilibrium, finite $E_r$ would be necessary, along with attending charge separation to satisfy Gauss's Law. Some earlier work using the 5M2F model uses equilibria with $v_{iz}=0$ and $E_r=0$; in such cases, oscillations about the equilibrium state are present, though they are presumably benign from the point of view of growth rate determination.

Sheared flow is added to the equilibrium as follows. Ion axial velocity is $v_{iz}=j_z/(2en)+v_{sf}$. Sheared flow velocities that are linear or parabolic in radius are considered herein, i.e., $v_{sf}(r)=v_{sf}^a r/a$ or $v_{sf}(r)=v_{sf}^a(r/a)^2$, where $v_{sf}^a$ is the sheared flow velocity at r=a. The required electric field is determined by Eq. (29) with $n_i=n$, unchanged from the shear-free equilibrium. Gauss's Law is used to find $n_e$. Axial current is unchanged from the shear-free equilibrium, and $v_{ez}$ is set accordingly. Electron pressure is then determined by Eq. (30). For $v_{sf}$ of practical interest ($v_{sf}^a \lesssim v_A$), electron density and pressure differ only slightly (<<1%) from the shear-free values.

The perturbation used here is radially localized using an a known approach, and includes an optional phase shift. By including a phase shift, perturbed mode shapes can closely match the final eigenmode structure, which depends on the applied sheared-flow profile and other plasma parameters. Perturbed density and current density are $n+\delta n$ and $j_z+\delta j_z$, with $$\delta n(r) = \epsilon n(r)\cos(kz - \phi_0 r^\zeta)e^{-(r-a)^2/(2b^2)}, \quad (31)$$

and $$\delta j_z(r) = -\frac{\epsilon}{2}j_z(r)\cos(kz - \phi_0 r^\zeta)e^{-(r-a)^2/(2b^2)}, \quad (32)$$

where k is the perturbation wavenumber. The phase shift is determined by the parameter $\phi_0$ and the factor $r^\zeta$; $\zeta=1$ and 2 are used in simulations with linear and parabolic sheared flow, respectively. The radial localization uses the parameter b=a/3. The perturbations added to ion and electron velocity are $\delta v_{iz}=-\delta v_{ez}=\delta j_z/(2en)$. The equilibrium magnetic field is unchanged, so Faraday's Law is out of balance such that electric field immediately begins evolving in response to the perturbation.

The computational domain is rectangular in the r-z plane. The axial length matches the perturbed wavelength, i.e., $L_z=2\pi/k$. The radial extent of the domain is 4a. This domain setup matches previous work on m=0 instability analysis. The axial boundaries are periodic. At r=0, standard axisymmetry boundary conditions are used: the radial and azimuthal components of vector quantities are zero, while scalars and axial components of vector quantities have no radial variation. At r=4a, perfect-slip conducting wall boundary conditions are applied. That is, radial velocity, radial magnetic field, and axial electric field are zero. Density, pressure, axial velocity, radial electric field, and axial magnetic field have no radial variation.

Several characteristic quantities are used in the analysis and discussion below. The characteristic Alfvén velocity is $v_A=B_{\theta,pk}/(n_{pk}m_i\eta_0)^{1/2}$, where $B_{\theta,pk}$ and $n_{pk}$ are the peak magnetic field and number densities. Characteristic time is defined as $\tau_A=a/v_A$. Ion thermal speed is $v_{Ti}=(2k_BT/m_i)^{1/2}$. Ion Larmor radius is $r_{Li}=m_iv_{Ti}/(eB_{\theta,pk})$. The thermal speed is related to the Alfvén velocity as $v_{Ti}=\sqrt{2}v_A$. Hydrogen ions are assumed.

For a given choice of a and $I_p$, the pressure is determined, but the density and temperature are not yet specified. Density and temperature are established by specifying the ratio of pinch size to ion Larmor radius, $a/r_{Li}$. Using the definition of $v_{Ti}$, solving for $T_i$ gives $$T = T_e = T_i = \frac{(aeB_{\theta,pk})^2}{2m_ik_B(a/r_{Li})^2}. \quad (33)$$

Ion and electron density follow from the relation $nk_BT=p/2$.

In the ideal 5M2F model, normalized dynamics, such as the normalized instability growth rate $\gamma\tau_A$, depend on the choice of $a/r_{Li}$, but specific choices of a and $I_p$ are not important. Braginskii transport, however, depends on the plasma properties (density, temperature, and magnetic field), and in the applications discussed below of 5M2F with Braginskii closure, a, $I_p$, and $a/r_{Li}$ are all specified.

Sotnikov et al. [V. I. Sotnikov, L Paraschiv, V. Makhin, B. S. Bauer, J. N. Leboeuf, and J. M. Dawson, "Linear analysis of sheared flow stabilization of global magnetohydrodynamic instabilities based on the Hall fluid model," *Phys. Plasmas* 9, 913 (2002)] apply a linearized Hall-MHD model to study growth of the m=0 instability in Bennett equilibria, with various Hall parameter strength. The Hall effect is parameterized using $\epsilon_{Sot.}=c/(\omega_{pi}R)$, where $\omega_{pi}=[n_{i0}e^2(\epsilon_0m_i)]^{1/2}$ is the ion plasma frequency, and R is the radius of the modeled domain, and $n_{i0}$ is the ion density at r=0. To relate $\epsilon_{Sot.}$ to the parameter $a/r_{Li}$, note that Sotnikov et al. use R=3a. Using $r_{Li}$ and $v_{Ti}$ introduced earlier, the relationship is found to be $a/r_{Li}=(3\sqrt{2}\epsilon_{Sot.})^{-1}$. The Sotnikov et al. cases with $\epsilon_{Sot.}=0.1$ and 0.01 are used as benchmark cases; these correspond to $a/r_{Li}=(3\sqrt{2}\epsilon Sot.)^{-1}\approx 2.357$ and 23.57. Noting that the characteristic time used by Sotnikov et al., $\tau_{Sot.}=R/V_{Ti}$, is related to Alfvén time by $\tau_A=\tau_{Sot.}\sqrt{2}/3$, the growth rate at ka=10/3 with no sheared flow for $\epsilon_{Sot.}=0.1$ is $\gamma\tau_A=1.27$, and with $\epsilon_{Sot.}=0.01$ is $\gamma\tau_A=0.80$. With $\epsilon_{Sot.}=0$, in which case the Hall-MHD model reduces to ideal MHD, $\gamma\tau_A=0.73$.

Figure 12A:
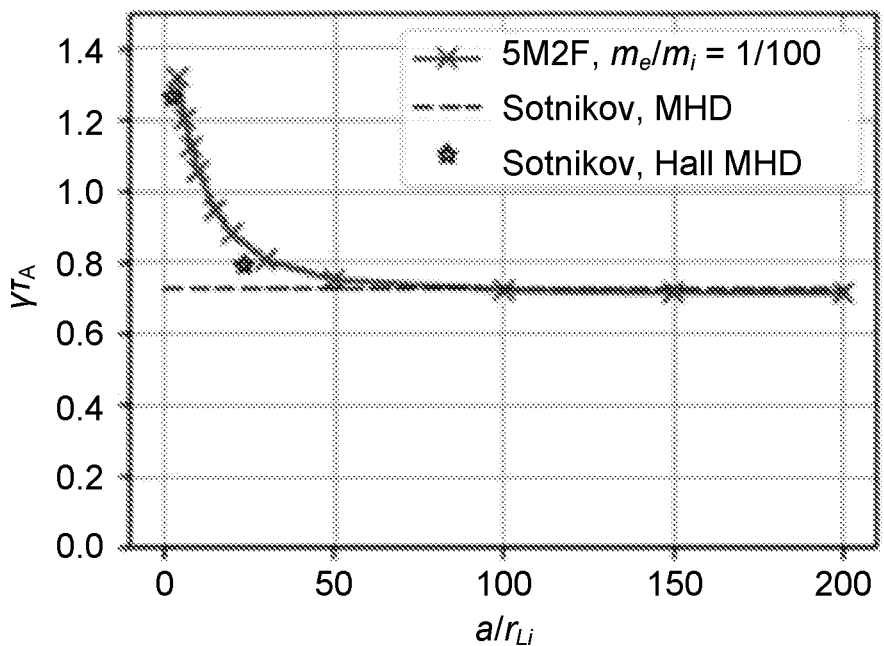
FIG. 12A shows an example time trace, in accordance with at least one embodiment.

In ideal 5M2F simulations without sheared flow, close agreement with MHD and Hall-MHD results is seen. Linear growth rates for the m=0 instability are determined from the linear growth phase in the nonlinear simulations. With normalized axial wavenumber ka=10/3, growth rates for $a/r_{Li}$ ranging from 4 to 200 are shown in FIG. 12A. For these simulations, the mass ratio is $m_e/m_i=1/100$ and the perturbation level is $\epsilon=10^{-3}$. Growth rates are found by considering the change in volume-integrated radial kinetic energy of the ion fluid ($KE_{i,rad}=\int_V dV m_i n_i v_{ir}^2/2$), where $v_{ir}$ is the ion radial velocity, during a period of exponential growth from time $t_0$ to $t_1$. The growth rate is computed as $$\gamma = \frac{\ln\left[\frac{KE_{i,rad.}(t_1)}{KE_{i,rad.}(t_0)}\right]}{2(t_1-t_0)}. \quad (34)$$

Figure 12B:
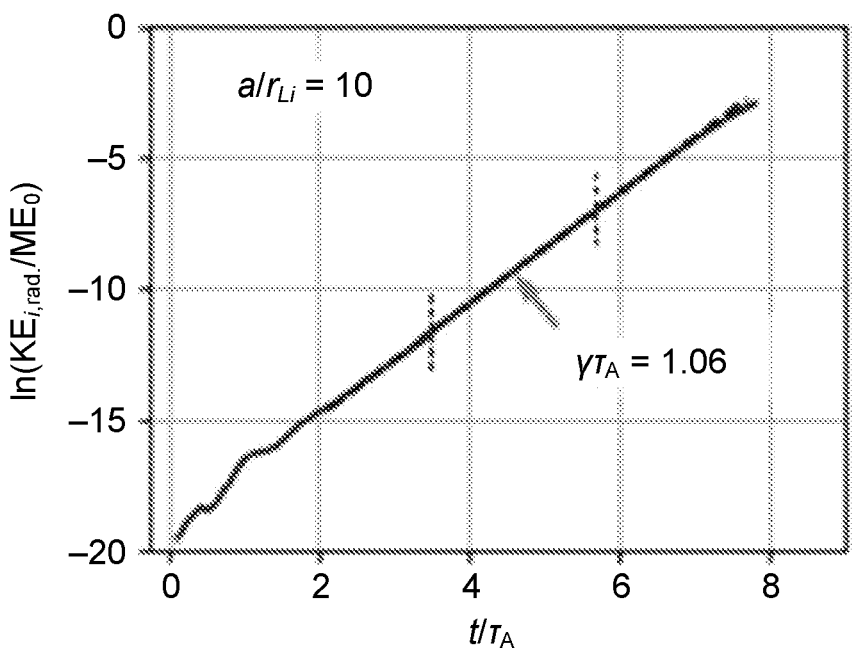
FIG. 12B shows an example time trace of integrated radial ion kinetic energy, normalized by initial magnetic energy, in accordance with at least one embodiment.

An example time trace of $\ln(KE_{i,rad}/ME_0)$, where $ME_0$ is the initial magnetic energy, is shown in FIG. 12B.

FIGS. 12A and 12B illustrate ideal 5M2F results at ka=10/3. FIG. 12A illustrates growth rates for $a/r_{Li}$ ranging from 4 to 200. At large $a/r_{Li}$, the 5M2F growth rate agrees with result found by Sotnikov et al. for pure MHD (dashed line). For smaller $a/r_{Li}$, the 5M2F results are close to the corresponding Sotnikov et al. results. FIG. 12B illustrates an example time trace of integrated radial ion kinetic energy, normalized by initial magnetic energy. Vertical dotted lines bracket the period over which linear growth is measured, and a dashed line shows the measured exponential growth.

Results for a relatively large Larmor radius regime are shown in FIG. 13A, again for ka=10/3. For $a/r_{Li}\lesssim 2$, the result using $m_e/m_i=1/100$ is similar to the result with real mass ratio $m_e/m_i=1/1836$, deviating by up to 30% at $a/r_{Li}\approx 1.2$.

Fast growth appears in the region with $a/r_{Li} \lesssim 1.3$. As explored further below, this fast growth is attributed to an electron drift instability. Radial ion kinetic energy growth is plotted in FIG. 13B for $a/r_{Li}=1.2$. Rapid kinetic energy growth is seen at $t/\tau_A \approx 2$, near the end of the simulation. Inspection of the solution shows that the rapid growth is due to the development of a high-k mode with wavelength set by the computational grid. Refining the grid results in a faster, higher-k mode, and is thus counterproductive to the goal of identifying the growth rate of the perturbed ka=10/3 mode. The linear growth period of the perturbed mode is very short for simulations with $a/r_{Li} \lesssim 1$, making it difficult to precisely determine the simulated growth rate; growth rates found for cases with $a/r_{Li} \lesssim 1.3$ have errors on the order of 10%.

Figure 13A:
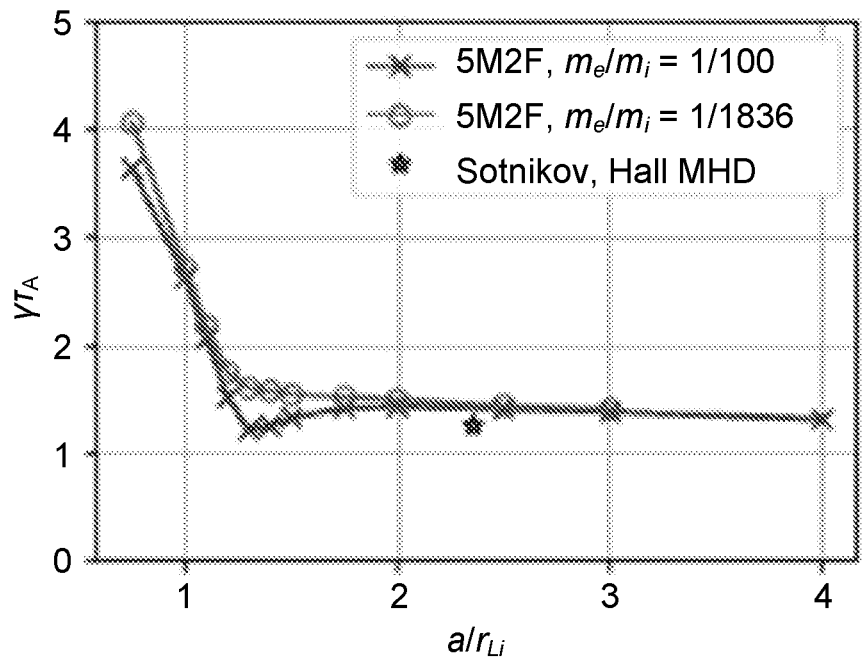
FIG. 13A shows ideal five-moment, two-fluid (5M2F) results, in accordance with at least one embodiment.
Figure 13B:
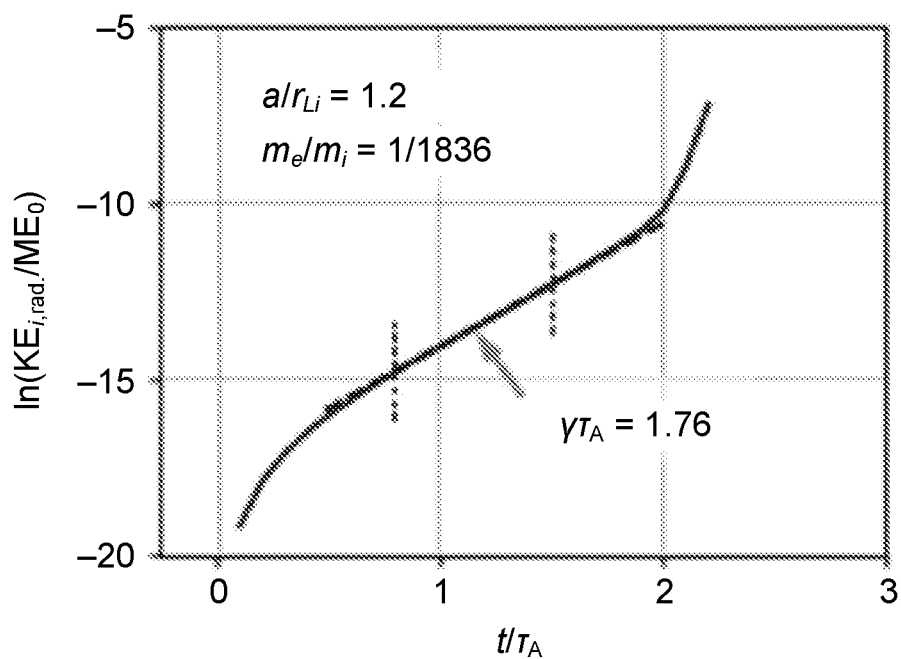
FIG. 13B shows an example time trace of integrated radial ion kinetic energy, normalized by initial magnetic energy, in accordance with at least one embodiment.

FIGS. 13A and 13B illustrate ideal 5M2F results at ka=10/3, focusing on small $a/r_{Li}$. FIG. 13A illustrates growth rates for $a/r_{Li}$ ranging from 0.75 to 4 for two electron-ion mass ratios. For $a/r_{Li}$ between 1.5 and 4, growth rates vary slowly. For $a/r_{Li}$ less than approximately 1.1, faster growth is observed. FIG. 13B illustrates an example time trace of integrated radial ion kinetic energy, normalized by initial magnetic energy.

Figure 14:
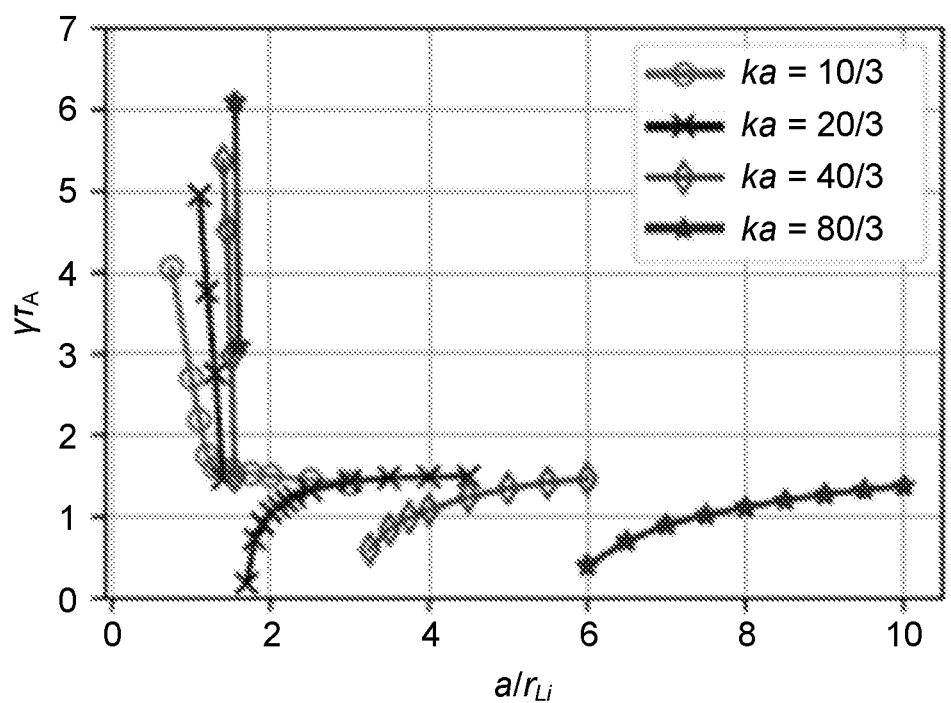
FIG. 14 shows ideal 5M2F results with several perturbed wavenumbers, in accordance with at least one embodiment.

Additional scans of $a/r_{Li}$ are performed at ka=20/3, 40/3, and 80/3. All of these simulations use $m_e/m_i=1/1836$. Results are shown in FIG. 14. The region with fast growth due to the electron drift instability persists in the region $a/r_{Li} \lesssim 1.8$. A region with no growth emerges where $a/r_{Li} \gtrsim 1.8$, and expands as the perturbed wavenumber is increased. For a given ka, growth goes to zero as $r_{Li}$ approaches the mode wavelength. In terms of ka, a value of $a/r_{Li}$ below which damped growth is expected may be approximated as $(a/r_{Li})_{damp} \approx ka/(2\pi)$. At ka=40/3, for example, $(a/r_{Li})_{damp} \approx 2.11$, consistent with the result seen in FIG. 14. The zero-growth region extends from $(a/r_{Li})_{damp}$ to $a/r_{Li} \approx 1.8$, where an electron drift instability appears.

FIG. 14 illustrates ideal 5M2F results with several perturbed wavenumbers. A fast-growing mode persists at $a/r_{Li} \lesssim 1.8$, but a region with no growth appears and widens as the perturbed wavenumber increases.

Figure 15:
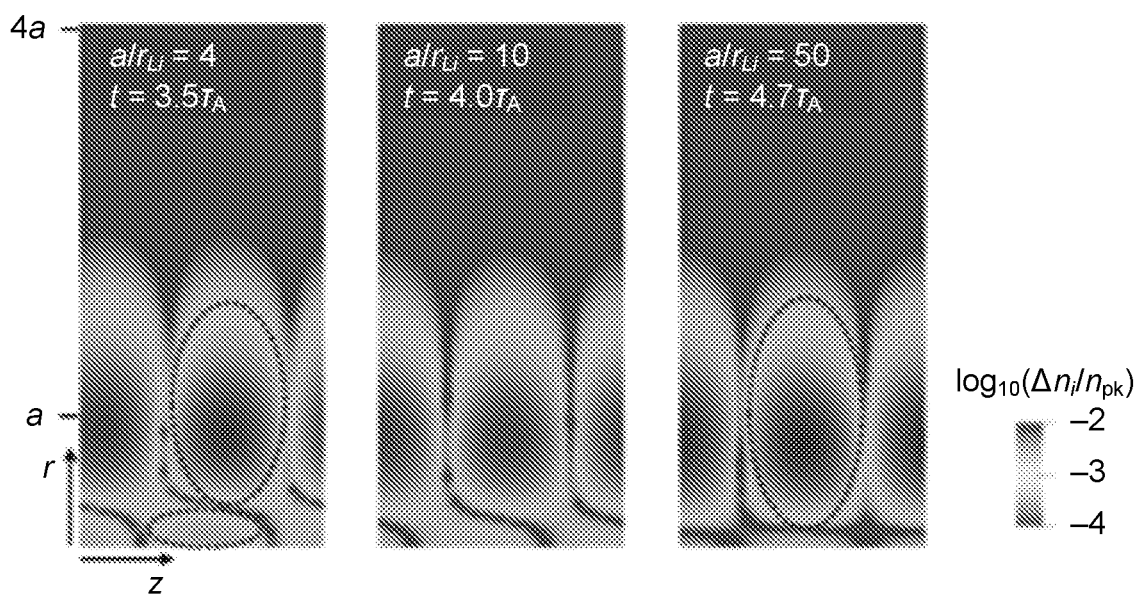
FIG. 15 shows ideal 5M2F mode structures, in accordance with at least one embodiment.

For $m_e/m_i=1/100$ and ka=10/3, density structures of the linearly growing modes are shown in FIG. 15 for $a/r_{Li}=4, 10,$ and 50. At large $r_{Li}$, a slight drift of the mode structure in the +z direction is visible; at $a/r_{Li}=4$, the total shift is about ⅛ of the axial wavelength. A tilt is seen at large $r_{Li}$, with the structure at greater radii shifted in the +z direction more than the structure at smaller radii. Spatial resolution for the results in FIG. 15 is 64×16 (radial×axial) cells, with third-order spatial accuracy.

FIG. 15 illustrates ideal 5M2F mode structures at $a/r_{Li}=4, 10,$ and 50. The base-10 logarithm of the change in density, normalized to the peak equilibrium density is plotted in the r-z plane. At $a/r_{Li}=50$ (MHD-like), a single lobe, indicated by a dashed oval, dominates the radial structure. At smaller $a/r_{Li}$, two lobes are present, indicated by dashed ovals in the case with $a/r_{Li}=4$: a smaller lobe is present near the axis, and is not aligned with the main lobe.

The growth rate values shown in FIG. 12A have errors ≲1%. Three known sources of error are considered to arrive at this conclusion:

Spatial resolution: The scan uses a base spatial resolution 40×10 (radial×axial) cells, with third-order spatial accuracy. At $a/r_{Li}=4, 10,$ and 50, the convergence behavior with respect to spatial resolution is studied. In each case, error at the base resolution is <0.1%. The feature size, as seen in FIG. 15 is half of the axial domain and is represented by five cells. With a third order representation (which uses quadratic polynomials), the accuracy is very good. The radial representation of the modes is as good or better than the axial representation.

Mass ratio: A enhanced electron mass $m_e/m_i=1/100$ is used in the scan. Simulations that use real mass ratio ($m_e/m_i=1/1836$) are run at $a/r_{Li}=4, 10,$ and 50, and used to determine the error associated with the enhanced mass. Errors are 1.0%, 0.6%, and 0.8% at $a/r_{Li}=4, 10,$ and 50, respectively. With $m_e/m_i=1/100$, the combined ion-electron fluid density in the 5M2F model is 1% larger than that of the MHD fluid, so errors on the order of 1% are expected. In situations with strong two-fluid effects, enhanced electron mass can cause larger error, as seen in FIG. 13A.

Speed of light: The speed of light is set to $3v_{Te}$ in the scan. At $a/r_{Li}=4, 10,$ and 50, simulations are run with the speed of light doubled, and redoubled, up to $12v_{Te}$ in each case. Over this range, variations of the measured growth rate are <0.5% at all three values of $a/r_{Li}$, indicating that the reduced electromagnetic wave speed has only a minor effect on the modeled instabilities.

Figure 16A:
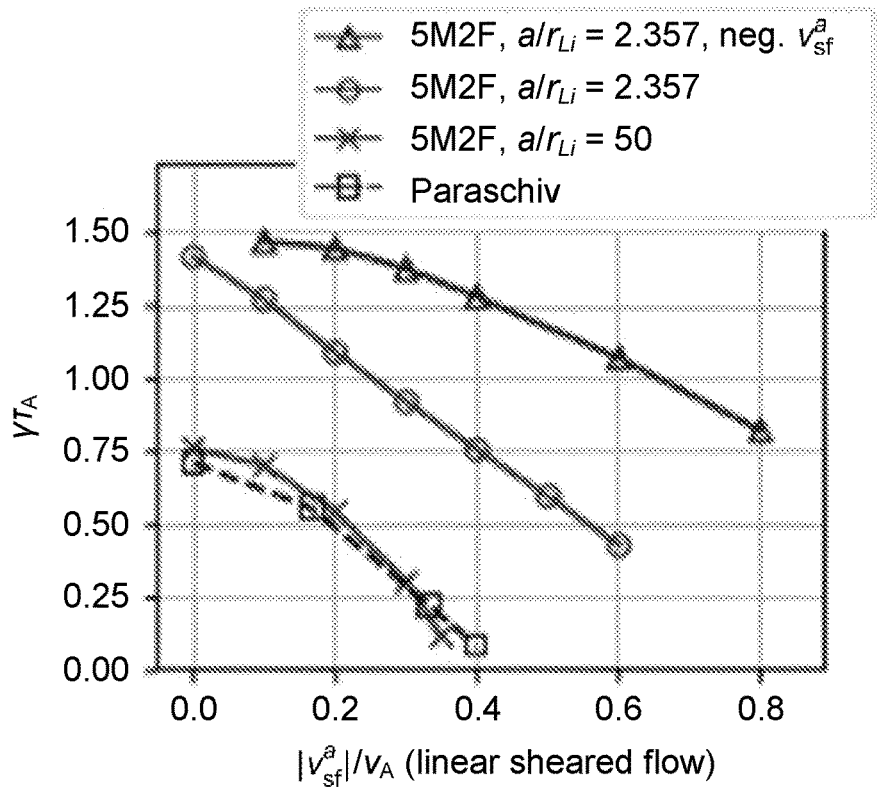
FIG. 16A shows ideal 5M2F results with stabilization by linear flow, in accordance with at least one embodiment.
Figure 16B:
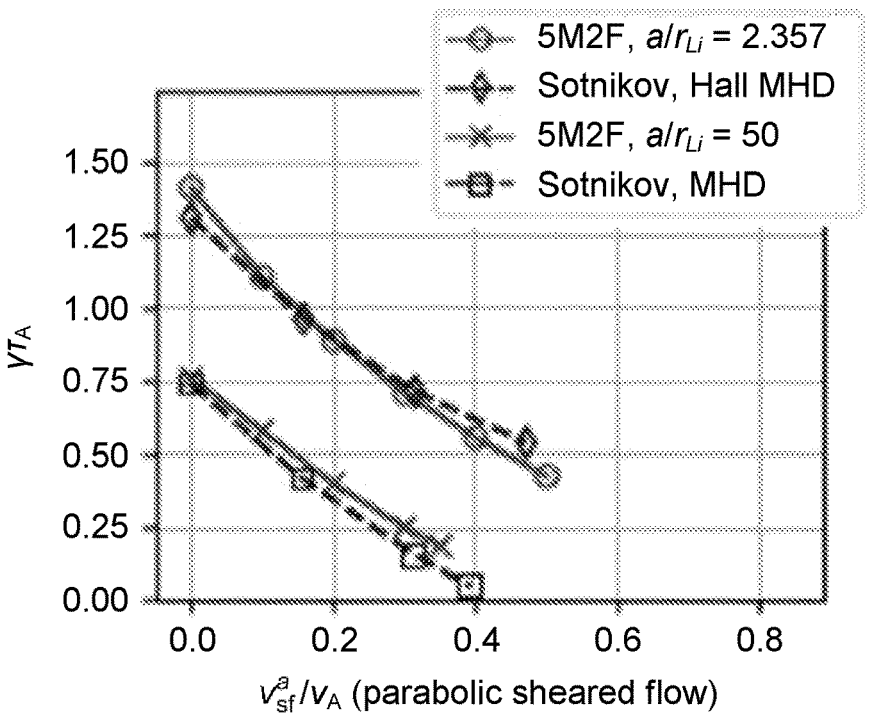
FIG. 16B shows ideal 5M2F results with stabilization by parabolic sheared flow, in accordance with at least one embodiment.

Ideal 5M2F simulations of the ka=10/3 mode with linear and parabolic sheared-flow profiles give results similar to prior work using MHD and Hall MHD. FIGS. 16A and 16B show the m=0 growth rates in scans of the sheared-flow strength, $v_{sf}^a$. Growth rates from the 5M2F model with $a/r_{Li}=50$, are compared with MHD results, and 5M2F with $a/r_{Li}=2.357$ are compared with Hall-MHD results that use an equivalent Hall parameter. As shown, MHD-like 5M2F modeling at $a/r_{Li}=50$ gives qualitatively similar results to ideal MHD modeling with linear and parabolic sheared-flow profiles. Complete stabilization occurs with pinch-edge velocity is $v_{sf}^a \approx 0.4 v_A$. In plasmas with $a/r_{Li}=2.357$, 5M2F simulations with linear sheared flow indicates that stabilization requires $v_{sf}^a/v_A>0.6$. (Note that comparable simulations of linear sheared flow with Hall MHD are not readily available.) With parabolic sheared flow, 5M2F modeling suggests stabilization of plasmas with $a/r_{Li}=2.357$ at $v_{sf}^a/v_A>0.5$, similar to the linear sheared-flow case. The 5M2F modeling agrees well with the MHD and Hall-MHD results.

FIGS. 16A and 16B illustrate ideal 5M2F results with stabilization by linear and parabolic sheared flows, respectively. All simulations have ka=10/3. Growth rates found with MHD and Hall-MHD modeling are shown for comparison. The scans shown in FIG. 16A include one scan with reversed sheared flow, labeled "neg. $v_{sf}^a$"; all other scans in FIG. 16A have positive $v'_{sf}$.

The prior work with Hall MHD (and also the PIC results discussed herein) used positive sheared flow, i.e., positive values of 4. Anticipating that two-fluid effects will depend on sheared-flow direction, a scan is done with negative 4, i.e., reversed sheared flow, as shown in FIG. 16A. The stabilizing effect of sheared flow is reduced when flow is reversed, and $v_{sf}^a > v_A$ is required for stabilization. As $a/r_{Li}$ becomes large, the growth rates seen with sheared flow—postive or negative—will approach the MHD results, which are independent of sheared-flow direction.

Figure 17:
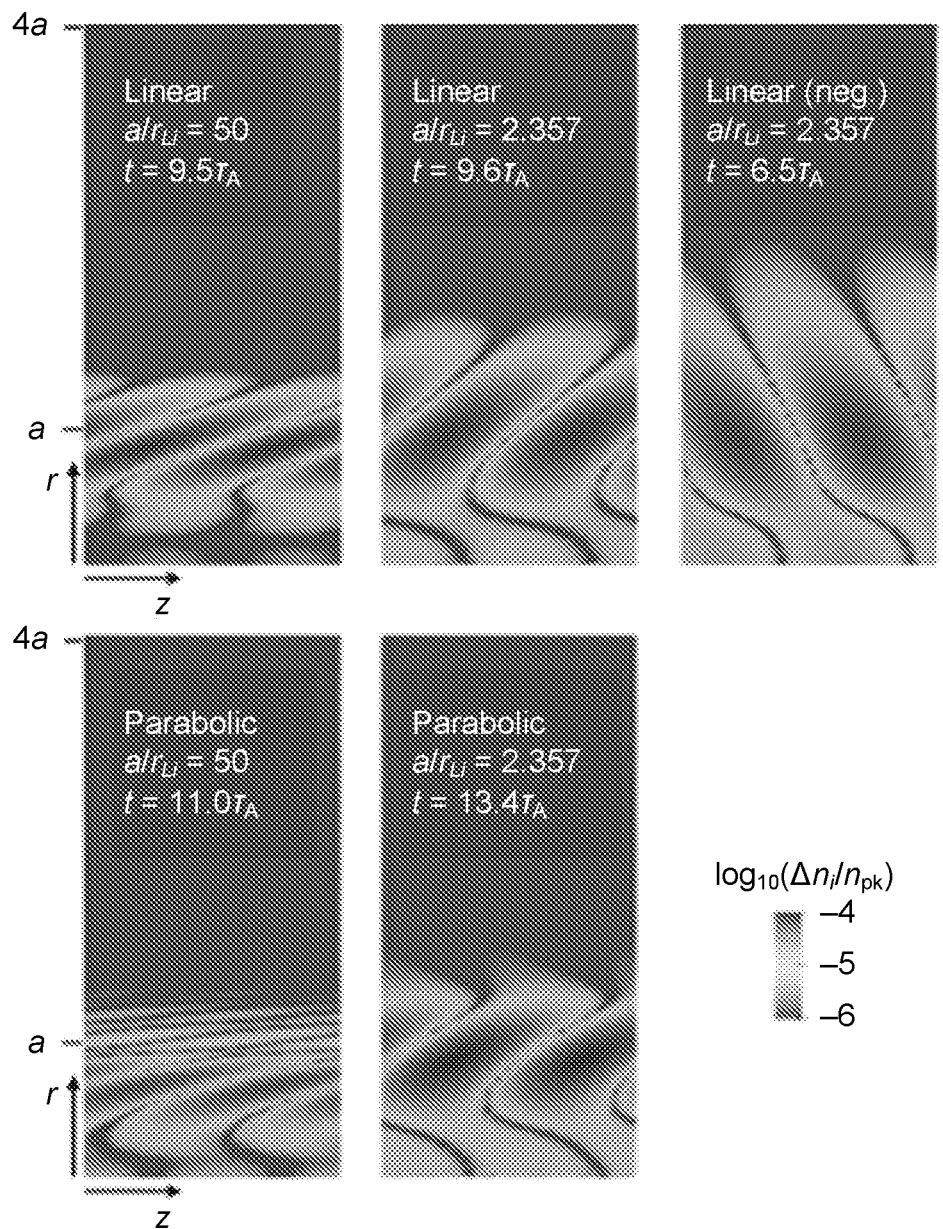
FIG. 17 shows mode structures in ideal 5M2F modeling with sheared flow, in accordance with at least one embodiment.

FIG. 17 illustrates mode structures in ideal 5M2F modeling with sheared flow. Results are shown for linear (top row) and parabolic (bottom row) sheared flow, for MHD-like ($a/r_{Li}=50$) and large-Larmor-radius ($a/r_{Li}=2.357$) plasmas as indicated. All cases use positve sheared flow (in the sense discussed in the text) except for one case with negative linear sheared flow labeled as "neg." In all cases, the sheared-flow speed at the pinch edge is $|v_{sf}^a|=0.3v_A$.

Sheared flow stretches the exponentially growing mode axially. FIG. 17 shows mode structures for simulations with sheared-flow speed $|v_{sf}^a|=0.3v_A$. Comparing linear and parabolic results for a given $a/r_{Li}$, parabolic sheared flow restricts the mode structure to smaller radius. For linear sheared flow with $a/r_{Li}$=2.357, results are shown for both positive and negative sheared flow. In the case with negative sheared flow, alignment of the near-axis lobe of the structure with the main lobe seems to promote the observed larger growth rate.

Figure 18A:
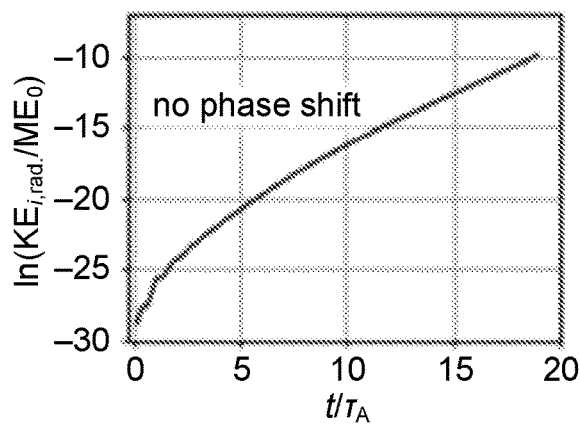
FIGS. 18A-18D show mode growth behavior in the 5M2F model with and without an initial phase shift in the perturbation, in accordance with at least one embodiment.
Figure 18B:
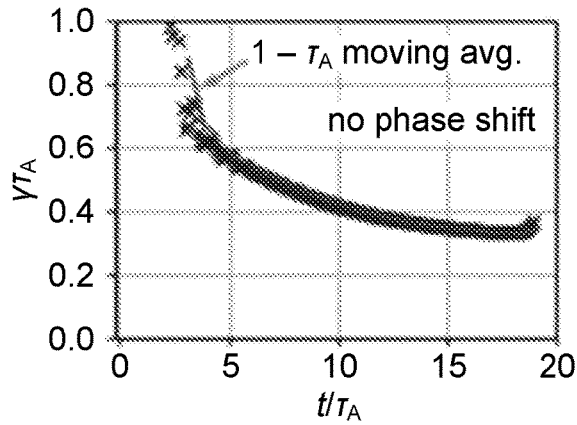
Figure 18C:
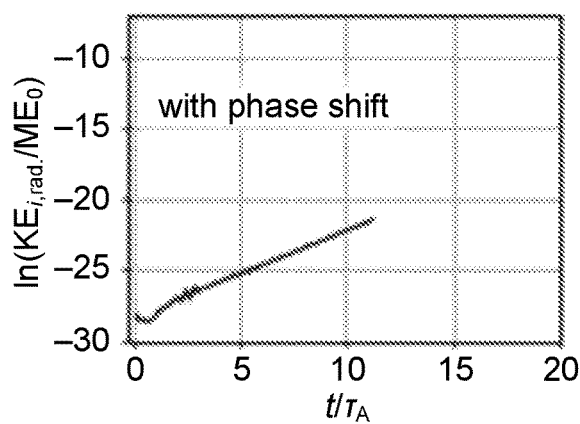
Figure 18D:
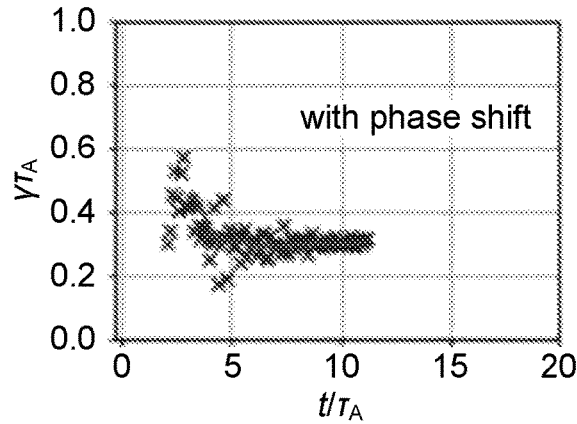

To accurately capture steady exponential growth in the presence of such stretching, the resolution and perturbation size and shape are chosen carefully. Full development of the mode structure takes approximately $5\tau_A$ or longer, depending on plasma parameters and sheared flow details. If the perturbation level is $\epsilon=10^{-3}$ as used in the shear-free simulations, nonlinearities may affect mode growth before full development. Therefore, in these sheared-flow simulations, a smaller perturbation is used. Higher resolution is also used in these cases, both to limit noise, which can obscure growth of the small perturbation, and to minimize unintended seeding of short wavelength modes that can grow quickly and disturb development at the perturbed axial wavenumber. Short wavelength modes are less problematic in the cases with $a/r_{Li}$=2.357, since strong two-fluid effects suppress high-k growth. To further mitigate difficulties with high-k growth and nonlinearities, a phase shift, as discussed elsewhere herein, is included. An appropriate value of the phase shift parameter, $\phi_0$, is found by executing a preliminary simulation with $\phi_0$=0, observing the mode stretching in the late stages of the simulation prior to interruption of growth by nonlinearities or high-k mode growth. For a second and final simulation, $\phi_0$ is chosen such that the shape of the initial condition roughly matches the stretched mode seen in the preliminary simulation. FIGS. 18A-18D illustrate an example of mode growth with and without a phase-shifted initial condition. Without phase shift, the mode stretching results in a steadily decreasing growth rate before the simulation is finally disrupted by high-k growth, observable at $t\approx18\tau_A$. By including a phase shift, the simulation rapidly enters a period of linear growth. The lines in FIGS. 18A and 18C represent data computed at $\tau_A/10$ intervals. In FIGS. 18B and 18D, the values of $\gamma\tau_A$ at times t are computed using Eq. (34) with $t_1$=t and $t_0$=t−$2\tau_A$.

The MHD-like 5M2F simulations ($a/r_{Li}$=50) all use 64×16 (radial×axial) cells with fifth-order elements and $\epsilon=1\times10^{-5}$. Large-$r_{Li}$ simulations ($a/r_{Li}$=2.357) use 64×16 (radial×axial) cells with fourth-order elements and $\epsilon=1\times10^{-7}$. The phase shifts are given in TABLE I.

TABLE I

Settings used for ideal 5M2F simulations with sheared flow. Phase shift parameters $\phi_0$ are given for each run with sheared flow. For linear sheared flow, the overall phase shift is $\phi_0 r$, while for parabolic sheared flow, it is $\phi_0 r^2$; see Eqs. (31) and (32).

| $a/r_{Li}$ | sheared flow type | $v_{sf}^a/v_A$ | $\phi_0$ |
|---|---|---|---|
| 50 | none | 0 | 0 |
| • | linear | 0.1 | π/2 |
| • | • | 0.2 | π |
| • | • | 0.3 | 2π |
| • | • | 0.35 | 3π |
| 2.357 | none | 0 | 0 |
| • | linear | 0.1 | π/2 |
| • | • | 0.2 | 3π/4 |
| • | • | 0.3 | π |
| • | • | 0.4 | 3π/2 |
| • | • | 0.5 | 7π/4 |
| • | • | 0.6 | 2π |
| 2.357 | linear | −0.1 | 0 |
| • | • | −0.2 | −π/4 |
| • | • | −0.3 | −π/2 |

TABLE I-continued

Settings used for ideal 5M2F simulations with sheared flow. Phase shift parameters $\phi_0$ are given for each run with sheared flow. For linear sheared flow, the overall phase shift is $\phi_0 r$, while for parabolic sheared flow, it is $\phi_0 r^2$; see Eqs. (31) and (32).

| $a/r_{Li}$ | sheared flow type | $v_{sf}^a/v_A$ | $\phi_0$ |
|---|---|---|---|
| • | • | −0.4 | −3π/4 |
| • | • | −0.6 | −π |
| • | • | −0.8 | −3π/2 |
| 50 | parabolic | 0.1 | π/2 |
| • | • | 0.2 | 3π/4 |
| • | • | 0.3 | 3π/2 |
| • | • | 0.35 | 2π |
| 2.357 | parabolic | 0.1 | π/4 |
| • | • | 0.2 | π/2 |
| • | • | 0.3 | 3π/4 |
| • | • | 0.4 | 7π/8 |
| • | • | 0.5 | π |

Deviation from the exact linear growth rate in these simulations is estimated to be no more than 10% and generally a few percent or less. This level of error is higher than for the shear-free results primarily due to the challenges associated with simultaneously avoiding high-k modes and nonlinearities.

FIGS. 18A-18D illustrate mode growth behavior in the 5M2F model with and without an initial phase shift (effectively a tilt) in the perturbation. Results are for simulations in an MHD-like regime ($a/r_{Li}$=50), including linear sheared flow with pinch edge velocity $v_{sf}^a$=0.3$v_A$. FIG. 18A shows evolution of radial ion kinetic energy normalized by initial magnetic energy. FIG. 18B shows the normalized growth rate, $\gamma\tau_A$, derived from the kinetic energy growth at 0.1$\tau_A$ intervals. The approach used to find each plotted value (x) is discussed in the main text. The red line shows the 1−$\tau_A$ moving average of the individual values. FIGS. 18C and 18D are similar to FIGS. 18A and 18B, but for a case with perturbation phase shift $\phi_0$ or with $\phi_0$=2π.

In recent research using PIC modeling, the m=0 instability was considered in a FuZE-like equilibrium. In the discussion below, the equilibrium is presented, and details related to implementing Braginskii transport in this equilibrium are provided below. Also below, 5M2F modeling with Braginskii transport is compared with PIC results.

A Bennett equilibrium is used to represent a typical FuZE plasma. As discussed in detail above, the normalized profiles in FIG. 11 may be given dimensions by choosing $I_p$, a, and $a/r_{Li}$. Following previous work, the FuZE-like equilibrium has $a/r_{Li}$=5.825, a=0.91 mm and $I_p$=300 kA. These choices give $B_{\theta,pk}$=33.0 T, $n_{pk}$=4.25×10$^{24}$ m$^{-3}$, and T=1.27 keV. The associated characteristic time and Alfvén velocity are $\tau_A$=2.61 ns and $v_A$=3.49×10$^5$ m/s.

Figure 19:
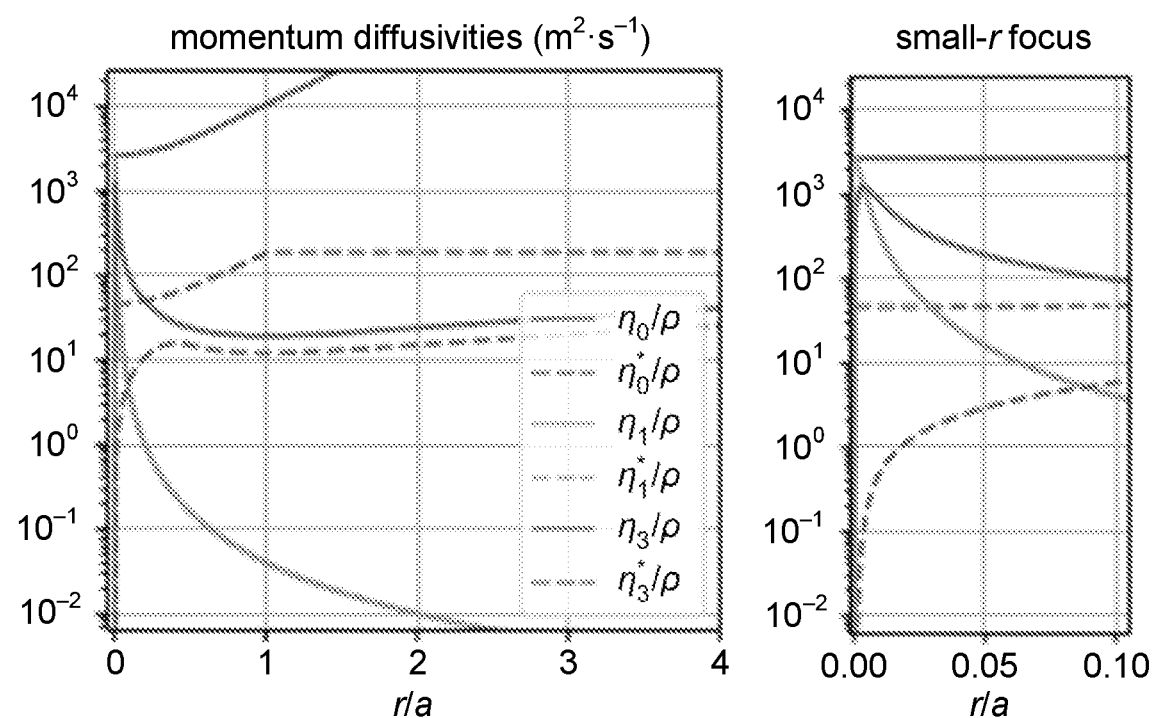
FIG. 19 shows momentum diffusivities in the FuZE-like equilibrium, in accordance with at least one embodiment.

The Braginskii closure model, including kinetic corrections, is presented herein. Here, the transport coefficients, before and after correction, are considered specifically in the FuZE-like equilibrium. FIG. 19 shows corrected and uncorrected viscous diffusivities. Corrections are made according to Eqs. (23), (24), and (25). In Eq. (23), $\hat{\tau}_i$ is $\tau_i$ computed at peak density, and $\tau_{dyn}=\tau_A$. In Eq. (24), $\hat{r}_{Li}$ is $r_{Li}$, the characteristic ion Larmor radius discussed herein, and $\ell$ is chosen to be 0.2a, corresponding to $k^{-1}$, with ka=5. In Eq. (25), $r_{crit}$=0.5a, which is comparable to the location r=0.31a at which the ion Larmor radius matches the radius itself. Diffusivities are found by dividing the viscosity coefficients by mass density ($\rho=m_i n_i$). Braginskii thermal transport coefficients, discussed below, are also expressed as diffusivities to facilitate comparison. The corrected coefficient $\eta^*_0/\rho$ is found as $\eta^*_0/\rho = f_{corr}^\tau f_{corr}^L \eta_0/\rho$. A diffusivity limit, $D_{lim}$ is also enforced, with $D_{lim}$ equal to $\eta^*_0/\rho$ at r=a. The diffusivity limit is imposed for purely numerical reasons: diffusion associated with $\eta^*_0/\rho$ typically sets the maximum time step that can be used in simulations. By imposing $D_{lim}$, the dynamics of interest are preserved, but the time step can be increased significantly. The corrected coefficient $\eta^*_3/\rho$ is found as $\eta^*_3/\rho = f_{corr}^L f_{corr}^r \eta_0/\rho$. The corrected coefficient $\eta^*_1/\rho$ is found as $\eta^*_1/\rho = \max(\eta^*_0/\rho, \eta_1/\rho)$.

FIG. 19 illustrates momentum diffusivities in the FuZE-like equilibrium. Uncorrected diffusivities (coefficients without *) have features that are unphysical and/or numerically challenging. Diffusivities are corrected (coefficients with *) to address these issues as described in the main text. Corrections are made per Eqs. (23), (24), and (25) with $\ell = 0.2a$ and $r_{crit} = 0.5a$.

Figure 20:
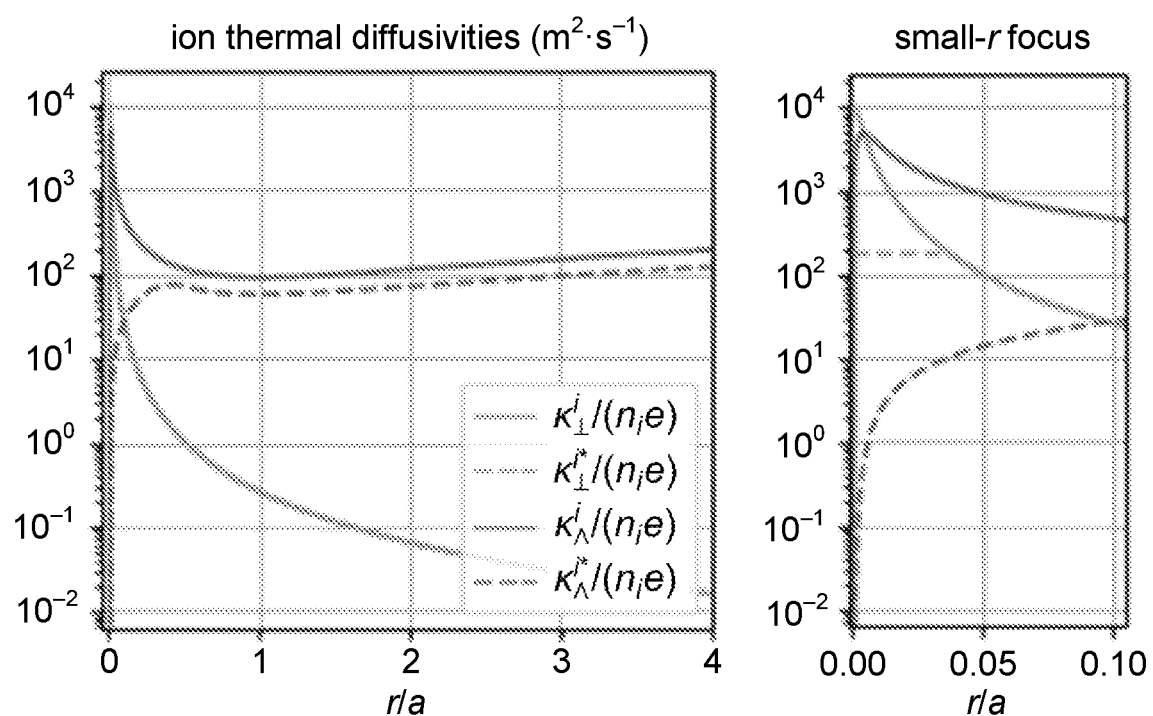
FIG. 20 shows corrected and uncorrected ion thermal diffusivities, in accordance with at least one embodiment.

FIG. 20 shows corrected and uncorrected ion thermal diffusivities. Corrections are made using $\ell = 0.2a$ and $r_{crit} = 0.5a$, as for momentum diffusivities. The diffusivity limit used for momentum diffusivity is also imposed, though it affects $\kappa_\perp^i$ in only a small region near r=0. Electron thermal diffusivities are not shown; of the Braginskii electron transport terms, only the diamagnetic heat flux term is retained, and the associated coefficient $\kappa_\wedge^e$ is almost identical to its ion counterpart except very near r=0. In that region, radial variation of ice, $\kappa_\wedge^e$ is more extreme than $\kappa_\wedge^i$. A correction factor similar to $f_{corr}^L$ in Eq. (24) is not applied, since the characteristic electron Larmor radius is small compared to $\ell$. The location at which the electron Larmor radius matches the radius itself is 0.09a, so using $r_{crit} = 0.2a$ would be reasonable. Using this small $r_{crit}$ and applying $f_{corr}^r$ per Eq. (25) yields $\kappa_\wedge^{e*}/(n_e e)$ peaking near 300 m$^2 \cdot$s$^{-1}$ at r=0.15. $r_{crit} = 0.5a$ is chosen to give a more numerically tractable profile of $\kappa_\wedge^{e*}/(n_e e)$, with a peak near 120 m$^2 \cdot$s$^{-1}$ at r=0.4. At r=0.4 and beyond, $\kappa_\wedge^{e*}/(n_e e)$ is nearly identical to the uncorrected $\kappa_\wedge^i/(n_e e)$ shown in FIG. 20.

FIG. 20 illustrates ion thermal diffusivities in the FuZE-like equilibrium. Uncorrected diffusivities (coefficients without *) have features that are unphysical and/or numerically challenging. Diffusivities are corrected (coefficients with *) to address these issues as described in the main text. Corrections are made per Eqs. (24) and (25) with $\ell = 0.2a$ and $r_{crit} = 0.5a$.

Simulations indicate that, of all of the Braginskii transport terms, the transverse stress regulated by $\eta_0$ has the strongest influence on m=0 instability growth. To study the effect of $\eta_0$ in comparison with the gyroviscosity and diamagnetic heat flux, three series of simulations are done at fixed wavenumber ka=5. Results are presented in FIG. 21. For the purpose of scanning the strength of $\eta_0$, the product of the two global correction factors described above, i.e., $f_{corr}^\tau f_{corr}^L$, is replaced with a single multiplier, $f_{\eta 0}$, which is used to calculate a modified unmagnetized viscosity: $\eta^*_0 = f_{\eta 0} \eta_0$. In the first series, the full Braginskii model noted above is applied, with the $r_{crit}$-based corrections applied to gyroviscosity and diamagnetic heat flux coefficients, but no correction for large Larmor radius is used for those coefficients. In the second series, gyroviscosity is omitted, but diamagnetic heat flux retained. In the third series, diamagnetic heat flux is omitted, but gyroviscosity retained. Using the full Braginskii model, as $f_{\eta 0}$ approaches 0.1, the modeled growth rate approachs the PIC result. At small $f_{\eta 0}$, the gyroviscous and diamagnetic heat flux contributions each give a moderate 10%) reduction of the growth rate from the ideal 5M2F value. As $f_{\eta 0}$ approaches 0.1, the role of gyroviscosity is reduced (i.e., the "no gyrovisc." result approaches the "full Brag." result in FIG. 21), but that of diamagnetic heat flux remains moderate (i.e., the "no dia. heat flux" result remains ≈10% higher than the "full Brag." result in FIG. 21). The 5M2F results shown in FIG. 21 use real electron mass ($m_i/m_e = 1836$), perturbation size $\epsilon = 10^{-3}$ and 40×10 (radial×axial) cells with third order.

Figure 21:
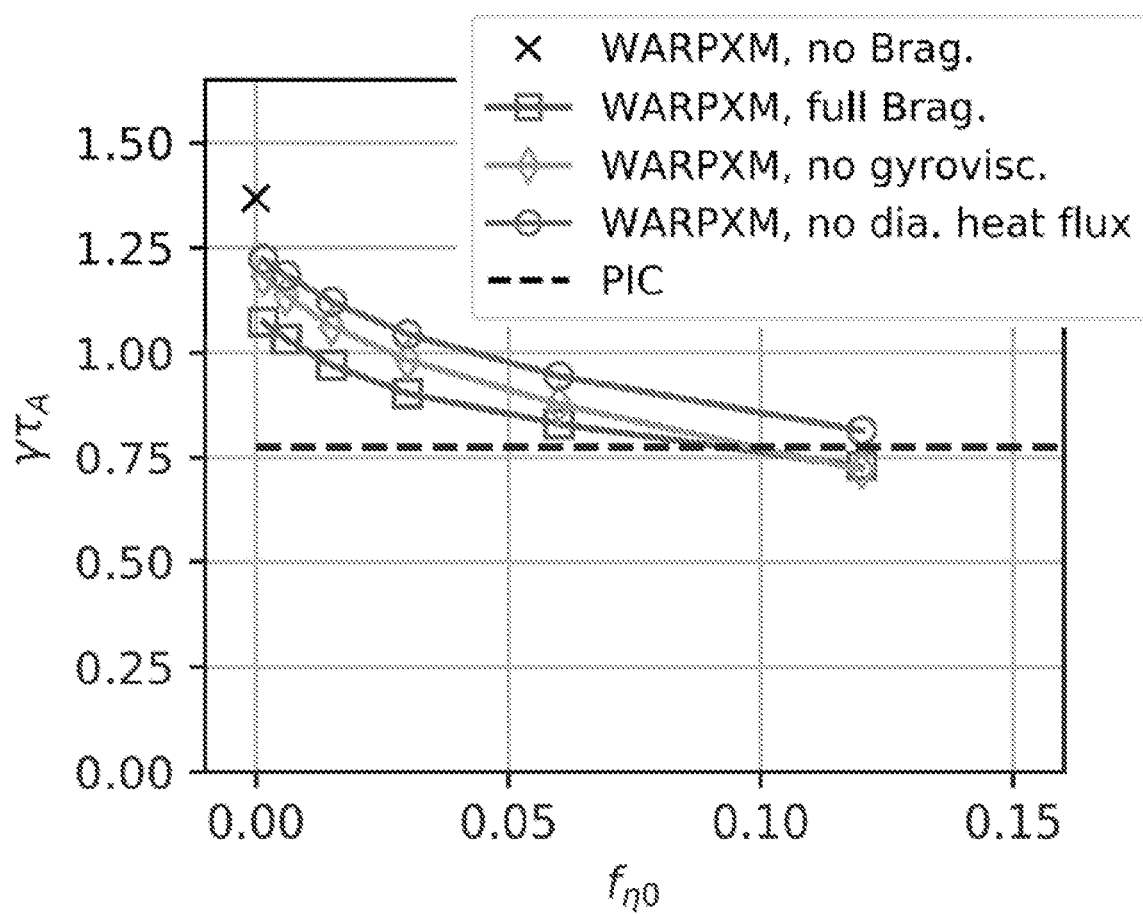
FIG. 21 shows instability growth rates, in accordance with at least one embodiment.

FIG. 21 illustrates 5M2F m=0 instability growth rates at ka=5 as a function of an overall multiplier, $f_{\eta 0}$, on the unmagnetized viscosity coefficient, $\eta_0$. Results are shown for the full Braginskii model, the full model minus gyroviscous term, and the full model minus the diamagnetic heat flux terms. The result at ka=5 from PIC modeling by Tummel et al. [K Tummel, D. P. Higginson, A. J. Link, A. E. W. Schmidt, D. T Offermann, D. R. Welch, R. E. Clark, U. Shumlak, B. A. Nelson, R. P. Golingo, and H. S. McLean, "Kinetic simulations of sheared flow stabilization in high-temperature Z-pinch plasmas," *Phys. Plasmas* 26, 062506 (2019)] is included for comparison.

Figure 22:
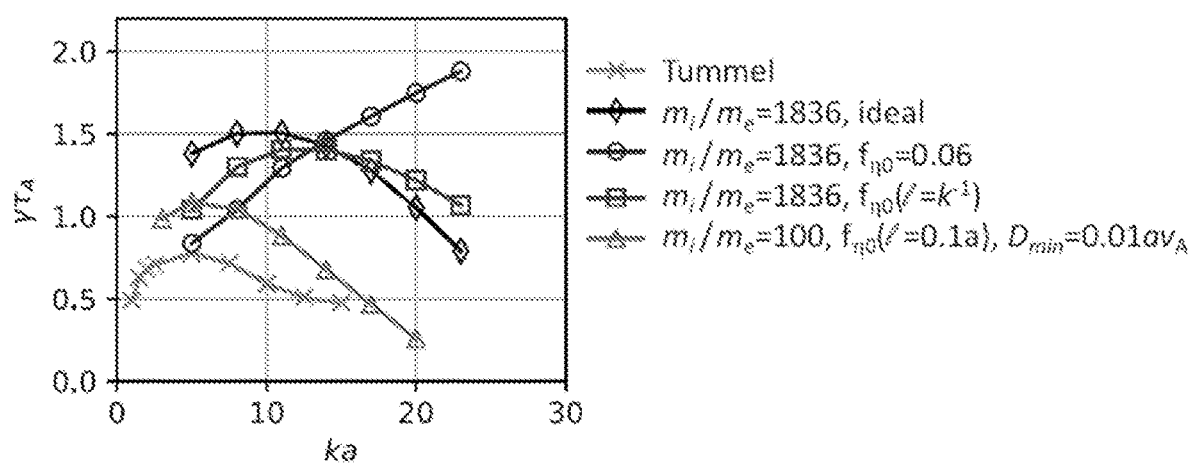
FIG. 22 shows instability growth rates, in accordance with at least one embodiment.

Examining the dependence of growth rates on k shows that applying the 5M2F model with corrected Braginskii transport can give results that share some features of PIC results. As shown in FIG. 21, the full Braginskii model with $f_{\eta 0} = 0.06$ yields a growth rate similar to PIC. (Note that the overall factor $f_{corr}^\tau f_{corr}^L = 0.018$ is used for the corrected diffusivity $\eta^*_0/\rho$ shown in FIG. 19.) Scanning ka with fixed $f_{\eta 0} = 0.06$, $\gamma \tau_A$ rises with ka and shows no sign of reaching a peak even at ka=23, as shown in FIG. 22. In this scan with $f_{\eta 0} = 0.06$, no correction for large Larmor radius is used. The reason for the rising $\gamma \tau_A$ at large ka is unclear. Additional simulations show that the rise at high-k is persists even if gyroviscosity and diamagnetic heat fluxes are omitted. The result demonstrates that using a large $\eta_0$—unphysically large, as discussed above— is not a suitable approach for reproducing PIC results across a wide range of ka. Results are also shown for a scan employing the complete size-based correction model discussed above. In that scan, $f_{\eta 0} = f_{corr}^\tau f_{corr}^L$, with $\ell = k^{-1}$, and $f_{corr}^L$ is applied to $\eta_3$ and $\kappa_\wedge^1$. With the size-based model, decreasing growth at high-k is recovered. Notably, however, the result is similar to the ideal 5M2F result, which is shown for comparison. Finally, a scan is done with transport corrections designed for nonlinear modeling; see discussion of rationale herein. In the nonlinear setup, $\ell = 0.1a$ and a minimum diffusivity, $D_{min} = 0.01 a v_A$ is applied to and $\kappa_\perp^{i,e}$. Isotropic electron viscosity, based on $D_{min}$, is also included. Corrections are included per Eqs. (24) and (25) with $r_{crit} = 0.5a$ and fixed feature size $\ell = 0.1a$. With this nonlinear setup, growth rates are reduced, giving a result more similar to the PIC result than when real electron mass and $D_{min} = 0$ are used. The mass ratios used for the simulations in FIG. 22 are shown in the legend. The perturbation is again $\epsilon = 10^{-3}$, and resolution is 40×10 cells with third order.

FIG. 22 illustrates 5M2F m=0 instability growth rates at mode wavenumbers ranging from ka=5 to 23. Results from PIC modeling by Tummel et al. are included for comparison. Using constant viscosity correction factor $f_{\eta 0} = 0.06$, growth rates increase unphysically at high k. Computing $f_{\eta 0}$ with the size-based model using $\ell = k^{-1}$, a peak growth rate is seen at ka≈12, and growth rates decrease with increasing k as in the ideal case. Also shown is the result with the corrected transport model used for nonlinear modeling: enhanced electron mass ($m_i/m_e = 1/100$), $f_{\eta 0}$ based on a fixed size $\ell$ =0.1a, and a diffusivity minimum $D_{min}$=0.01a$v_A$. The nonlinear setup gives growth rates that are most similar to PIC results.

The model described above is more rigorously nonlinear, but results presented so far have considered only the linear regime of instability growth, i.e., growth resulting in small deviations from the equilibrium state. In this section, simulations that track plasma evolution into the nonlinear regime are considered. To enable this nonlinear modeling, a combination of high resolution and artificially large perpendicular transport is used. The numerical methods readily available via WARPXM do not inherently provide strong numerical dissipation where gradients become steep, and the polynomial representation is susceptible to unphysical oscillations (similar to the Gibbs phenomenon) that can terminate simulations. Artificial perpendicular viscosities and thermal conductivities help to relax sharp gradients, and high resolution helps to resolve them.

In the simulations presented here, a minimum diffusivity $D_{min}$ =0.01a$v_A$≈3.2 m$^2$·s$^{-1}$ is applied to $\eta_1$ and $\kappa_\perp^{i,e}$, and is used for isotropic electron viscosity: $\eta_0^e/\rho_e$=$\eta_1^e/\rho_e$=$D_{min}$a$v_A$, with $\rho_e$=$m_e n_e$. As seen in FIGS. 19 and 20, $\eta_1/\rho$ and $\kappa_\perp^i/(n_e e)$ are approximately 0.04 and 0.27 m$^2$·s$^{-1}$, respectively, at r=a. These correspond to Reynolds and Peclet numbers Re$_\perp^a$≡a$v_A$/0.04≈7900 and Pe$_\perp^a$≡a$v_A$/0.27≈1200, respectively. The artificial minimum diffusivity reduces these to Re$_\perp^{a*}$ =Pe$_\perp^{a*}$=100. Kinetic corrections per Eqs. (24) and (25) are made with characteristic time and feature size are set to $\tau_{dyn}$=$\tau_A$ and $\ell$ =0.1a. An additional correction, specific to this nonlinear modeling, is made to prevent spurious numerical behavior near the outer radial boundary associated with the diamagnetic heat and momentum flux terms. A factor $f_{trunc}$ is applied to truncate $\eta_3$ and $\kappa_\Lambda^{i,e}$ in the outer region of the plasma. Specifically, $$f_{trunc} = \frac{1}{2}\left\{1 + \cos\left[\frac{\pi(r - r_{trunc})}{r_{max} - r_{trunc}}\right]\right\} \text{ where } r > r_{trunc}, \text{ and} \quad (35)$$

$$f_{trunc} = 1 \text{ elsewhere,}$$

where $r_{max}$=4a and $r_{trunc}$=2a. The difficulty with the diamagnetic flux is associated with boundary conditions on derivatives of the 5M2F variables. Well-behaved boundary conditions are possible, in principle; however, thetruncation above enables accurate simulation of nonlinear plasma dynamics in the region of interest, r≲2a.

Using the same initial condition as used for the PIC comparison at ka=5, but with parabolic sheared flow applied, simulations are done with resolution increased to 96×24 (radial×axial) cells with fourth-order elements. No phase shift is used in the perturbation. A range of parabolic sheared flow strength is studied, with $v_{sc}^a/v_A$=0, 0.25, 0.5, and 0.75. For the cases with $v_{sf}^a/v_A$=0 and 0.5, evolutions of the two-dimensional density profiles are respectively depicted in FIGS. 1 and 3. As the sheared flow speed increases, radial ejection of plasma is limited. This is illustrated further in FIG. 23, where normalized pinch ion inventory and total thermal energy are plotted as a function of time. Pinch ion inventory and thermal energy are defined as $$N(t) = \int_0^a dr \int_0^{L_z} dz n_i 2\pi, \quad (36)$$

and $$W(t) = \int_0^a dr \int_0^{L_z} dz \frac{1}{\gamma-1}(p_i + p_e) 2\pi r. \quad (37)$$

The normalized quantities are N(t)/N(t=0) and W(t)/W(t=0). In the shear-free case, the pinch has lost over 50% of the initial inventory by end of simulation, while in the case with $v_{sf}^a/v_A$=0.5, 30% is lost. Thermal energy loss is 20% in the shear-free case and 10% in the $v_{sf}^a v_A$=0.5 case.

Figure 23:
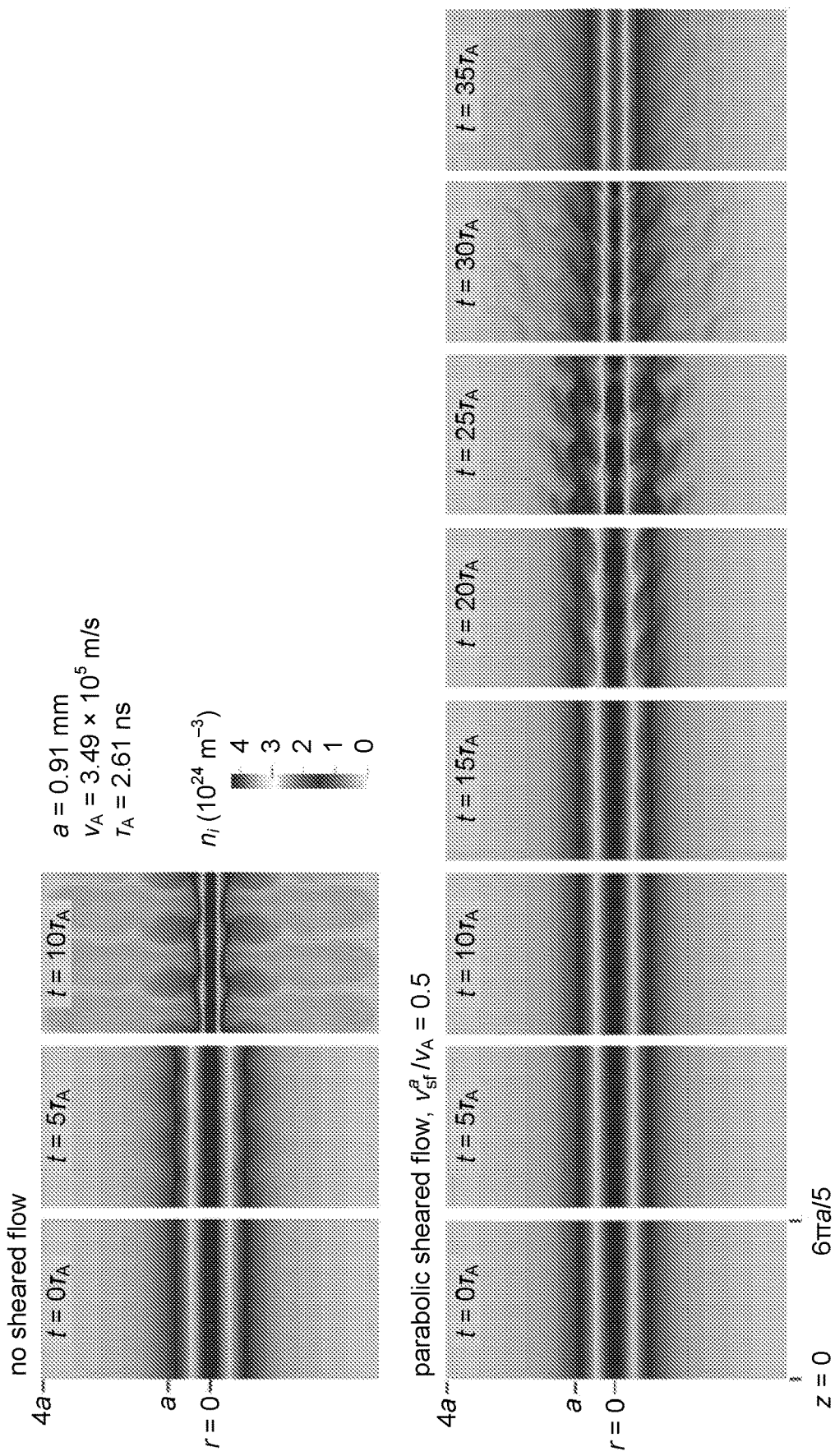
FIG. 23 shows ion density profiles for nonlinear simulations starting from FuZE-like equilibria, in accordance with at least one embodiment.

FIG. 23 illustrates ion density profiles for nonlinear simulations starting from FuZE-like equilibria with seeded mode ka=5. The profiles are repeated three times axially and reflected across r=0. In the case with zero sheared flow (top row), by t=10$\tau_A$, radial jet-like structures have developed. With $v_{sf}^a/v_A$=0.5 (bottom row), the growth is delayed, instability structures are sheared and limited in radial extent by the shear, and a relaxed near-equilibrium state is established by t=35$\tau_A$.

Figure 24:
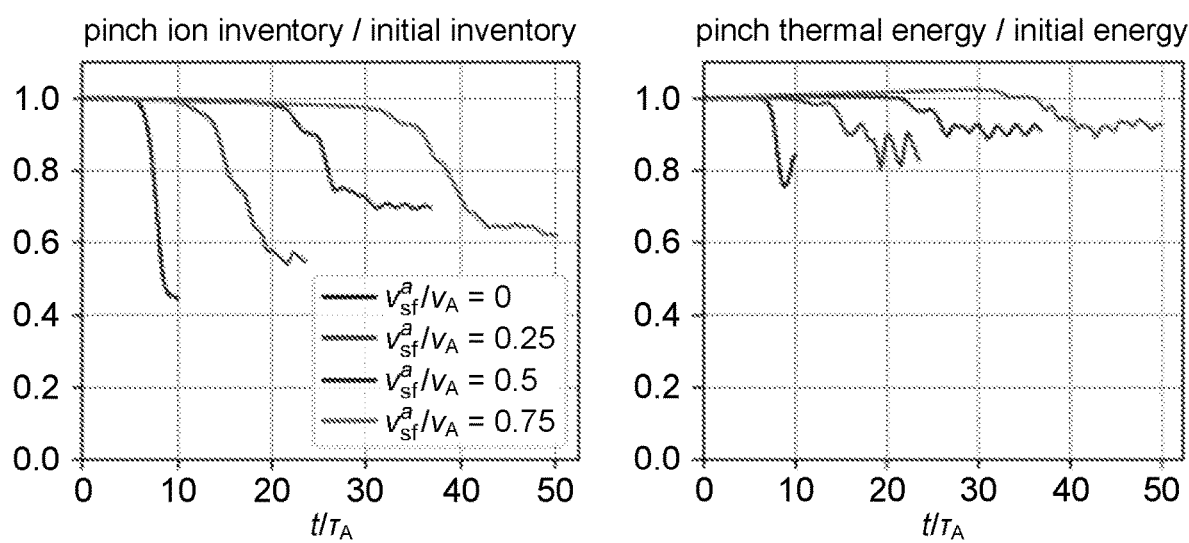
FIG. 24 shows normalized ion inventory and thermal energy, in accordance with at least one embodiment.

FIG. 24 illustrates normalized ion inventory and thermal energy within r=a, normalized by initial inventory and energy, for FuZE-like nonlinear simulations with $v_{sf}^a/v_A$=0, 0.25, 0.5, and 0.75. In all cases, ka=5. Including sheared flow improves particle and energy confinement.

Results presented here show a fast-growing instability at small a/$r_{Li}$. The instability is identified as an electron drift mode as also seen in earlier 5M2F modeling. Two important electron drift instabilities (sometimes called microinstabilities) exist where the electron cross-field drift speed ($v_{dr}$=|$v_e$−$v_i$|) approaches or exceeds $v_{\tau i}$: the lower-hybrid drift instability (LHDI) and the ion acoustic instability. In the 5M2F equilibria used here, the radially uniform electron drift speed is $v_{dr}$=$j_z$/(en). Using the equilibrium expressions for $j_z$ and n gives $$v_{dr} = 2v_{Ti}\left(\frac{a}{r_{Li}}\right)^{-1}, \quad (38)$$

where Eq. (26), evaluated at r=a, is used to replace $I_p$ with peak $B_\theta$, and the definition of $r_{Li}$ is applied. Thus, instability is expected in the region with a/$r_{Li}$<2 such that $v_{dr}$>$v_{Ti}$. This expectation is consistent with the presence of the fast-growing mode seen in FIGS. 13A-14 at a/$r_{Li}$≲1.8. Most likely, the observed instability is not LHDI, since LHDI occurs at wavelengths smaller than $r_{i,e}$. At a/$r_{Li}$=1.8, $r_{i,e}$/a≈0.013 (with $m_i/m_e$=1836). The shortest perturbed wavelength considered has ka=80/3 and an associated wavelength ($\lambda$/a=2$\pi$/ka≈0.24) that is ≈18 times larger than $r_{i,e}$. Instead of LHDI, the instability could be the ion acoustic instability. As discussed in, this instability is expected in a singly-ionized plasma only if $T_e$>>$T_i$. With $T_e$=$T_i$ as in the plasmas considered here, the acoustic speed is comparable to the ion thermal velocity, and acoustic waves are Laundau damped. Because the 5M2F model does not capture the Landau damping, it might admit an ion acoustic instability in regimes with $T_i$≈$T_e$. In future work, behavior of the ion acoustic mode and LHDI in the 5M2F model may be considered in greater detail.

Modeling linear growth in the presence of positive sheared flow with the 5M2F model at a/$r_{Li}$=2.357 gives results nearly identical to Hall-MHD modeling. With either linear or parabolic sheared flow profiles, complete stabilization is projected to occur for $v_{sf}^a f/v_A$≈0.8. This result is consistent with PIC results for sheared flow stabilization, which indicated stabilization of the FuZE-like plasma at $v_{st}^a/v_A=0.75$. With negative sheared flow (i.e., ion flow zero at r=0 and opposite the direction of current for r>0), the stablizing effect is weaker, and stabilization is projected to occur for $v_{st}^a/v_A>1$. In SFS Z-pinch experiments, observed sheared flow speeds at the pinch edge during the stable plasma operation are typically $v_{st}^a/v_A\approx 0.5$. The gradient in velocity near the pinch edge is sometimes observed to be steeper than even a parabolic profile, so it is possible that such concentrated gradients could play a role in observed stability. But another possibility is that the experimental sheared flow would not stabilize a Bennett profile; instead, observed m=0 stability may occur because the profiles are relaxed such that they are (m=0)-stable with lower levels of shear.

The 5M2F model with real ion-electron mass ratio, with or without corrected Braginskii transport, gives results that differ from PIC results, as shown in FIG. 22. In particular, the 5M2F growth rate peak is higher by a factor of two, and the peak occurs at ka≈10 vs. ka≈5 in the PIC results. The 5M2F results do reproduce growth rate rollover at high k, and have qualitative similarity to the PIC results. Understanding the specific causes of the higher and shifted peak in 5M2F modeling would require further investigation, but kinetic effects seem to be at play. Gyrokinetic modeling shows close agreement with PIC, even with an electrostatic model and simplified gyrokinetic Poisson equation that captures some but not all large-$r_{Li}$ effects (e.g., gyro-orbit averaging is not included). It is interesting to compare these results with analysis of the Kelvin-Helmholtz instability (KHI) with Hall MHD, ideal 5M2F, and continuum kinetic modeling. In that work, KHI growth rates with Hall MHD are higher than the kinetic results. The 5M2F growth rates are higher than kinetic, but much closer than the Hall-MHD results.

Nonlinear modeling results shown in FIG. 3 indicate that with moderate sheared flow (parabolic with $v_{st}^a/v_A=0.5$), following initial instability, the plasma establishes a quasi-stable configuration with more than half of the original pinch mass and over 80% of the initial pinch energy. Further research is warranted to understand whether this self-organization behavior might resemble actual experimental behavior.

Prior MEM modeling has indicated that sheared flow more effectively stabilizes short-wavelength m=0 modes than long ones. Using the same settings as for the ka=5 nonlinear simulations above, a simulation with ka=5/3 and moderate parabolic sheared flow ($v_{st}^a/v_A=0.5$) is run to explore the nonlinear confinement behavior of a longer-wavelength instability. The instability grows more quickly and mass and energy are lost earlier, but the total losses are comparable. In addition, to represent a more realistic noisy Z-pinch plasma, a "multi-mode" case is run with ka≤25. That is, the domain length is such that $L_z/a=6\pi/5$ (capturing one wavelength of ka=5/3); each available mode up to ka=25 (for which 15 wavelengths are captured) is perturbed. For each mode, the phase in Eqs. (31) and (32) is set with $\phi_0$ chosen randomly, and with no radial dependence ($\zeta=0$). The result is that mass and energy loss are increased, perhaps due to mode coupling. In all of the cases, however, mass loss is <50% and energy loss <20%. The general picture remains the same as for the ka=5 case: moderate sheared flow seems to facilitate development of a quasi-stable plasma with limited losses.

The modeling presented here has focused on Z-pinch equilibria using Bennett profiles with uniform initial temperature. Research that considers other profiles, including profiles that match the best available experimental data, can give different m=0 stability behavior, including a stabilizing effect due to guiding center drifts, even with zero bulk flow. It is also well known that profiles satisfying the Kadomtsev criterion are MHD stable. The stability of MHD-stable profiles in non-MHD models, e.g., the 5M2F model, could be considered in future work. Another consideration is that even Kadomtsev-stable profiles can be unstable to so-called entropy modes, but for gases with realistic adiabatic coefficient ($\Gamma\leq 5/3$ for real gases with three or more degrees of freedom), entropy mode instability occurs only if temperature profiles are non-uniform. In recent modeling, entropy modes are considered in the special case of $\Gamma>2$, with uniform temperature in Bennett profiles. 5M2F modeling of entropy mode behavior in MHD-stable profiles with non-uniform temperature and $\Gamma\leq 5/3$ would be of interest.

The 5M2F model is presented and the ideal model is extended to include a Braginskii-based closure. The model is applied to study the m=0 Z-pinch instability, focusing on initial conditions based on Bennett equilibria.

Ideal 5M2F modeling results are benchmarked against prior MHD and Hall-MHD results. Growth rates closely match prior results with and without sheared flow. Complete stabilization occurs at edge flow speeds of $\lesssim 5$, $0.8v_A$. Going beyond the prior work, reversed linear sheared flow is studied, revealing a relatively slow decrease in growth rate with increasing flow speed, and projected full stabilization at edge flow speed of $1.5v_A$. Another intriguing feature of the 5M2F results is that at $a/r_{Li}\lesssim 5$, 1.8, an electron drift instability is seen and tentatively identified as an ion acoustic mode.

The 5M2F model is also benchmarked against recent PIC modeling initialized with a FuZE-like Bennett equilibrium. Peak growth in the 5M2F results is approximately twice as fast as in PIC ($\gamma\tau A\approx 1.5$ vs. 0.77), and peaks at k values around twice as large (ka≈10 vs. 5). The 5M2F results resemble the PIC results in the sense that a peak in growth rate occurs at moderate k, and then falls at higher k. Applying the Braginskii-based transport model does not change this behavior. More generally, exploration of Braginskii-based transport in the 5M2F framework has provided insight into the related physics, including gyroviscosity, diamagetic heat flux, and ion gyrorelaxational effects. Electron gyrorelaxation is flagged as a potentially important effect for future consideration. Kinetic physics, beyond the 5M2F model even with Braginskii transport, seems responsible for the observed differences in m=0 stability seen in PIC modeling.

Nonlinear modeling of the m=0 instability in the FuZE-like plasma is done using the Braginskii-based 5M2F model. A simulation with edge sheared flow speed of $0.5v_A$ shows instability, followed by nonlinear mixing due to the shear, and relaxation to a quasi-steady state. Losses of pinch ion inventory and pinch thermal energy are limited to 30% and 10%, respectively.

The 5M2F model provides a compelling platform for high-fidelity computational Z-pinch research. In future work, various equilibrium profiles, besides the Bennett profile, may be considered; a profile of special interest is the MHD-stable Kadomtsev profile with temperature gradients that may activate entropy modes. Simulations of linear and nonlinear 3D Z-pinch dynamics including the m=1 instability are also within reach. Finally, the ability of 5M2F modeling to capture electron drift instabilities should be studied; accurate and efficient modeling of the associated microturbulence may yield critical insights related to current profiles and axial thermal transport in reactor-grade Z-pinch plasmas.

For equilibria with sheared flow, true two-fluid equilibria are derived. The total ion axial velocity is determined as $v_{iz}=v_{iz0}+v_{sf}$, where $v_{sf}(r)=v_{sf}^a r/a$ (linear) or $v_{sf}(r)=v_{sf}^a r^2/a^2$ (parabolic). Here, $v_{iz0}=j_z/(2en_i)$ is the shear-free ion velocity, which provides half of the equilibrium current. Magnetic field and current profiles are unchanged from the shear-free equilibrium profiles of Eqs. (26) and (27). Ion pressure and density are also unchanged. Specifically, ion pressure is half of the total pressure given in Eq. (28). Ion temperature is uniform, and is a free parameter; herein, $T_i$ is set in terms of $aa/r_{Li}$ as shown in Eq. (33). Then $n_i=p_i/(k_B T_i)$. Radial electric field is determined from Eq. (29) for ion momentum balance. The results for linear and parabolic sheared flow are $$E_r^{linear} = \frac{\mu_0 I_p}{2\pi} \frac{v_{sf}^a r^2}{a^3+ar^2}, \quad (39)$$

$$E_r^{parabolic} = \frac{\mu_0 I_p}{2\pi} \frac{v_{sf}^a r^3}{a^4+a^2 r^2}. \quad (40)$$

Gauss's Law, Eq. (7), is used to determine $n_e$, giving $$n_e^{linear} = n_i - \frac{\mu_0 \epsilon_0 I_p}{\pi q_i} \frac{v_{sf}^a (3a^2 r^2 + r^4)}{2ar(a^2+r^2)^2}, \quad (41)$$

$$n_e^{parabolic} = n_i - \frac{\mu_0 \epsilon_0 I_p}{\pi q_i} \frac{v_{sf}^a (2a^2 r^3 + r^5)}{a^2 r(a^2+r^2)^2}. \quad (42)$$

Electron pressure is then determined from Eq. (30). Results are $$p_e^{linear} = p_i - \frac{\mu_0 I_p^2}{8\pi^2}(v_{sf}^a)^2 \epsilon_0 \mu_0$$

$$\times \frac{a^2 r^2 + (a^2+r^2)^2 \ln\left(\frac{a^2}{a^2+r^2}\right)}{a^2(a^2+r^2)^2}, \quad (43)$$

$$p_e^{parabolic} = p_i + \frac{\mu_0 I_p^2}{4\pi^2}(v_{sf}^a)^2 \epsilon_0 \mu_0$$

$$\times \frac{r^2\left(a^4 + \frac{3}{2}a^2 r^2 + r^4\right) + a^2(a^2+r^2)^2 \ln\left(\frac{a^2}{a^2+r^2}\right)}{a^4(a^2+r^2)^2}. \quad (44)$$

These pressures match the shear-free $p_e$ at $r=0$, and deviate slightly elsewhere. Electron temperature is determined as $p_e/(n_e k_B)$. Electron axial velocity is determined by requiring that $j_z = v_{ez} n_e q_e + v_{iz} n_i q_i$ is satisfied.

Embodiments of the present disclosure can be described in view of the following clauses:

1. A device, comprising:
   a first electrode positioned to define an outer boundary of an acceleration volume;
   a second electrode positioned to define an inner boundary of the acceleration volume;
   at least one power supply to drive an electric current along a Z-pinch plasma column between the first and second electrodes;
   a set of valves comprising at least one gas-puff valve to provide a neutral gas to the acceleration volume to fuel the Z-pinch plasma column; and
   a shaping part conductively connected to the second electrode to, in a presence of the neutral gas provided by the at least one gas-puff valve, cause a gas breakdown of the neutral gas to generate a sheared flow velocity profile.

2. The device of clause 1, wherein an electron flow of the electric current is from the second electrode to the first electrode.

3. The device of any one of clauses 1 and 2, wherein the shaping part incorporates at least one conductive ring comprising at least one contact surface that is electrically connected to an outer surface of the second electrode.

4. The device of clause 3, wherein the at least one conductive ring incorporates conductive materials chemically and thermo-mechanically compatible with conductors of the second electrode, and a plasma-facing portion of the at least one shaping part incorporates at least one refractory metal.

5. The device of clause 4, wherein the at least one refractory metal comprises one or more of W, Ta, Nb, Mo, Re, Ti, V, Cr, Mn, Zr, Tc, Ru, Rh, Hf, Os, Ir, or an alloy of any one or more preceding metals.

6. The device of any one of clauses 4 and 5, wherein the plasma-facing portion incorporates at least one conductive form of carbon comprising one or more of graphite, sintered carbon powders, pressed carbon powders, carbon fiber, or carbon nanotube incorporating structures.

7. The device of any one of clauses 4 to 6, wherein the plasma-facing portion contains at least one textured surface formed to incorporate a plurality of localized concave elements forming structured arrays to enhance local electric fields and to facilitate electron field emission.

8. The device of clause 7, wherein the at least one textured surface has been formed by a mechanical treatment comprising one or more of cutting, scratching, sanding, sandblasting, grooving, checkering, stumping, embossing, or knurling.

9. The device of any one of clauses 7 and 8, wherein the at least one textured surface has been formed by a chemical treatment comprising one or more of etching, chemical deposition, spraying, sputtering, ion and neutral implantation, or epitaxial growth.

10. The device of any one of clauses 1-9, wherein the set of valves further comprises at least one plasma injector to provide an ionized gas to the acceleration volume to further fuel the Z-pinch plasma column.

11. The device of any one of clauses 1-10, wherein the second electrode incorporates a conical electrode surface arranged to enhance momentum transfer to ions and neutral particles in an axial direction of the first and second electrodes.

12. The device of any one of clauses 1-11, further comprising a third electrode arranged between, and coaxially with respect to, the first and second electrodes, wherein the third electrode exhibits a tapered electrode configuration and incorporates a conical electrode surface arranged to enhance momentum transfer to ions and neutral particles in an axial direction of the first, second, and third electrodes.

13. A method, comprising:
   activating one or more gas-puff valves to introduce an axisymmetric volume of a neutral gas into an acceleration volume;
   generating a radial electric field to support a first current by facilitating breakdown of the neutral gas, the first current flowing, via the introduced neutral gas, between an inner electrode and an outer electrode; and forming a Z-pinch plasma column from the introduced neutral gas to support a second current flowing between the inner electrode and the outer electrode, wherein the Z-pinch plasma column is surrounded and stabilized by a sheared velocity plasma flow formed, at least in part, from the neutral gas.

14. The method of clause 13, activating one or more plasma injectors to introduce an axisymmetric volume of an ionized gas into the acceleration volume.

15. The method of clause 14, wherein the axisymmetric volume of the ionized gas is introduced to replenish the axisymmetric volume of the neutral gas following formation of the Z-pinch plasma column.

16. The method of any one of clauses 13-15, wherein the inner electrode is an anode and the outer electrode is a cathode.

17. A plasma confinement system, comprising:
an outer electrode;
an inner electrode;
at least one power supply conductively coupled to each of the inner and outer electrodes, terminals of the at least one power supply configured to generate a potential difference between the inner and outer electrodes; and
one or more first valves fluidly coupled to a fuel gas supply and configured to direct sufficient neutral gas sourced from the fuel gas supply to support a localized breakdown path between the inner and outer electrodes and to establish a sheared velocity plasma flow for a duration of a Z-pinch discharge between the inner and outer electrodes.

18. The plasma confinement system of clause 17, wherein the inner and outer electrodes delimit an acceleration volume into which the neutral gas is directed by the one or more first valves.

19. The plasma confinement system of clause 17, further comprising an intermediate electrode,
wherein the inner and intermediate electrodes delimit an acceleration volume into which the neutral gas is directed by the one or more first valves.

20. The plasma confinement system of any one of clauses 17-19, further comprising one or more second valves fluidly coupled to the fuel gas supply and configured to direct sufficient ionized gas sourced from the fuel gas supply to maintain the sheared velocity plasma flow during the duration of the Z-pinch discharge.

21. A device, comprising:
a first electrode positioned to define an outer boundary of an acceleration volume;
a second electrode arranged coaxially with respect to the first electrode and positioned to define an inner boundary of the acceleration volume;
at least one power supply to drive an electric current along a Z-pinch plasma column between the first and second electrodes; and
a set of valves to provide gas to the acceleration volume to fuel the Z-pinch plasma column,
wherein an electron flow of the electric current is in a first direction from the second electrode to the first electrode.

22. The device of clause 21, wherein the gas comprises a neutral gas, and
wherein the device further comprises a shaping part conductively connected to the second electrode to, in a presence of the neutral gas provided by the set of valves, cause a gas breakdown of the neutral gas to generate a sheared flow velocity profile in a second direction opposite to the first direction.

23. The device of clause 22, wherein the shaping part incorporates at least one conductive ring comprising at least one contact surface that is electrically connected to an outer surface of the second electrode.

24. The device of clause 23, wherein the at least one conductive ring incorporates conductive materials chemically and thermo-mechanically compatible with conductors of the second electrode, and a plasma-facing portion of the at least one shaping part incorporates at least one refractory metal.

25. The device of clause 24, wherein the at least one refractory metal comprises one or more of W, Ta, Nb, Mo, Re, Ti, V, Cr, Mn, Zr, Tc, Ru, Rh, Hf, Os, Ir, or an alloy of any one or more preceding metals.

26. The device of any one of clauses 24 and 25, wherein the plasma-facing portion incorporates at least one conductive form of carbon comprising one or more of graphite, sintered carbon powders, pressed carbon powders, carbon fiber, or carbon nanotube incorporating structures.

27. The device of any one of clauses 24-26, wherein the plasma-facing portion contains at least one textured surface formed to incorporate a plurality of localized concave elements forming structured arrays to enhance local electric fields and to facilitate electron field emission.

28. The device of clause 27, wherein the at least one textured surface has been formed by a mechanical treatment comprising one or more of cutting, scratching, sanding, sandblasting, grooving, checkering, stumping, embossing, or knurling.

29. The device of any one of clauses 27 and 28, wherein the at least one textured surface has been formed by a chemical treatment comprising one or more of etching, chemical deposition, spraying, sputtering, ion and neutral implantation, or epitaxial growth.

30. The device of clause 21, wherein the gas is provided to the acceleration volume as an ionized gas.

31. The device of any one of clauses 21-30, wherein the second electrode incorporates a conical electrode surface arranged to enhance momentum transfer to ions and neutral particles in an axial direction of the first and second electrodes.

32. The device of any one of clauses 21-31, further comprising a third electrode arranged between, and coaxially with respect to, the first and second electrodes, wherein the third electrode exhibits a tapered electrode configuration and incorporates a conical electrode surface arranged to enhance momentum transfer to ions and neutral particles in an axial direction of the first, second, and third electrodes.

33. A method, comprising:
activating one or more valves to introduce an axisymmetric volume of a fuel gas into an acceleration volume; and
forming a Z-pinch plasma column from the introduced fuel gas to support a Z-pinch current flowing between an inner anode and an outer cathode surrounding an unsupported end of the inner anode,
wherein the Z-pinch plasma column is surrounded and stabilized by a sheared velocity plasma flow formed from the fuel gas.

34. The method of clause 33, further comprising, prior to forming the Z-pinch plasma column, generating a radial electric field to support an initial current flowing, via the introduced fuel gas, between the inner anode and the outer cathode.

35. The method of clause 34, wherein the fuel gas comprises a neutral gas, and
   wherein the radial electric field supports the initial current at least by facilitating breakdown of the neutral gas.

36. The method of any one of clauses 33-35, whereupon introduction of the fuel gas into the acceleration volume, the fuel gas comprises an ionized gas.

37. A plasma confinement system, comprising:
   an outer electrode;
   an inner electrode concentrically positioned within the outer electrode;
   at least one power supply conductively coupled to each of the inner and outer electrodes, terminals of the at least one power supply oriented to generate a potential difference between the inner and outer electrodes to drive electrons from the inner electrode to the outer electrode; and
   one or more valves fluidly coupled to a fuel gas supply and configured to direct sufficient fuel gas sourced from the fuel gas supply to drive a sheared velocity plasma flow for a duration of a Z-pinch discharge between the inner and outer electrodes.

38. The plasma confinement system of clause 37, wherein the inner and outer electrodes delimit an acceleration volume into which the fuel gas is directed by the one or more valves.

39. The plasma confinement system of clause 37, further comprising an intermediate electrode concentrically positioned between the inner and outer electrodes,
   wherein the inner and intermediate electrodes delimit an acceleration volume into which the fuel gas is directed by the one or more valves.

40. The plasma confinement system of any one of clauses 37-39, wherein the fuel gas comprises one or both of a neutral gas and an ionized gas.

While specific values, relationships, materials, and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. For example, numerical ranges recited herein are exemplary and may be modified based on an operating mode of a given plasma confinement system or based on modifications to a size, function, configuration, etc. of the given plasma confinement system. For instance, if the size of the given plasma confinement system increases, such ranges may scale proportionally (e.g., linearly, exponentially, etc.).

Having now fully set forth the embodiments and certain modifications of the concepts underlying the present invention, various other embodiments as well as certain variations and modifications of the embodiments herein shown and described may occur to those skilled in the art upon becoming familiar with such underlying concepts. It is intended to include all such modifications, alternatives, and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors — for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A device, comprising:
a first electrode positioned to define an outer boundary of an acceleration volume;
a second electrode arranged coaxially with respect to the first electrode and positioned to define an inner boundary of the acceleration volume, the second electrode including one end at least partially surrounded by the first electrode;
at least one power supply to drive an electric current along a Z-pinch plasma column and between the first and second electrodes;
a set of valves comprising at least one gas-puff valve to provide a neutral gas to the acceleration volume to fuel the Z-pinch plasma column; and
a shaping part conductively connected to the second electrode and including tips formed at a plurality of localized concave elements to enhance a local electric field and, in a presence of the neutral gas provided by the at least one gas-puff valve, assist a gas breakdown of the neutral gas to generate a sheared flow velocity profile.

2. The device of claim 1, wherein the first electrode is a cathode and the second electrode is an anode.

3. The device of claim 1, wherein the shaping part incorporates at least one conductive ring comprising at least one contact surface that is electrically connected to an outer surface of the second electrode.

4. The device of claim 3, wherein the at least one conductive ring incorporates conductive materials chemically and thermo-mechanically compatible with conductors of the second electrode, and a plasma-facing portion of the at least one shaping part incorporates at least one refractory metal.

5. The device of claim 4, wherein the at least one refractory metal comprises one or more of W, Ta, Nb, Mo, Re, Ti, V, Cr, Mn, Zr, Tc, Ru, Rh, Hf, Os, Ir, or an alloy of any one or more preceding metals.

6. The device of claim 4, wherein the plasma-facing portion incorporates at least one conductive form of carbon comprising one or more of graphite, sintered carbon powders, pressed carbon powders, carbon fiber, or carbon nanotube incorporating structures.

7. The device of claim 4, wherein the plasma-facing portion contains at least one textured surface formed to incorporate the plurality of localized concave elements forming structured arrays to enhance the local electric field and to facilitate electron field emission.

8. The device of claim 7, wherein the at least one textured surface has been formed by a mechanical treatment comprising one or more of cutting, scratching, sanding, sandblasting, grooving, checkering, stumping, embossing, or knurling.

9. The device of claim 7, wherein the at least one textured surface has been formed by a chemical treatment comprising one or more of etching, chemical deposition, spraying, sputtering, ion and neutral implantation, or epitaxial growth.

10. The device of claim 1, wherein the set of valves further comprises at least one plasma injector to provide an ionized gas to the acceleration volume to further fuel the Z-pinch plasma column.

11. The device of claim 1, wherein the second electrode incorporates a conical electrode surface arranged to enhance momentum transfer to ions and neutral particles in an axial direction of the first and second electrodes.

12. The device of claim 1, further comprising a third electrode arranged between, and coaxially with respect to, the first and second electrodes, wherein the third electrode exhibits a tapered electrode configuration and incorporates a conical electrode surface arranged to enhance momentum transfer to ions and neutral particles in an axial direction of the first, second, and third electrodes.

13. A method, comprising:
 activating one or more gas-puff valves to introduce an axisymmetric volume of a neutral gas into an acceleration volume;
 generating a radial electric field to support a first current by using tips formed at localized concave elements of a shaping part conductively connected to an outer electrode to enhance a local electric field and facilitate breakdown of the introduced neutral gas, the first current flowing, via the introduced neutral gas, between an inner electrode and the outer electrode, the outer electrode arranged coaxially with respect to the inner electrode so as to surround an unsupported end of the inner electrode; and
 forming a Z-pinch plasma column from the introduced neutral gas to support a second current flowing between the inner electrode and the outer electrode,
 wherein the Z-pinch plasma column is surrounded and stabilized by a sheared velocity plasma flow formed, at least in part, from the neutral gas.

14. The method of claim 13, activating one or more plasma injectors to introduce an axisymmetric volume of an ionized gas into the acceleration volume.

15. The method of claim 14, wherein the axisymmetric volume of the ionized gas is introduced to replenish the axisymmetric volume of the neutral gas following formation of the Z-pinch plasma column.

16. The method of claim 13, wherein the inner electrode is an anode and the outer electrode is a cathode.

17. A plasma confinement system, comprising:
 an outer electrode;
 an inner electrode concentrically positioned within the outer electrode and arranged coaxially with respect to the outer electrode;
 at least one power supply conductively coupled to each of the inner and outer electrodes, terminals of the at least one power supply configured to generate a potential difference between the inner and outer electrodes; and
 one or more first valves fluidly coupled to a fuel gas supply and configured to direct sufficient neutral gas sourced from the fuel gas supply to support a localized breakdown path between the inner electrode and tips formed at localized concave elements of a shaping part conductively connected to the outer electrode which enhance a local electric field and to establish a sheared velocity plasma flow for a duration of a Z-pinch discharge flowing between the inner and outer electrodes.

18. The plasma confinement system of claim 17, wherein the inner and outer electrodes delimit an acceleration volume into which the neutral gas is directed by the one or more first valves.

19. The plasma confinement system of claim 17, further comprising an intermediate electrode,
 wherein the inner and intermediate electrodes delimit an acceleration volume into which the neutral gas is directed by the one or more first valves.

20. The plasma confinement system of claim 17, further comprising one or more second valves fluidly coupled to the fuel gas supply and configured to direct sufficient ionized gas sourced from the fuel gas supply to maintain the sheared velocity plasma flow for the duration of the Z-pinch discharge.

* * * * *

UNITED STATES PATENT AND TRADEMARK OFFICE
CERTIFICATE OF CORRECTION

PATENT NO. : 11,758,640 B2
APPLICATION NO. : 17/841591
DATED : September 12, 2023
INVENTOR(S) : Uri Shumlak, Brian A. Nelson and Eric T. Meier It is certified that error appears in the above-identified patent and that said Letters Patent is hereby corrected as shown below:

In the Claims

Column 45, Line 30 Claim 13:
"generating a radial electric field to support a first current by using tips formed at localized concave elements of a shaping part conductively connected to an outer electrode to enhance a local electric field and facilitate breakdown of the introduced neutral gas, the first current flowing, via the introduced neutral gas, between an inner electrode and the outer electrode, the outer electrode arranged coaxially with respect to the inner electrode so as to surround an unsupported end of the inner electrode; and"

Should read as:
--generating a radial electric field to support a first current by using tips formed at localized concave elements of a shaping part conductively connected to an inner electrode to enhance a local electric field and facilitate breakdown of the introduced neutral gas, the first current flowing, via the introduced neutral gas, between the inner electrode and an outer electrode, the outer electrode arranged coaxially with respect to the inner electrode so as to surround an unsupported end of the inner electrode; and--

Column 46, Line 20 Claim 17:
"one or more first valves fluidly coupled to a fuel gas supply and configured to direct sufficient neutral gas sourced from the fuel gas supply to support a localized breakdown path between the inner electrode and tips formed at localized concave elements of a shaping part conductively connected to the outer electrode which enhance a local electric field and to establish a sheared velocity plasma flow for a duration of a Z-pinch discharge flowing between the inner and outer electrodes."

Should read as:
--one or more first valves fluidly coupled to a fuel gas supply and configured to direct sufficient neutral gas sourced from the fuel gas supply to support a localized breakdown path between the outer electrode and tips formed at localized concave elements of a shaping part conductively connected to Signed and Sealed this
First Day of October, 2024

Katherine Kelly Vidal
*Director of the United States Patent and Trademark Office* the inner electrode which enhance a local electric field and to establish a sheared velocity plasma flow for a duration of a Z-pinch discharge flowing between the inner and outer electrodes.--